United States Patent
Nozaki et al.

(10) Patent No.: US 8,002,073 B2
(45) Date of Patent: Aug. 23, 2011

(54) HYDRAULIC DRIVE WORKING VEHICLE

(75) Inventors: Takeaki Nozaki, Amagasaki (JP);
Masahisa Kawamura, Amagasaki (JP);
Toshifumi Yasuda, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 407 days.

(21) Appl. No.: 12/350,695

(22) Filed: Jan. 8, 2009

(65) Prior Publication Data
US 2009/0260911 A1    Oct. 22, 2009

(30) Foreign Application Priority Data

Apr. 22, 2008 (JP) ................................. 2008-111767
Oct. 23, 2008 (JP) ................................. 2008-272886
Oct. 31, 2008 (JP) ................................. 2008-282282

(51) Int. Cl.
*B60K 17/00* (2006.01)
(52) U.S. Cl. ...................................... 180/307; 180/308
(58) Field of Classification Search .................. 180/233, 180/242, 305, 306, 307, 308
See application file for complete search history.

(56) References Cited

U.S. PATENT DOCUMENTS

| | | | | | |
|---|---|---|---|---|---|
| 3,355,886 | A | * | 12/1967 | Weisenbach | 60/426 |
| 3,448,577 | A | * | 6/1969 | Crawford | 60/420 |
| 3,641,765 | A | * | 2/1972 | Hancock et al. | 60/484 |
| 3,907,053 | A | * | 9/1975 | Savage | 180/6.48 |
| 4,040,255 | A | * | 8/1977 | Hara | 60/445 |
| 4,099,588 | A | * | 7/1978 | Dezelan | 180/242 |
| 4,140,196 | A | * | 2/1979 | Brewer | 180/242 |
| 4,149,253 | A | * | 4/1979 | Paar et al. | 701/50 |
| 4,236,595 | A | * | 12/1980 | Beck et al. | 180/243 |
| 5,390,759 | A | * | 2/1995 | Gollner | 180/307 |
| 5,427,195 | A | * | 6/1995 | Paul et al. | 180/308 |
| 5,692,377 | A | * | 12/1997 | Moriya et al. | 60/421 |
| 5,757,158 | A | * | 5/1998 | Ferguson et al. | 318/575 |
| 5,781,874 | A | * | 7/1998 | Troppman et al. | 701/50 |
| 5,784,883 | A | * | 7/1998 | Ohkura et al. | 60/327 |
| 5,915,492 | A | * | 6/1999 | Yates et al. | 180/197 |
| 5,946,910 | A | * | 9/1999 | Hayashi et al. | 60/421 |
| 5,993,110 | A | * | 11/1999 | Bueno | 404/130 |
| 6,135,231 | A | * | 10/2000 | Reed | 180/308 |
| 6,145,287 | A | * | 11/2000 | Rosskopf | 56/10.9 |
| 6,164,402 | A | * | 12/2000 | Hastreiter | 180/243 |
| 6,209,675 | B1 | * | 4/2001 | Hayashi et al. | 180/307 |
| 6,226,987 | B1 | * | 5/2001 | Hayashi et al. | 60/447 |
| 6,241,420 | B1 | * | 6/2001 | Perrin et al. | 404/84.1 |
| 6,267,163 | B1 | * | 7/2001 | Holmes | 144/336 |
| 6,321,153 | B1 | * | 11/2001 | Rocke et al. | 701/50 |
| 6,321,866 | B1 | * | 11/2001 | Prohaska | 180/307 |
| 6,336,518 | B1 | * | 1/2002 | Matsuyama | 180/306 |
| 6,360,537 | B1 | * | 3/2002 | Widemann | 60/451 |

(Continued)

*Primary Examiner* — Hau V Phan
*Assistant Examiner* — Jacob Meyer
(74) *Attorney, Agent, or Firm* — Sterne, Kessler, Goldstein & Fox P.L.L.C.

(57) ABSTRACT

A hydraulic drive vehicle includes a bypass valve for fluidly connecting or disconnecting a pump/second-motor line and a second-motor/first-motor line, and set a capacity of a first hydraulic motor to a standard capacity which makes a peripheral speed of a first wheel driven by the first hydraulic motor equal to a peripheral speed of a second wheel driven by a second hydraulic motor when the bypass valve fluidly disconnects the two lines and set the capacity of the first hydraulic motor to a first capacity smaller than the standard capacity when the bypass valve fluidly connects the two lines. The present invention makes it possible to widen a variable range in which a traveling speed of the vehicle could be changed.

7 Claims, 36 Drawing Sheets

U.S. PATENT DOCUMENTS

| | | |
|---|---|---|
| 6,408,972 B1* | 6/2002 | Rodgers et al. ............... 180/197 |
| 6,578,358 B1* | 6/2003 | Schuh ............................ 60/448 |
| 6,631,320 B1* | 10/2003 | Holt et al. ........................ 701/83 |
| 6,644,429 B2* | 11/2003 | Evans et al. .................... 180/307 |
| 6,648,091 B2* | 11/2003 | Tanabe .......................... 180/197 |
| 6,662,895 B1* | 12/2003 | Bednar .......................... 180/308 |
| 6,732,828 B1* | 5/2004 | Abend et al. ................... 180/242 |
| 6,742,619 B2* | 6/2004 | Farbotnik et al. ............. 180/312 |
| 6,742,960 B2* | 6/2004 | Corcoran et al. ............. 404/117 |
| RE38,632 E * | 10/2004 | Schmidt et al. ................. 701/41 |
| 6,827,524 B2* | 12/2004 | Starry et al. .................. 404/129 |
| 6,889,793 B2* | 5/2005 | Okada et al. ................... 180/435 |
| 6,938,719 B2* | 9/2005 | Ishimaru et al. ............... 180/305 |
| 6,966,180 B2* | 11/2005 | Deneir et al. ................... 60/327 |
| 6,973,821 B2* | 12/2005 | Corcoran .......................... 73/78 |
| 7,044,259 B2* | 5/2006 | Stoll et al. ..................... 180/307 |
| 7,069,722 B2* | 7/2006 | Lonn ............................... 60/430 |
| 7,383,913 B1* | 6/2008 | Tsukamoto et al. .......... 180/307 |
| 7,614,843 B2* | 11/2009 | Hested et al. .................. 414/739 |
| 7,770,685 B2* | 8/2010 | Irwin et al. ..................... 180/308 |
| 7,798,272 B2* | 9/2010 | Pruitt et al. .................... 180/197 |
| 2004/0099464 A1* | 5/2004 | Bednar .......................... 180/306 |
| 2004/0141849 A1* | 7/2004 | Deneir et al. .................... 417/32 |
| 2004/0195027 A1* | 10/2004 | Abend et al. .................. 180/242 |
| 2004/0237490 A1* | 12/2004 | Yasuda et al. .................. 56/10.8 |
| 2005/0226747 A1* | 10/2005 | Ohashi et al. ................. 417/434 |
| 2005/0230171 A1* | 10/2005 | Hasegawa et al. ............ 180/242 |
| 2006/0008357 A1* | 1/2006 | Kawamura et al. ......... 417/199.1 |
| 2006/0064974 A1* | 3/2006 | Whitaker et al. ............... 60/468 |
| 2006/0107660 A1* | 5/2006 | Kawamura et al. ............. 60/413 |
| 2006/0243515 A1* | 11/2006 | Okada et al. ................... 180/305 |
| 2006/0254268 A1* | 11/2006 | Yasuda et al. .................... 60/435 |
| 2007/0028610 A1* | 2/2007 | Yasuda et al. .................... 60/456 |
| 2007/0079533 A1* | 4/2007 | Kuerten .......................... 37/234 |
| 2007/0144169 A1* | 6/2007 | Ohashi et al. ................... 60/488 |
| 2007/0163817 A1* | 7/2007 | Ohashi et al. ................. 180/53.4 |
| 2007/0209355 A1* | 9/2007 | Kawamura et al. ............. 60/413 |
| 2008/0053736 A1* | 3/2008 | Yasuda et al. .................. 180/291 |
| 2008/0314675 A1* | 12/2008 | Nozaki et al. .................. 180/305 |
| 2009/0008183 A1* | 1/2009 | Kawamura et al. ........... 180/307 |
| 2009/0211834 A1* | 8/2009 | Yasuda et al. .................. 180/367 |
| 2009/0260911 A1* | 10/2009 | Nozaki et al. .................. 180/307 |
| 2009/0266071 A1* | 10/2009 | Yasuda et al. .................... 60/484 |
| 2010/0050620 A1* | 3/2010 | Basana et al. .................... 60/327 |

\* cited by examiner

HYDRAULIC DRIVE WORKING VEHICLE

BACKGROUND OF THE INVENTION

1. Field of the Invention

The present invention relates to a hydraulic drive working vehicle including a variable-displacement type hydraulic pump that is operatively driven by a driving power source, and first and second hydraulic motors that respectively drive first and second wheel positioned on one and the other side in a vehicle lengthwise direction, wherein the hydraulic pump and first and second hydraulic motors are fluidly connected in series one another.

2. Background Art

A hydraulic drive working vehicle in which first and second wheels placed at one side and the other side in a vehicle lengthwise direction are respectively driven by first and second hydraulic motors which are fluidly connected in series to a variable-displacement type hydraulic pump has been widely used in a mowing machine and the like (refer to, for example, U.S. Pat. No. 6,889,793, which will be referred to as a prior art document 1, hereinafter).

More specifically, the prior art document 1 discloses an articulate type hydraulic drive working vehicle including front and rear frames which are placed in front and rear sides of the vehicle and which are coupled to each other in a swinging manner about a pivot shaft along a substantially vertical direction, front and rear wheels which are respectively supported by the front and rear frames, a front-side hydraulic motor for operatively driving the front wheels, a rear-side hydraulic motor for operatively driving the rear wheels, a variable-displacement type hydraulic pump which is fluidly connected in series to the front-side and rear-side hydraulic motors, and a bypass valve capable of selectively realizing a rear-side hydraulic motor driving state for supplying the hydraulic fluid discharged from the hydraulic pump to only the rear-side hydraulic motor by bypassing the front-side hydraulic motor and a front-side/rear-side hydraulic motor driving state for supplying the hydraulic fluid in series to the front-side and rear-side hydraulic motors.

Further, the prior art document 1 discloses an articulate type working vehicle configured so that a length in the vehicle lengthwise direction between the rear wheels and the pivot shaft is smaller than that between the front wheels and the pivot shaft, the articulate type working vehicle having a configuration (hereinafter, referred to as a conventional structure) in which a variable-displacement type hydraulic motor is used as the rear-side hydraulic motor and the capacity of the rear-side hydraulic motor is become small in accordance with a turning radius of the vehicle.

Specifically, in the articulate type working vehicle structured such that the length in the vehicle lengthwise direction between the rear wheels and the pivot shaft is different from that between the front wheels and the pivot shaft, and in a working vehicle structured such that either one of front wheels and rear wheels supported on front and rear portions of a vehicle frame are used as steering wheels, a difference in turning radius between the front wheels and the rear wheels is induced in accordance with the turning radius of the vehicle.

If the capacities of the front-side and rear-side hydraulic motors for driving the front wheels and rear wheels, respectively, are fixed to the same capacity in such a working vehicle in which the difference in turning radius occurs between the front wheels and the rear wheels, a driving speed for one wheels (the rear wheels in the conventional structure) of the front wheels and the rear wheels that have turning radius larger than the other wheels is insufficient during turning movement of the vehicle, thus resulting in a problem that the one wheels are dragged.

The conventional structure described in the prior art document 1 is structured, in consideration of the aforementioned problem, such that the capacity of the rear-side hydraulic motor is made smaller in accordance with the turning angle of the vehicle, in order to overcome the problem of the difference in turning radius caused at a front-side/rear-side hydraulic motors driving state (so-called four-wheel driving state).

As described above, the conventional structure is effective in overcoming the problem of the difference in turning radius at the front-side/rear-side hydraulic motor driving state (so-called four-wheel driving state), but leaves room for improvement with respect to a variable range in which a vehicle traveling speed can be changed.

Specifically, it is desirable to set the variable range of the vehicle traveling speed according to a traveling condition (usage condition), in the working vehicle such as a mowing machine. Namely, it is desirable to change the driving speed (driving torque) for the driving wheels in a lower-speed mode (higher-torque driving mode) when the working vehicle is in a working condition, while it is desirable to change the driving speed (driving torque) for the driving wheels in a high-speed mode (lower-torque driving mode) when the working vehicle is in a traveling condition on loads.

However, with the conventional structure, the variable range of the vehicle traveling speed depends only on the variable range of the capacity of the variable-displacement type hydraulic pump.

Namely, with the conventional structure, the vehicle traveling speed can be varied only within the variable range of the capacity of the hydraulic pump.

Further, as described above, in the articulate type hydraulic drive vehicle described in the prior art document 1, the front wheels and the rear wheels are supported by the corresponding frames, such that the length (hereinafter, referred to as the rear-side length) in the vehicle lengthwise direction between the rear wheels and the pivot shaft is smaller than the length (hereinafter, referred to as the front-side length) in the vehicle lengthwise direction between the front wheels and the pivot shaft.

Although the above configuration in which the rear-side length is made smaller than the front-side length as described above makes it possible to make a short turn, it necessitates, on the other hand, a structure for compensating for the difference in turning radius induced between the rear wheels and the front wheels.

Specifically, in an articulate type front/rear wheels drive vehicle structured such that the rear-side length is smaller than the front-side length, the turning radius of the rear wheels becomes larger than that of the front wheels according to the turning angle of the vehicle.

Accordingly, in assuming that the front and rear wheels have the same outer diameter, it is necessary to make the capacity of the front-side hydraulic motor greater than the capacity of the rear-side hydraulic motor in accordance with the turning angle of the vehicle during the turning movement of the vehicle, while making the capacity of the front-side hydraulic motor equal to that of the rear-side hydraulic motor during the straight traveling movement of the vehicle.

As regards this, the prior art document 1 discloses a link rod that respectively moves in one and the other directions along the axial direction in accordance with the swinging movement of the front frame relative to the rear frame in one direction (for example, in the leftward direction) and the other direction (for example, in the rightward direction) about the pivot shaft, and also discloses a capacity adjustment mechanism with a specific structure which is provided in the variable-displacement type front-side hydraulic motor.

The link rod extends between the rear frame supporting the fixed-displacement type rear-side hydraulic motor and a control shaft of the capacity adjustment mechanism.

More specifically, the rear frame supporting the rear-side hydraulic motor is provided with a swinging connector in which the pivot shaft is inserted, and a horizontal stay is secured to the outer peripheral surface of the swinging connector so as to protrude outwardly in the radial direction with the pivot shaft as a reference.

Further, the link rod has a first end coupled to a free end of the horizontal stay and a second end coupled to a free end of the control arm of the capacity adjustment mechanism.

With this structure, if the front frame supporting the variable-displacement type front-side hydraulic motor is swung in one direction (for example, the leftward direction) and the other direction (for example, the rightward direction) about the pivot shaft relative to the rear frame, the control shaft is rotated in one and the other directions, respectively, through the link rod and the control arm.

And now, a normal capacity adjustment mechanism includes a control shaft supported by a housing of a variable-displacement type hydraulic motor in a rotatable manner around its axis line, and a control arm having a proximal end coupled to an outer end of the control shaft, wherein the control shaft is operatively coupled to a movable swash plate in such a way as to slant the movable swash plate in one and the other directions about a slanting reference line, respectively, in accordance with the rotation of the control shaft itself in one and the other directions about the axis line.

In this case, the slanting movement of the movable swash plate in one direction about the slanting reference line leads to one of the increase and decrease of the capacity of the corresponding hydraulic motor, while the slanting movement of the movable swash plate in the other direction leads to the other one of the increase and decrease of the capacity of the corresponding hydraulic motor. Namely, in the case where the movable swash plate is structured such that its slanting movement in one direction causes the capacity of the corresponding hydraulic motor to increase, the slanting movement of the movable swash plate in the other direction causes the capacity of the corresponding hydraulic motor to decrease.

Accordingly, it is not sufficient to have a configuration in which the control arm of the normal capacity adjustment mechanism is simply coupled through the link rod to the rear frame supporting the fixed-displacement type rear-side hydraulic motor. That is, although the configuration makes it possible to increase the capacity of the variable-displacement type front-side hydraulic motor according to the swinging angle of the front frame relative to the rear frame when the front frame is swung in one direction (for example, the leftward direction) about the pivot shaft, it induces a problem that the capacity of the front-side hydraulic motor is decreased according to the swinging angle of the front frame relative to the rear frame about the pivot shaft when the front frame is swung in the other direction (for example, the leftward direction).

In order to overcome the problem, the capacity adjustment mechanism with the specific structure described in the prior art document 1 includes a control shaft with an eccentric structure.

Specifically, the control shaft includes first to third shaft portions. The first shaft portion is supported by the housing in a rotatable manner about an axis line orthogonal to both the motor shaft and the slanting reference line of the movable swash plate in a state of having an outer end positioned outside the housing of the front-side hydraulic motor and an inner end positioned within the housing. The second shaft portion is positioned within the housing and is eccentric with the first shaft portion. The third shaft portion is eccentric with the second shaft portion so as to be coaxial with the first shaft portion, and is supported in a rotatable manner around its axis line by a port block accommodated in the housing.

Further, the capacity adjustment mechanism includes a coupling shaft provided on an upper end surface of the movable swash plate so as to be substantially in parallel to the first shaft portion, and a plate which couples the second shaft portion to the coupling shaft.

The plate is provided with a round hole in which the coupling shaft is inserted, and an angular hole in which the second shaft portion is inserted.

The angular hole has a length which is substantially equal to the diameter of the second shaft in a first direction parallel to the motor shaft and a length which is larger than the diameter of the second shaft portion in a second direction orthogonal to both the motor shaft and the second shaft portion.

Further, the second shaft portion is positioned at a substantially center portion of the angular hole in the second direction, when the front frame is positioned at a straight travel position with respect to the rear frame.

This structure makes it possible to slide the plate in only one direction in the first direction parallel to the motor shaft in response to the rotation of the first shaft portion of the control shaft in either direction based on the swinging movement of the front frame relative to the rear frame in one or the other direction, thereby slanting the movable swash plate in only a predetermined one direction.

In the articulate type hydraulic drive vehicle described in the prior art document 1, the capacity adjustment mechanism of the variable-displacement type front-side hydraulic motor is needed to have the specific structure in order to compensate for the turning radius difference, as described above, and the port block and the housing of the variable-displacement type hydraulic motor having the specific capacity adjustment mechanism is also needed to have dedicated structures.

Therefore the conventional structure has induced a problem that a common or typical variable-displacement type hydraulic motor cannot be used as the front-side hydraulic motor.

Further, in the articulate type hydraulic drive vehicle configured so that the front wheels include a pair of left and right front wheels and the rear wheels include a pair of left and right rear wheels, there may be a case that a pair of left and right front-side hydraulic motors which are fluidly connected to each other in parallel and a pair of left and right rear-side hydraulic motors which are fluidly connected to each other in parallel are provided, in accordance with a specification.

In such a vehicle in order to compensate for the difference in turning radius, it is necessary to make one of the pair of front-side hydraulic motors or the pair of rear-side hydraulic motors to be of a variable-displacement type and, also, it is necessary to operate the respective capacity adjustment mechanisms for the pair of hydraulic motors of the variable-displacement type in a synchronized manner with each other.

The structure described in the prior art document 1 has a problem that it is difficult to be applied to the articulate type vehicle of this type.

BRIEF SUMMARY OF THE INVENTION

A first aspect of the present invention is made in view of the prior art, and it is a first object to provide a hydraulic drive working vehicle in which first and second wheels placed at one side and the other side in a vehicle lengthwise direction are respectively driven by first and second hydraulic motors which are fluidly connected in series to a variable-displacement type hydraulic pump and which is capable of changing over between a first/second-motor driving mode for driving both the first and second hydraulic motors and a first-motor driving mode for driving only the first hydraulic motor, the hydraulic drive working vehicle being capable of shifting a variable range of a vehicle traveling speed in the first-motor driving mode to a higher speed side than that in the first/second motor driving mode.

Further, it is a second object of the first aspect of the present invention to provide a hydraulic drive working vehicle configured so that a difference in turning radius occurs between the first and second wheels, the hydraulic drive working vehicle being capable of compensating for the difference in turning radius induced in the first/second-motor driving mode, while attaining the first object.

The first aspect of the present invention provides, in order to achieve the object, a hydraulic drive working vehicle including a vehicle frame, first and second wheels respectively supported on one side and the other side of the vehicle frame in a vehicle lengthwise direction, a driving power source supported by the vehicle frame, a variable-displacement type hydraulic pump operatively driven by the driving power source, a variable-displacement type first hydraulic motor operatively driving the first wheel, and a fixed-displacement type second hydraulic motor operatively driving the second wheel, wherein the hydraulic pump, the first hydraulic motor and the second hydraulic motor are fluidly connected in series to form a closed circuit through a pump/second-motor line, a second-motor/first-motor line and a first-motor/pump line that establish fluid connections between the hydraulic pump and the second hydraulic motor, between the second hydraulic motor and the first hydraulic motor and between the first hydraulic motor and the hydraulic pump, respectively, the hydraulic drive working vehicle further including a bypass valve which selectively realizing a first-motor driving mode in which only the first hydraulic motor is driven by fluidly connecting the pump/second-motor line and the second-motor/first-motor line, and a first/second-motor driving mode in which both the first and second hydraulic motors are driven by fluidly disconnecting the both lines, a driving-mode changeover operation member capable of being manually operated for changing over the driving mode, a bypass-valve actuating mechanism for actuating the bypass valve, and a hydraulic-motor actuating mechanism for actuating a capacity adjustment mechanism of the first hydraulic motor, wherein the capacity adjustment mechanism is configured so as to change the capacity of the first hydraulic motor within a range including a standard capacity which makes a peripheral speed of the first wheel driven by the first hydraulic motor equal to a peripheral speed of the second wheel driven by the second hydraulic motor, wherein the bypass-valve actuating mechanism selectively positions the bypass valve at a first-motor driving position and a first/second-motor driving position that realize the first-motor driving mode and the first/second-motor driving mode, respectively, in accordance with a manual operation on the driving-mode changeover operation member, and wherein the hydraulic-motor actuating mechanism actuates the capacity adjusting mechanism such that the capacity of the first hydraulic motor becomes the standard capacity when the bypass valve is positioned at the first/second-motor driving position and is set to a first capacity smaller than the standard capacity when the bypass valve is positioned at the first motor driving position.

The hydraulic drive working vehicle according to the first aspect of the present invention make it possible to drive the first and second wheels without inducing slippages and drags of the first and second wheels in the first/second-motor driving mode, and drive the first wheel in the first-motor driving mode higher than in the first/second-motor driving mode, thereby widening the variable range in which the traveling speed of the vehicle can be varied.

In a case where the first and second wheels have a difference in turning radius therebetween in accordance with a turning angle of the vehicle, the hydraulic-motor actuating mechanism may actuate the capacity adjustment mechanism such that, when the bypass valve is positioned at the first/second-motor driving position, the capacity of first hydraulic motor is maintained at the standard capacity at a straight traveling movement of the vehicle and the capacity of the first hydraulic motor is decreased and increased from the standard capacity in accordance with increase and decrease of turning radius of the first wheel relative to the second wheel at a turning movement of the vehicle.

The configuration makes it possible to compensate for the difference in turning radius induced between the first and second wheels while widening the variable range of the traveling speed of the vehicle.

In one embodiment, the hydraulic drive working vehicle may preferably include an operating position detection sensor for directly or indirectly detecting a position to which the operation member has been operated, and a controller that receives a signal from the operating position detection sensor.

The controller operates a solenoid that functions as the bypass-valve actuating mechanism based on the signal from the operating position detection sensor to control a position of the bypass valve.

In the one embodiment, the hydraulic drive working vehicle may preferably include a turning-angle sensor for detecting the turning angle of the vehicle, and a hydraulic-motor electric actuator that functions as the hydraulic-motor actuating mechanism.

The controller operates the hydraulic-motor electric actuator such that the capacity of the first hydraulic motor is set to the first capacity when the bypass valve is positioned at the first-motor driving position, and the capacity of the first hydraulic motor is decreased and increased from the standard capacity in accordance with increase and decrease of turning radius of the first wheel relative to the second wheel at the turning movement of the vehicle while the capacity of first hydraulic motor being maintained at the standard capacity at the straight traveling movement of the vehicle when the bypass valve is positioned at the first/second-motor driving position.

In a case where the working vehicle includes a steering operation member capable of being manually operated in such a way as to be rotated about a steering operation axis line for performing a turning movement of the vehicle, and the vehicle is configured so that the turning radius of the first wheel becomes larger than that of the second wheel as the turning angle of the vehicle increases, the hydraulic-motor actuating mechanism may include an input-side actuating arm capable of swinging between an initial position and an actuating position about a swing reference axis line, an output-side actuating arm capable of swinging between an initial position and an actuating position about the swing reference axis line independently of the input-side actuating arm, an input-side link which operatively couples the steering operation member to the input-side actuating arm, an output-side link which operatively couples the output-side actuating arm to the capacity adjustment mechanism, a biasing member which biases the output-side actuating arm toward the initial position about the swing reference axis line, and an electric motor which acts on the output-side actuating arm.

The electric motor is in an operating state of pressing the output-side actuating arm toward the operating position from the initial position against a biasing force of the biasing member about the swing reference axis line when the bypass valve is positioned at the first-motor driving position based on a manual operation on the changeover operation member, and is in a non-operating state of allowing the output-side actuating arm to be positioned at the initial position due to the biasing force of the biasing member when the bypass valve is positioned at the first/second-motor driving position based on a manual operation on the changeover operation member.

The input-side link operatively couples the steering operation member and the input-side actuating arm to each other so as to have the input-side actuating arm positioned at the initial position when the steering operation member is positioned at a straight travel position about the steering operation axis line and to have the input-side actuating arm swung from the initial position toward the operating position by an angle corresponding to the amount by which the steering operation member has been operated when the steering operation member is operated from the straight travel position about the steering operation axis line in either of one and the other directions.

The output-side link operatively couples the output-side actuating arm and the capacity adjustment mechanism such that the capacity of the first hydraulic motor is changed between the standard capacity and the first capacity in accordance with the swing of the output-side actuating arm between the initial position and the operating position.

The input-side and output-side actuating arms are provided with a conjunction/constraint mechanism which causes the output-side actuating arm to swing from the initial position to the operating position according to the swing of the input-side actuating arm from the initial position to the operating position and which also allow only the output-side actuating arm to swing from the initial position to the operating position while maintaining the input-side actuating arm positioned at the initial position.

In any one of the above various configurations, the first wheel may include a pair of left and right first wheels, and the first hydraulic motor may include a pair of left and right first hydraulic motors that operatively driving the left and right first wheels, respectively.

In this case, the second-motor/first-motor line has a first end fluidly connected to the second hydraulic motor and a second end fluidly connected to the pair of left and right first hydraulic motors, and the first-motor/pump line has a first end fluidly connected to the pair of left and right first hydraulic motors and a second end fluidly connected to the hydraulic pump.

The capacity adjustment mechanisms of the pair of left and right first hydraulic motors are operated through the hydraulic-motor actuating mechanism in a synchronized manner to each other.

In any one of the above various configurations, the second wheel may include a pair of left and right second wheels, and the second hydraulic motor may include a pair of left and right second hydraulic motors that operatively driving the left and right second wheels, respectively.

In this case, the pump/second-motor line has a first end fluidly connected to the hydraulic pump and a second ends fluidly connected to the pair of left and right second hydraulic motors, and the second-motor/first-motor line has a first end fluidly connected to the pair of left and right second hydraulic motors and a second end fluidly connected to the first hydraulic motor.

Further, a second aspect of the present invention is made in view of the prior art, and it is an object to provide an articulate type hydraulic drive vehicle including first and second frames which are coupled to each other in a swinging manner about a pivot shaft along a substantially vertical direction, a first wheel supported by the first frame, a second wheel supported by the second frame such that a length in the vehicle lengthwise direction between the second wheel and the pivot shaft is different from a length in the vehicle lengthwise direction between the first wheel and the pivot shaft, a variable-displacement type hydraulic pump, a variable-displacement type first hydraulic motor for operatively driving the first wheel, and a fixed-displacement type second hydraulic motor for operatively driving the second wheel, wherein the hydraulic pump and the first and second hydraulic motors are fluidly connected to one another in series, the articulate type hydraulic drive vehicle being capable of compensating for the difference in turning radius induced between the first and second wheels during the turning movement of the vehicle, while having a simple structure thanks to employing no need of providing a specific structure in the variable-displacement type first hydraulic motor.

The second aspect of the present invention provides, in order to achieve the object, an articulate-type hydraulic drive working vehicle including a vehicle frame having first and second frames that are respectively positioned on one and the other sides in a vehicle lengthwise direction and that are coupled to each other in a swinging manner relative to each other about a pivot shaft along a substantially vertical direction, a first wheel supported by the first frame, a second wheel supported by the second frame such that a length in the vehicle lengthwise direction between the second wheel and the pivot shaft is different from a length in the vehicle lengthwise direction between the first wheel and the pivot shaft, a driving power source supported by the vehicle frame, a variable-displacement type hydraulic pump operatively driven by the driving power source, a variable-displacement type first hydraulic motor that is supported by the first frame and that operatively drives the first wheel, and a fixed-displacement type second hydraulic motor that is supported by the second frame and that operatively drives the second wheel, wherein the hydraulic pump, the first hydraulic motor and the second hydraulic motor are fluidly connected in series to form a closed circuit through a pump/second-motor line, a second-motor/first-motor line and a first-motor/pump line that establish fluid connections between the hydraulic pump and the second hydraulic motor, between the second hydraulic motor and the first hydraulic motor and between the first hydraulic motor and the hydraulic pump, respectively, the articulate type hydraulic drive working vehicle being characterized in that a capacity adjustment mechanism of the first hydraulic motor is configured so as to change the capacity of the first hydraulic motor within a range including a standard capacity which makes a peripheral speed of the first wheel driven by the first hydraulic motor equal to a peripheral speed of the second wheel driven by the second hydraulic motor, the second frame includes a second frame main body directly or indirectly supporting the second wheel and the second hydraulic motor, a cam pushing member that is secured to the second frame main body in a relatively immovable manner with respect thereto and that has a cam surface, the first frame includes a first-frame main body that directly or indirectly supports the first wheel and the first hydraulic motor and that is connected to the second frame main body in a swinging manner around the pivot shaft, a cam follower member that is mounted to the first frame main body so as to face to the cam surface in a state of being relatively immovable about the pivot shaft but being relatively movable in a predetermined first direction with respect to the first frame main body, and a biasing member that operatively presses the cam follower member toward the cam surface, the cam surface includes a reference area with which the cam follower member is engaged when the second frame main body is positioned at a straight travel position with respect to the first frame main body, and a pair of control areas extending in one direction and the other direction about the axis line of the pivot shaft from the reference area, the pair of control areas having shapes symmetrical to each other with the reference area as a reference and being configured so that a radial distance from the axis line of the pivot shaft to the control areas gradually increases and decreases as a distance from the reference area about the axis line of the pivot shaft increases, and there is provided a hydraulic-motor actuating mechanism that actuate the capacity adjustment mechanism by utilizing the movement of the cam follower member in the first direction.

In the hydraulic drive working vehicle according to the second aspect of the present invention, since the second frame main body supporting the second wheel and the fixed-displacement type second hydraulic motor is provided with the cam pushing member, which has the cam surface, in such a manner as to be relatively immovable with respect to the second frame main body, and the first frame main body supporting the first wheel and the variable-displacement first hydraulic motor is provided with the cam follower member in such a manner as to be relatively immovable about the pivot shaft but relatively movable in the first direction with respect to the first frame main body, the capacity of the first hydraulic motor is increased or decreased by utilizing the movement of the cam follower member in the first direction by an amount corresponding to a swing amount of the first and second frame main bodies to each other about the pivot shaft. Therefore, it is possible to increase or decrease the capacity of the first hydraulic motor in accordance with the turning angle of the vehicle irrespective of the turning direction of the vehicle, thereby effectively compensating for the difference in turning radius induced between the first and second wheels in either directions in which the vehicle makes a turn, without providing a specific structure in the capacity adjustment mechanism.

Preferably, the cam follower member engages with the reference area to be positioned at a standard position in the first direction when the second frame main body is positioned at the straight travel position with respect to the first frame main body, and engages with one of the pair of control areas to be moved in the first direction from the standard position by an amount corresponding to the amount of the swing of the second frame main body with respect to the first frame main body when the second frame main body is swung from the straight travel position with respect to the first frame main body about the pivot shaft, and the hydraulic-motor actuating mechanism operatively connects the cam follower member and the capacity adjustment mechanism so that the capacity of the first hydraulic motor becomes the standard capacity when the cam follower member is positioned at the standard position and the capacity of the first hydraulic motor decreases or increases from the standard capacity as the cam follower member is moved in the first direction from the standard position.

In one embodiment, the first wheel may include a pair of left and right first wheels, and the first hydraulic motor may include a pair of left and right first hydraulic motors that operatively drives the left and right first wheels, respectively.

In this embodiment, the second-motor/first-motor line has a first end fluidly connected to the second hydraulic motor and a second end fluidly connected to the pair of left and right first hydraulic motors, and the first-motor/pump line has a first end fluidly connected to the pair of left and right first hydraulic motors and a second end fluidly connected to the hydraulic pump.

The capacity adjustment mechanisms of the pair of left and right first hydraulic motors are operated through the hydraulic-motor actuating mechanism in a synchronized manner to each other.

In the one embodiment, the first frame preferably includes a swing frame that is supported by the first frame main body in a swinging manner about a leftward/rightward swing reference shaft along the vehicle longitudinal direction at a center in a vehicle widthwise direction, the left and right first hydraulic motors are supported by left and right ends of the swing frame, respectively, and the first direction is set to be along the vehicle lengthwise direction.

In the preferable embodiment, the hydraulic motor actuating mechanism may include a push-pull wire having a first end operatively connected to the cam follower member and a second end operatively connected to the capacity adjustment mechanisms of the pair of left and right first hydraulic motors.

Instead of this, the hydraulic motor actuating mechanism may include a rotational member that is relatively immovable in the first direction but relatively rotatable about the leftward/rightward swing reference shaft with respect to the cam follower member, and a pair of left and right rods having first ends coupled to the rotational member and second ends coupled to the capacity adjustment mechanisms of the left and right first hydraulic motors.

In a vehicle where a length in the vehicle lengthwise direction between the first wheel and the pivot shaft is shorter than that between the second wheel and the pivot shaft, the capacity adjustment mechanism is configured so as to change the capacity of the first hydraulic motor between the standard capacity and a first capacity smaller than the standard capacity, and the pair of control areas are configured such that a distance from the axis line of the pivot shaft gradually increases as a distance from the reference area about the axis line of the pivot shaft increases, so that the cam follower member is positioned at the standard position on one side in the first direction when the second frame main body is positioned at the straight travel position with respect to the first frame main body, and is positioned at a maximum movement position on the other side in the first direction when the second frame main body is swing about the pivot shaft to a maximum extent.

The hydraulic-motor actuating mechanism operatively connects the cam follower member and the capacity adjustment mechanism so that the capacity of the first hydraulic motor is decreased from the standard capacity to the first capacity as the cam follower member is moved from the standard position to the maximum movement position.

The hydraulic drive working vehicle further includes a bypass valve that selectively takes a first-motor driving position that fluidly connects the pump/second-motor line and the second-motor/first-motor line to realize a first-motor driving mode in which only the first hydraulic motor is driven and a first/second-motor driving position that fluidly disconnects the lines to realize a first/second-motor driving state in which both the first and second hydraulic motors are driven, a driving-mode changeover operation member that is capable of being manually operated for changing over the driving mode and that selectively takes a first-motor driving position and a first/second-motor driving position, a bypass-valve actuating mechanism that positions the bypass valve at the first-motor driving position or the first/second-motor driving position based on a manual operation on the changeover operation member, and a conjunction/constraint mechanism that positions the cam follower member at the standard position and at the maximum movement position, respectively, when the changeover operation member is positioned at the first/second-motor driving position and at the first-motor driving position, and that allows the cam follower member to be controlled in position by the cam pushing member while maintaining the changeover operation member positioned at the first/second-motor driving position.

The conjunction/constraint mechanism may preferably include a coil spring that functions as the biasing member and that is placed along the first direction at a position closer to the other side in the first direction than the cam follower member, a cam-follower-member side coupling member having a first end engaged with a first end of the coil spring which is closer to the cam follower member and a second end operatively coupled to the cam follower member, an operation-side link member that includes an actuating portion facing a second end of the coil spring on the opposite side from the first end and that is operatively coupled to the changeover operation member such that the actuating portion is respectively positioned at a separate position farther away from the second end and a close position closer thereto when the changeover operation member is positioned at the first-motor driving position and at the first/second-motor driving position, an operation-side coupling member having a first end engaged with the second end of the coil spring such that it faces the first end of the cam-follower side coupling member with the coil spring sandwiched therebetween and a second end coupled to the actuating portion of the operation-side link member, and an intermediate coupling member that couples the first ends of the cam-follower-member side coupling member and the operation-side coupling member to each other, at a state of allowing the first ends to move relative to each other in such a direction as that they come close to each other while compressing the coil spring and also preventing the first ends from moving relative to each other in such a direction that they separate from each other.

For example, the operation-side link member is supported by the first frame main body in a swinging manner about a rotation axis along the vehicle widthwise direction so as to swing between a first/second-motor driving position and a first-motor driving position which are respectively positioned on one side and the other side about the rotation axis, and the operation-side link member is configured to have a first end operatively coupled to the changeover operation member and has a second end functioning as the actuating portion.

In the configuration, the conjunction/constraint mechanism may further include a detent biasing member for holding the operation-side link member at the first/second-motor driving position.

The detent biasing member holds the operation-side link member at the first/second-motor driving position with a biasing force enough to cause the coil spring to be compressed when the cam follower member is pushed toward the other side in the first direction by the cam pushing member at a state where the operation-side link member is positioned at the first/second-motor driving position.

The detent biasing member is preferably configured so as to bias the operation-side link member toward one side and the other side about the rotation axis, respectively, when the operation-side link member is positioned at the first/second-motor driving position on one side about the rotation axis and at the first-motor driving position on the other side about the rotation axis.

The working vehicle according to any one of the above configurations may further include an operating position detection sensor for directly or indirectly detecting a position to which the operation member has been operated, and a controller that receives a signal from the operating position detection sensor.

The controller operates a solenoid that functions as the bypass-valve actuating mechanism based on the signal from the operating position detection sensor to control a position of the bypass valve.

BRIEF DESCRIPTION OF THE DRAWINGS/FIGURES

The above, and other objects, features and advantages of the present invention will become apparent from the detailed description thereof in conjunction with the accompanying drawings wherein.

DETAILED DESCRIPTION OF THE INVENTION

First Embodiment

Hereinafter, one embodiment of a hydraulic drive vehicle according to the present invention will be described, with reference to the attached drawings.

Figure 1:
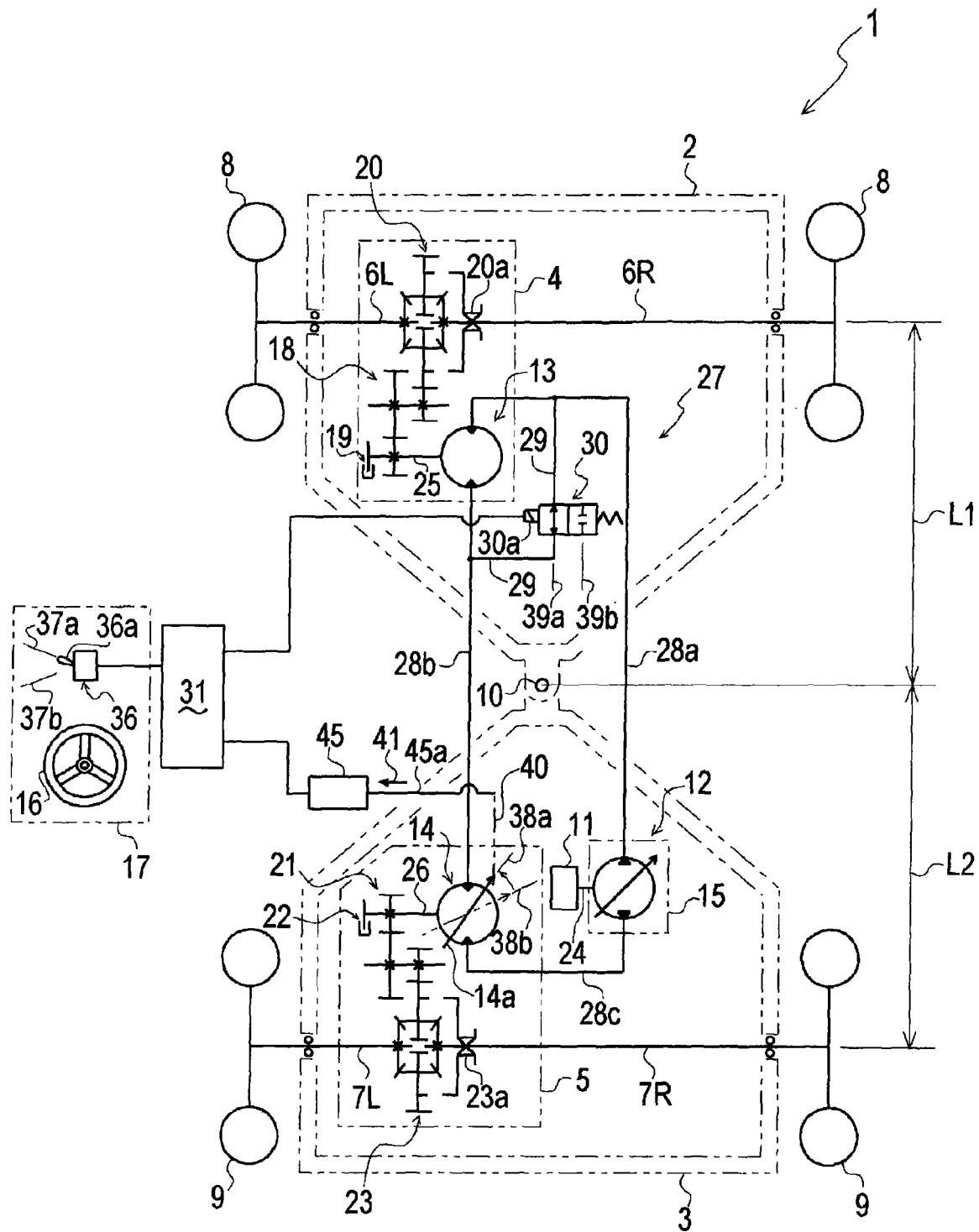
FIG. 1 is a schematic view of a power transmission in a hydraulic drive vehicle according to a first embodiment of the present invention, and shows the power transmission when a first-motor driving state in which only one of front and rear wheels are driven is selected.
Figure 2:
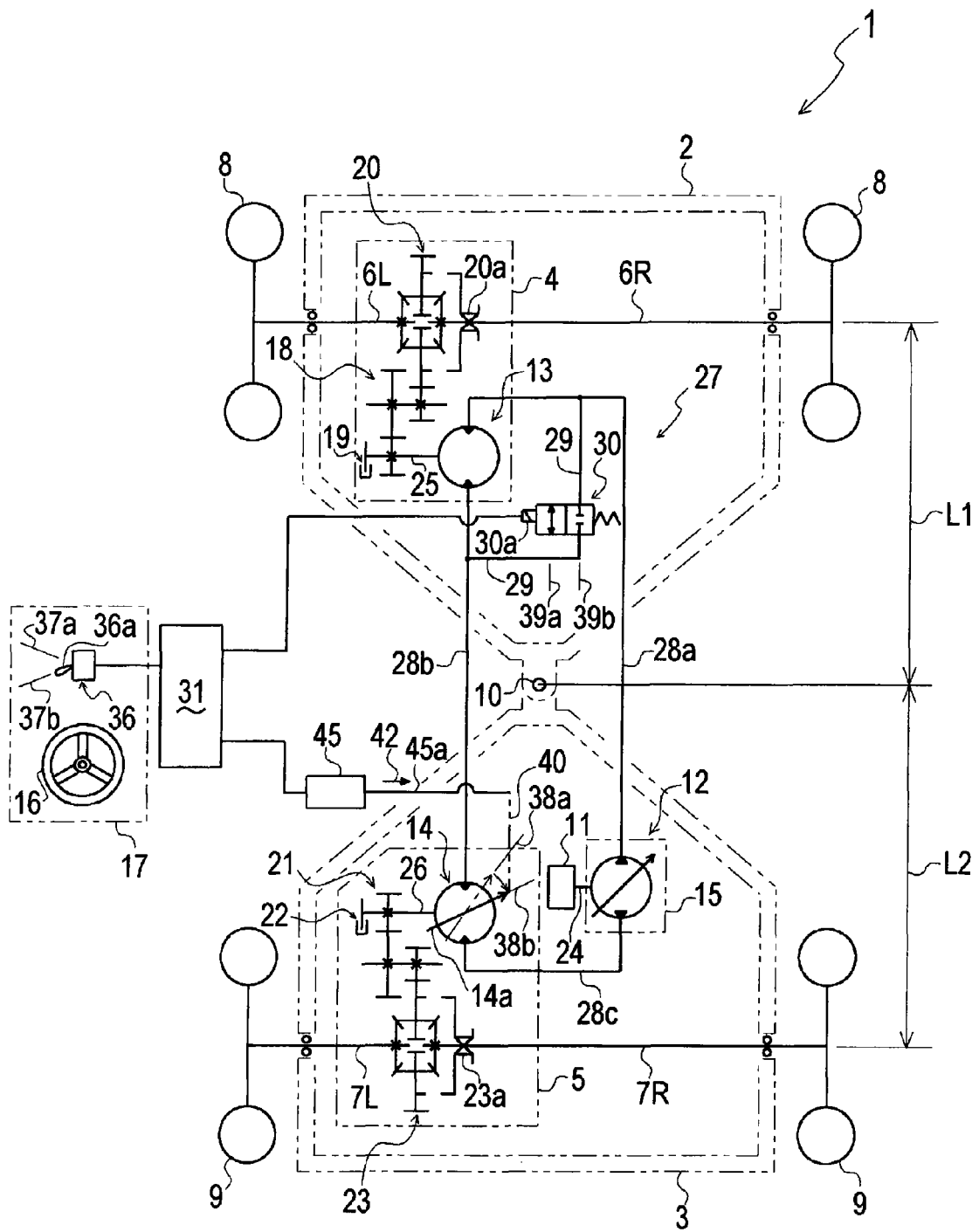
FIG. 2 is a schematic view of the power transmission in the hydraulic drive vehicle according to the first embodiment, and shows the power transmission when a first/second-motor driving state in which both the front and rear wheels are driven is selected.

FIG. 1 and FIG. 2 illustrate schematic views of a power transmission in a four-wheel hydraulic drive vehicle 1 according to the present embodiment. Further, FIG. 1 and FIG. 2 illustrate the power transmission conditions at states where a first-motor driving mode and a first/second-motor driving mode, which will be described later, are being selected, respectively.

At first, with reference to FIG. 1 and FIG. 2, there will be described an entire structure of the hydraulic drive vehicle 1 according to the present embodiment.

As illustrated in FIG. 1 and FIG. 2, the vehicle 1 includes a vehicle frame, a pair of left and right first wheels 9 (rear wheels in the present embodiment) and a pair of left and right second wheels 8 (front wheels in the present embodiment) which are respectively supported at one side and the other side of the vehicle frame in a vehicle lengthwise direction, a driving power source 11 supported by the vehicle frame, a variable-displacement type hydraulic pump 12 which is operatively driven by the driving power source 11, a variable-displacement type first hydraulic motor 14 which operatively drives the first wheels 9, and a fixed-displacement type second hydraulic motor 13 which operatively drives the second wheels 8.

In the vehicle 1 according to the present embodiment, the hydraulic pump 12, the first hydraulic motor 13 and the second hydraulic motor 14 are fluidly connected to one another in series, in such a way as to form a closed circuit, through a pump/second-motor line 28$a$, a second-motor/first-motor line 28$b$ and a first-motor/pump line 28$c$ which establish fluid connections between the hydraulic pump 12 and the second hydraulic motor 13, between the second hydraulic motor 13 and the first hydraulic motor 14, and between the first hydraulic motor 14 and the hydraulic pump 12, respectively.

The vehicle 1 includes a first axle-driving device 5 (a rear axle-driving device in the present embodiment) including the first hydraulic motor 14, and a second axle-driving device 4 (a front axle-driving device in the present embodiment) including the second hydraulic motor 13.

More specifically, the second axle-driving device 4 includes the fixed-displacement type second hydraulic motor 13 having a predetermined fixed capacity, a second motor shaft 25 which outputs rotational power from the second hydraulic motor 13, a pair of left and right second axles 6L and 6R (front axles in the present embodiment) which are coupled to the pair of left and right second vehicles 8, respectively, and a differential device 20 provided with a diff-lock mechanism 20$a$ which differentially transmits the rotational power from the second motor shaft 25 to the pair of left and right second axles 6L and 6R.

In the present embodiment, the second axle-driving device 4 also includes a speed-reduction device 18 with a brake 19, between the second motor shaft 25 and the differential device 20.

On the other hand, the first axle-driving device 5 includes the variable-displacement type first hydraulic motor 14, a first motor shaft 26 which outputs rotational power from the first hydraulic motor 14, a pair of left and right first axles 7L and 7R (rear axles in the present embodiment) which are coupled to the pair of left and right first wheels, respectively, and a differential device 23 provided with a diff-lock mechanism 23$a$ which differentially transmits the rotational power from the first motor shaft 26 to the pair of left and right first axles 7L and 7R.

Further, in the present embodiment, the first axle-driving device 5 also includes a speed-reduction device 21 with a brake 22, between the first motor shaft 25 and the differential device 23.

In the vehicle 1 having the aforementioned structure, the amount of the capacity of the variable-displacement type hydraulic pump 12 which is driven by the rotational power from the driving power source 11 is changed through a speed-change operation member (not illustrated), such as a traveling pedal, so that the rotational outputs from the first hydraulic motor 14 and the second hydraulic motor 13 are changed in speed, thereby changing driving speeds for the first wheels 8 and the second wheels 9.

The vehicle 1 according to the present embodiment is of an articulate type, as illustrated in FIG. 1 and FIG. 2.

Specifically, the vehicle frame includes a first frame 3 (a rear frame in the present embodiment) which is placed in one side (the rear side in the present embodiment) in the vehicle lengthwise direction, and a second frame 2 (a front frame in the present embodiment) which is placed in the other side (the front side in the present embodiment) in the vehicle lengthwise direction and which is coupled to the first frame 3 in a rotatable manner in a horizontal direction about a pivot shaft 10.

The vehicle 1 including the vehicle frame makes a turn by swinging or rotating the front frame 2 in a leftward direction or a rightward direction relative to the rear frame 3.

The first axle-driving device 5 is supported by the first frame 3, while the second axle-driving device 4 is supported by the second frame 2.

In the present embodiment, as illustrated in FIG. 1 and FIG. 2, a distance L2 in the vehicle lengthwise direction between the pivot shaft 10 and a rotational center of the first wheels 9 is made equal to a distance L1 in the vehicle lengthwise direction between the pivot shaft 10 and a rotational center of the second wheels 8.

In the articulate type vehicle having the structure, a turning radius of the first wheels 8 is equal to that of the second wheels 9.

In the present embodiment, as illustrated in FIG. 1 and FIG. 2, the first frame 3 supports the driving power source 11 and a housing 15 which accommodates the variable-displacement type hydraulic pump 12 operatively coupled to the driving power source 11 through a pump shaft 24, in addition to the first axle-driving device 5 (the rear axle-driving device).

On the other hand, the second frame 2 supports a driving operation portion 17 including a steering operation member 16 provided on a steering column which is not illustrated and the like, and a working machine such as a mower, not illustrated, which is operatively driven by the driving power source 11, in addition to the second axle-driving device 4 (the front axle-driving device).

Further, the vehicle 1 includes a steering actuator such as a hydraulic cylinder which is not illustrated, and the actuator is structured to rotate the front frame 2 with respect to the rear frame 3 about the pivot shaft 10, based on a manual operation on the steering operation member 16, thereby causing the vehicle 1 to make a turn according to a manual operation on the steering operation member 16.

The variable-displacement type first hydraulic motor 14 is configured such that the amount of the capacity thereof can be varied through a motor-side capacity adjustment mechanism 14a such as a movable swash plate.

More specifically, the motor-side capacity adjustment mechanism 14a is configured so as to change the capacity of the first hydraulic motor 14 within a range including a standard capacity which makes a peripheral speed of the first wheels 9 driven by the first hydraulic motor 14 equal to a peripheral speed of the second wheels 8 driven by the second hydraulic motor 13.

For example, if the first wheels 9 and the second wheels 8 have the same outer diameter, the standard capacity is equal to a predetermined capacity (hereinafter, referred to as a fixed capacity) of the second hydraulic motor 13.

Next, there will be described a hydraulic circuit 27 including the closed circuit 28 in the hydraulic drive vehicle 1.

The hydraulic circuit 27 includes a main line 28 including the pump/second-motor line 28a, the second-motor/first-motor line 28b and the first-motor/pump line 28c.

Specifically, the hydraulic pump 12, the second hydraulic motor 13 and the first hydraulic motor 14 are fluidly connected to one another in series through the main line 28 so as to form a closed circuit.

The hydraulic circuit 27 includes a bypass valve 30 which selectively realize a fluid connection or a fluid disconnection between the pump/second-motor line 28a and the second-motor/first-motor line 28b, in addition to the main line 28.

More specifically, the hydraulic circuit 27 includes a bypass line 29 which fluidly connects the pump/second-motor line 28a and the second-motor/first-motor line 28b, and the bypass valve 30 is inserted in the bypass line 29, as illustrated in FIG. 1 and FIG. 2.

The bypass valve 30 is position-controlled by a bypass-valve actuating mechanism in accordance with a manual operation on a driving-mode changeover operation member 36 capable of being manually operated for changing over the driving mode.

In the present embodiment, the bypass valve 30 is embodied by a solenoid valve including a solenoid 30a, and the solenoid 30a functions as the bypass-valve actuating mechanism.

More specifically, the vehicle 1 includes, in addition to the driving-mode changeover operation member 36 and the solenoid 30a which functions as the bypass-valve actuating mechanism, an operating position detection sensor (not illustrated) for directly or indirectly detecting a position to which the operation member has been operated, and a controller 31 which receives a travel-mode selection signal from the operating position detection sensor.

The bypass valve 30 is of a 2-port/2-position changeover type capable of selectively taking a first-motor driving position 39a (see FIG. 1) and a first/second-motor driving position 39b (see FIG. 2). At the first-motor driving position 39a, the bypass valve 30 fluidly connects the pump/second-motor line 28a and the second-motor/first-motor line 28b for realizing a first-motor driving mode in which only the first hydraulic motor 14 is driven. At the first/second-motor driving position 39b, the bypass valve 30 fluidly disconnects the lines 28a and 28b for realizing a first/second-motor driving mode in which both the first hydraulic motor 14 and the second hydraulic motor 13 are driven.

The controller 31 operates the solenoid 30a based on the travel-mode selection signal from the operating position detection sensor, in such a way as to control a position of the bypass valve 30 in accordance with a manual operation on the changeover operation member 36.

At first, there will be described a case where a changeover lever 36a of the changeover operation member 36 is positioned at a first-motor driving position 37a (see FIG. 1).

When the changeover lever 36a is positioned at the first-motor driving position 37a, the controller 31 operates the solenoid 30a for positioning the bypass valve 30 at the first-motor driving position 39a.

When the bypass valve 30 is positioned at the first-motor driving position 39a, hydraulic fluid from the hydraulic pump 12 is supplied only to the first hydraulic motor 14 by bypassing the second hydraulic motor 13, thereby realizing the first-motor driving mode (see FIG. 1).

The vehicle 1 according to the present embodiment is structured such that the amount of the capacity of the first hydraulic motor 14 is set to a first capacity smaller than the standard capacity, in the first-motor driving mode.

More specifically, the vehicle 1 includes a hydraulic-motor actuating mechanism 45 that operates the motor-side capacity adjustment mechanism 14a, as illustrated in FIG. 1 and FIG. 2.

The hydraulic-motor actuating mechanism 45 includes a movable portion 45a that is operatively coupled to the motor-side capacity adjustment mechanism 14a through a link mechanism 40, and the movable portion 45a is controlled in operation by the controller 31.

Namely, when the controller 31 determines that the changeover operation member 36 is positioned at the first-motor driving position 37a based on the travel-mode selection signal from the operating position detection sensor, the controller 31 operates the movable portion 45a of the hydraulic-motor actuating mechanism 45 such that the capacity of the first hydraulic motor 14 becomes the first capacity smaller than the standard capacity.

The hydraulic-motor actuating mechanism 45 may take various types of forms such as an electric motor or a hydraulic cylinder mechanism including an electromagnetic changeover valve, as long as the movable portion 45a can be controlled in operation by the controller 31.

Next, there will be described a case where the changeover lever 36a is positioned at a first/second-motor driving position 37b (see FIG. 2).

If the changeover lever 36a is positioned at the first/second-motor driving position 37b, the controller 31 operates the solenoid 30a for positioning the bypass valve 30 at the first/second-motor driving position 39b.

When the bypass valve 30 is positioned at the first/second-motor driving position 39b, the hydraulic fluid from the hydraulic pump 12 is supplied in series to both the second hydraulic motor 13 and the first hydraulic motor 14, thereby realizing the first/second-motor driving mode (see FIG. 2).

The vehicle 1 according to the present embodiment is structured such that the amount of the capacity of the first hydraulic motor 14 is set to the standard capacity, in the first/second-motor driving condition.

Namely, when the controller 31 determines that the changeover operation member 36 is positioned at the first/second-motor driving position 37b based on the travel-mode selection signal from the operating position detection sensor, the controller 31 operates the movable portion 45a of the hydraulic-motor actuating mechanism 45 such that the capacity of the first hydraulic motor 14 becomes the standard capacity.

As described above, in the vehicle 1 according to the present embodiment, in the first/second-motor driving mode for driving both the first hydraulic motor 14 and the second hydraulic motor 13, the capacity of the first hydraulic motor 14 is set to the standard capacity. Accordingly, both the first wheels 9 and the second wheels 8 are driven at a state where the peripheral speed of the first wheels 9 which are operatively driven by the first hydraulic motor 14 agrees with the peripheral speed of the second wheels 8 which are operatively driven by the second hydraulic motor 13, so that the front and rear wheels can be driven, without inducing slippages and drags of the first wheels 9 and the rear wheels 8.

On the other hand, in the first-motor driving mode for driving only the first hydraulic motor 14, the capacity of the first hydraulic motor 14 is set to the first capacity smaller than the standard capacity. Accordingly, the peripheral speed of the first wheels 9 which are operatively driven by the first hydraulic motor 14 can be made larger than the peripheral speed of the first wheels 9 and the second wheels 8 in the first/second-motor driving state.

Namely, in the first-motor driving mode, a variable speed range of the first wheels 9 in which the driving speed of the first wheels 9 can be changed according to the change of the capacity of the hydraulic pump 12 within the variable capacity range of the hydraulic pump 12, is shifted to a higher speed side in comparison with a variable speed range of the first wheels 9 and the second wheels 8 in the first/second-motor driving state. Accordingly, in the first-motor driving mode, the vehicle 1 can be traveled at higher speeds than in the first/second-motor driving mode.

The first/second-motor driving mode in which both of the front and rear wheels 8 and 9 are driven with a variable speed at a lower-speed/higher-torque condition is suitable for working travel in which the vehicle travels on the farm field while performing work. The first-motor driving mode in which only the first wheels 9 are driven with a variable speed at a higher-speed/lower-torque condition is suitable for non-working travel in which the vehicle travels on the road without performing work.

Hereinafter, there will be described an example of control for changing over the driving mode by the controller 31.

Figure 3:
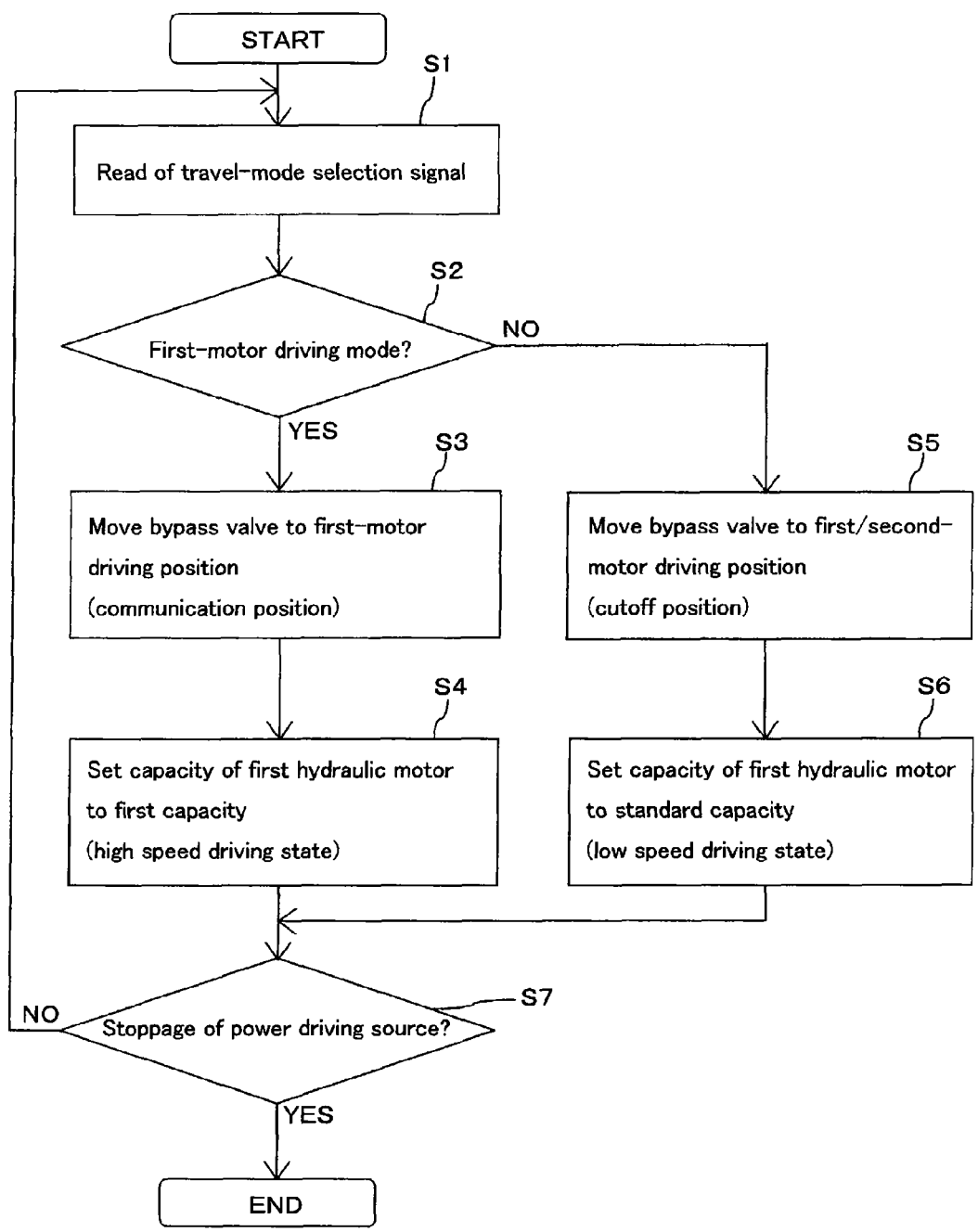
FIG. 3 is a flow chart of an example of a driving mode changeover control by a controller in the hydraulic drive vehicle according to the first embodiment.

FIG. 3 illustrates the flow of an example of control for changing over the driving mode by the controller 31.

When the controller 31 starts control for changing over the driving mode in response to the activation of the driving power source 11 (START), the controller 31 reads a travel-mode selection signal from the operating position detection sensor (Step S1) and determines whether or not the first-motor driving mode is being selected (Step S2).

If step S2 results in YES (namely, if the first-motor driving mode is being selected), the controller 31 positions the bypass valve 30 at the first-motor driving position 39a (see FIG. 1) through the bypass-valve actuating mechanism for realizing the first-motor driving mode (step S3) and, also, sets the amount of the capacity of the first hydraulic motor 14 to a first capacity, through the hydraulic-motor actuating mechanism (step S4).

Then, the controller 31 determines whether or not the driving power source 11 is being stopped (step S7). If the driving power source 11 is being operated, the controller 31 returns to step S1. If the driving power source 11 is being stopped, the controller 31 ends the control (END).

More specifically, when the bypass valve 30 is positioned at the first-motor driving position 39a in step S3, the hydraulic fluid from the hydraulic pump 12 flows from the pump/second-motor line 28a to the second-motor/first-motor line 28b through the bypass line 29 while bypassing the second hydraulic motor 13, thereby realizing the first-motor driving mode for driving only the first hydraulic motor 14 at a state where the second hydraulic motor 13 is not driven.

Further, in the first-motor driving mode, in step S4, the amount of the capacity of the first hydraulic motor 14 is set to the first capacity smaller than the standard capacity. This structure makes the capacity of the first hydraulic motor 14 relative to the hydraulic motor 12 smaller, thereby bringing the first hydraulic motor 14 into a state capable of rotating at higher speeds.

In the first-motor driving mode, the second wheels 8 function as driven wheels. Accordingly, during either of straight traveling movement and turning movement of the vehicle 1, no slippage and no drag occurs in the first wheels 8 and the second wheels 9.

Further, when the second wheels 8 function as driven wheels, the rotation of the second wheels 8 causes the second hydraulic motor 13 to exert its pumping function. However, when the bypass valve 30 is positioned at the first-motor driving position 39*a*, the suction port and the discharge port of the second hydraulic motor 13 are connected to each other. This allows the second hydraulic motor 13 to rotate in accordance with the rotation of the second wheels 8.

On the contrary, if step S2 results in NO (namely, if the first/second-motor driving mode is being selected), the controller 31 positions the bypass valve 30 at the first/second-motor driving position 39*b* (see FIG. 2) through the bypass-valve actuating mechanism for realizing the first/second-motor driving mode (step S5) and, also, sets the amount of the capacity of the first hydraulic motor 14 to the standard capacity through the hydraulic-motor actuating mechanism (step S6).

Then, the controller 31 determines whether or not the driving power source 11 is being stopped (step S7). If the driving power source 11 is operated, the controller 31 returns to step S1. If the driving power source 11 is stopped, the controller 31 ends the control (END).

More specifically, when the bypass valve 30 is positioned at the first/second-motor driving position 39*b* in step S5, the hydraulic fluid from the hydraulic pump 12 is supplied in series to the second hydraulic motor 13 and the first hydraulic motor 14, thereby realizing the first/second-motor driving mode for driving both the first hydraulic motor 14 and the second hydraulic motor 13.

Further, in the first/second-motor driving mode, in step S6, the amount of the capacity of the first hydraulic motor 14 is set to the standard capacity. Accordingly, the peripheral speed of the first wheels 9 which are operatively driven by the first hydraulic motor 14 agrees with the peripheral speed of the second wheels 8 which are operatively driven by the second hydraulic motor 13, which prevents the occurrence of slippages and drags of the first wheels 9 and the rear wheels 8 when the vehicle 1 travels straight.

Further, in the vehicle 1 according to the present embodiment, as described above, the distance L2 in the vehicle lengthwise direction between the pivot shaft 10 and the rotational center of the first wheels 9 is made equal to the distance L1 in the vehicle lengthwise direction between the pivot shaft 10 and the rotational center of the second wheels 8, thereby making the turning radius of the first wheels 9 equal to that of the second wheels 8.

Accordingly, even during turning movement of the vehicle in the first/second-motor driving mode, it is possible to prevent the occurrence of slippages and drags of the first wheels 9 and the rear wheels 8.

Second Embodiment

Hereinafter, there will be described another embodiment of the hydraulic drive vehicle according to the present invention, with reference to the attached drawings.

Figure 4:
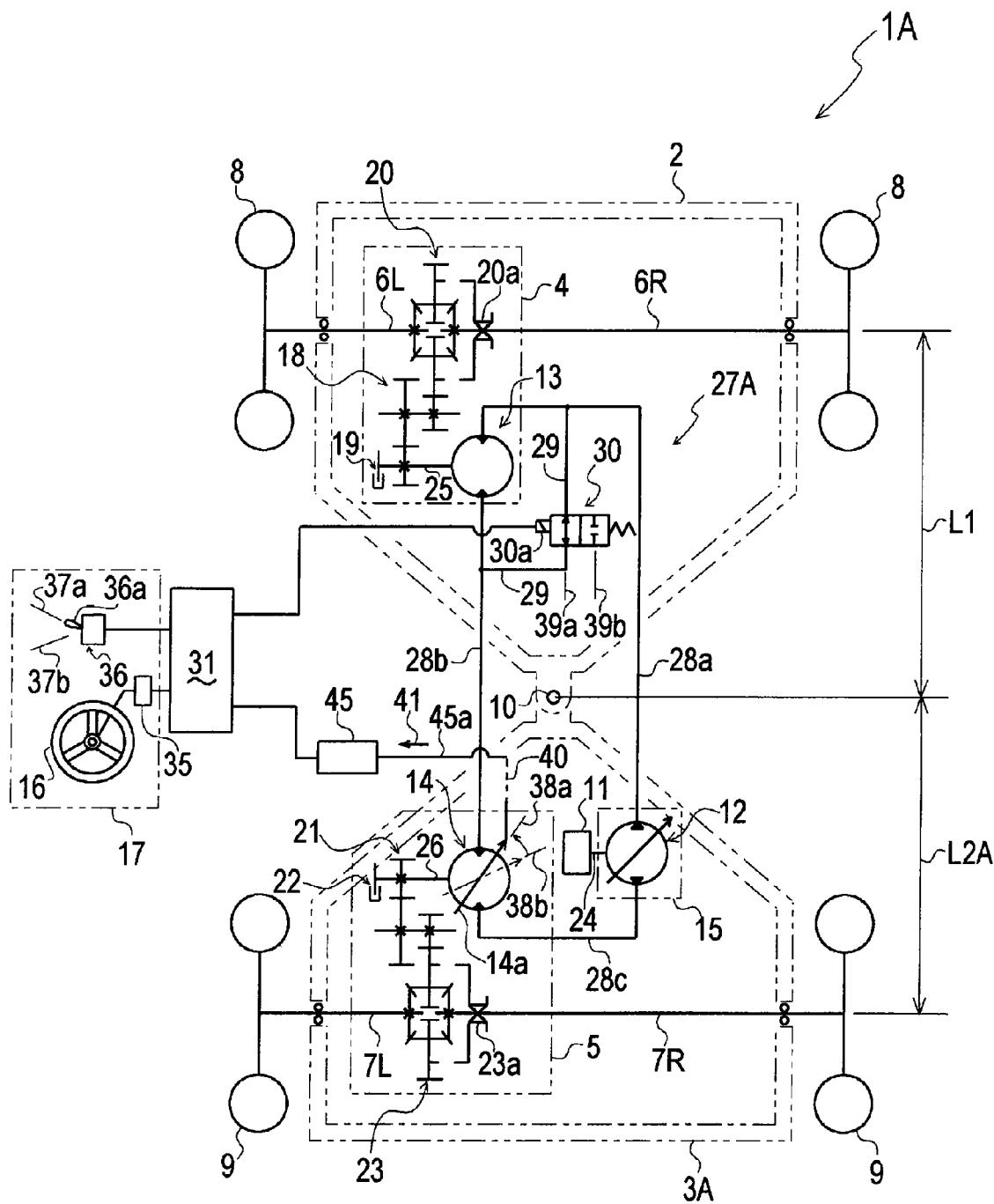
FIG. 4 is a schematic view of a power transmission in a hydraulic drive vehicle according to a second embodiment of the present invention, and shows the power transmission at a straight traveling movement of the vehicle when the first-motor driving state is selected.

FIG. 4 illustrates a schematic view of the power transmission at a state where a four-wheel hydraulic drive vehicle 1A according to the present embodiment travels straight, in the first-motor driving mode.

Figure 5:
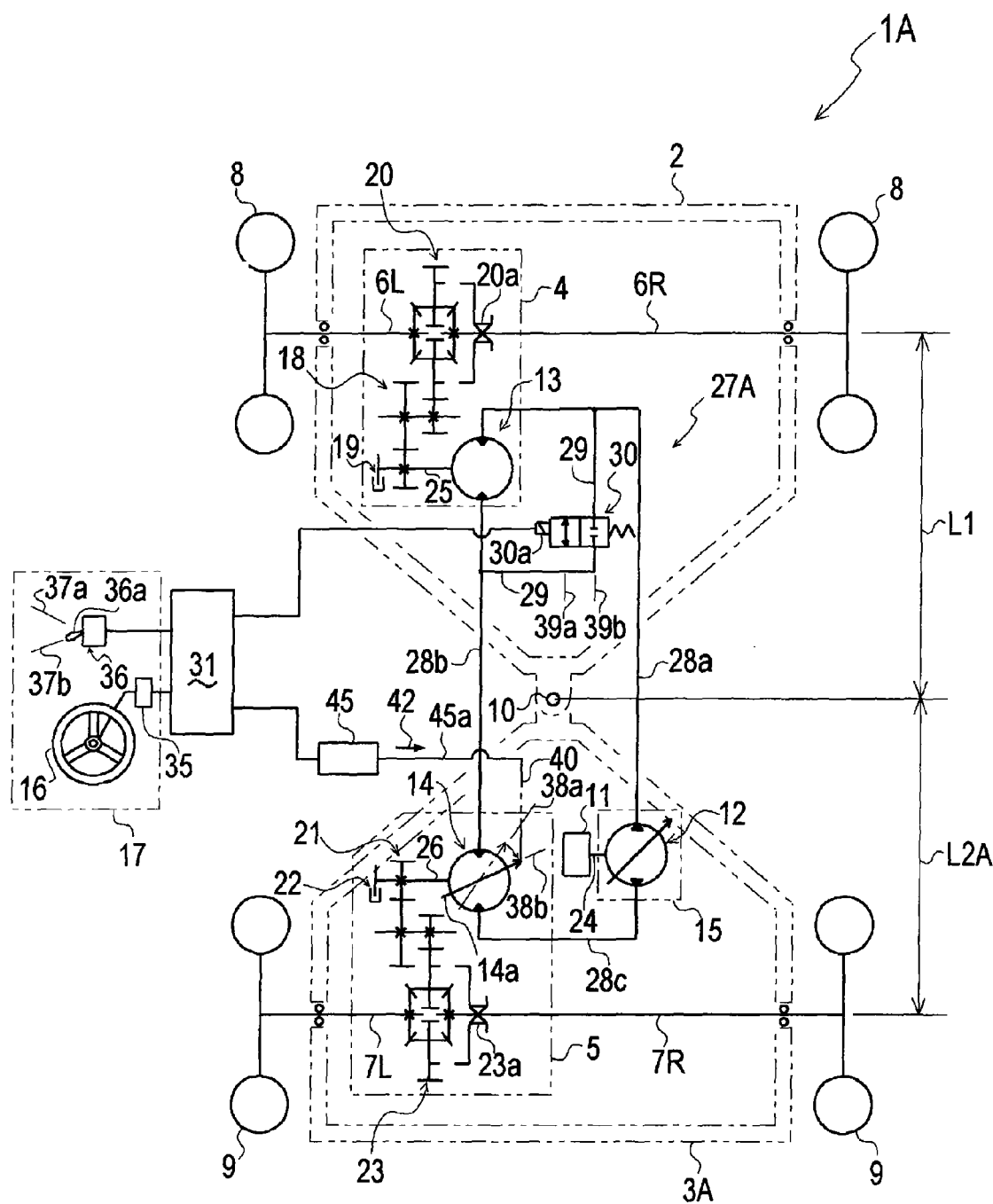
FIG. 5 is a schematic view of the power transmission in the hydraulic drive vehicle according to the second embodiment, and shows the power transmission at the straight traveling movement of the vehicle when the first/second-motor driving state is selected.
Figure 6:
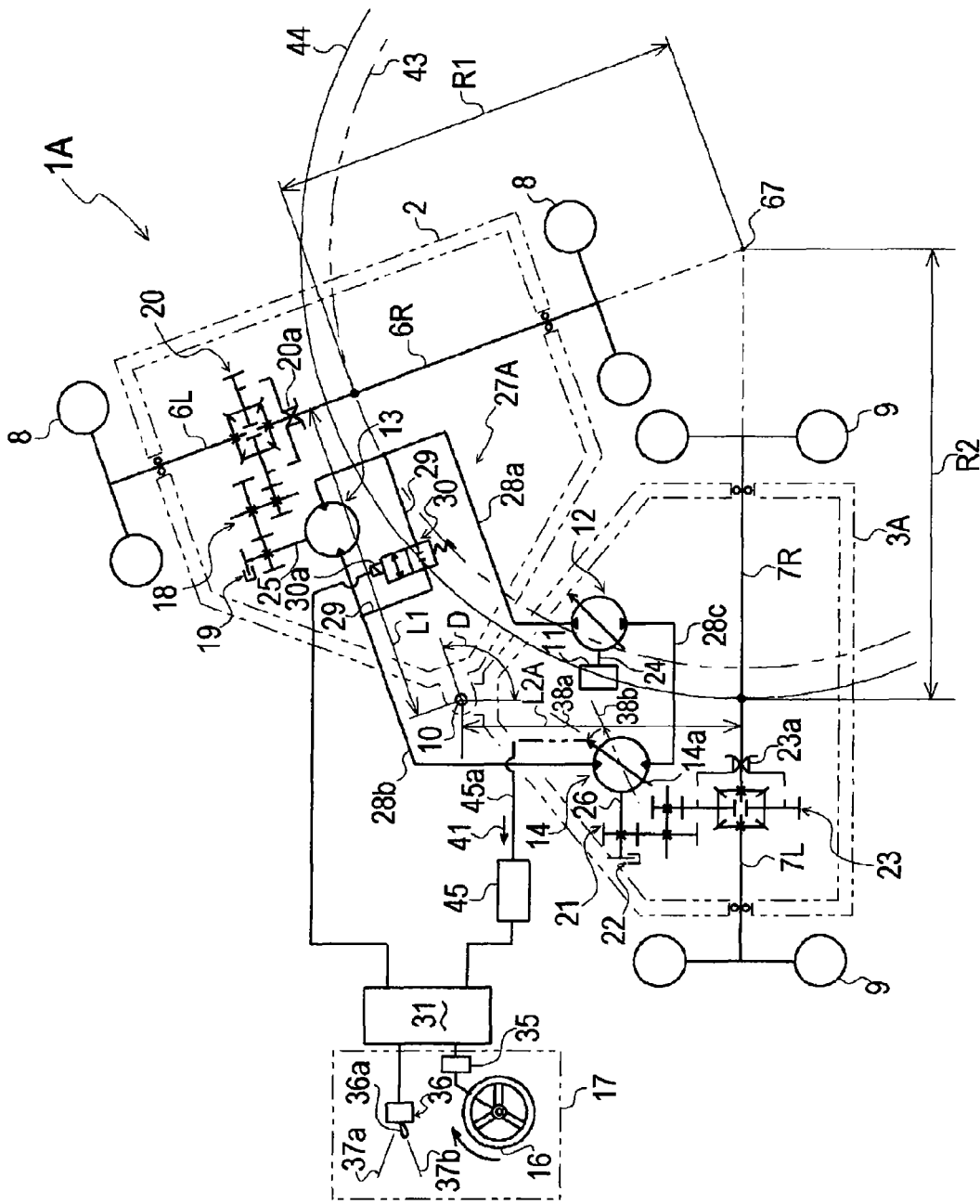
FIG. 6 is a schematic view of the power transmission in the hydraulic drive vehicle according to the second embodiment, and shows the power transmission at a turning movement of the vehicle when the first/second-motor driving state is selected.

Further, FIG. 5 and FIG. 6 illustrate schematic views of the power transmission at a state where the vehicle 1A travels straight or makes a turn, respectively, in the first/second-motor driving mode.

In the figures, the same components as those in the first embodiment will be designated by the same reference characters, and detailed description thereof will be properly omitted.

The vehicle 1A according to the first embodiment is configured so that the distance L2 in the vehicle lengthwise direction between the pivot shaft 10 and the first wheels 9L and 9R is made equal to the distance L1 in the vehicle lengthwise direction between the pivot shaft 10 and the second wheels 8L and 8R, as described above.

On the contrary, the vehicle 1A according to the present embodiment is different from the vehicle 1 according to the first embodiment, mainly in that the distance L2A in the vehicle lengthwise direction between the pivot shaft 10 and the first wheels 9L and 9R is made smaller than the distance L1 in the vehicle lengthwise direction between the pivot shaft 10 and the second wheels 8L and 8R.

More specifically, the vehicle 1A according to the present embodiment includes a first frame 3A instead of the first frame 3 with the vehicle 1 according to the first embodiment as a reference, so that the distance L2A is made smaller than the distance L1A.

By the way, there is induced a difference in turning radius between the front wheels and the rear wheels, in an articulate-type vehicle structured such that the distance in the vehicle lengthwise direction between the pivot shaft 10 and one of the front wheels and the rear wheels is different from the distance in the vehicle lengthwise direction between the pivot shaft 10 and the other of the front wheels and the rear wheels, or in a vehicle structured such that one of the front wheels and the rear wheels are used as steering wheels while the other wheels are used as non-steering wheels.

More specifically, as illustrated in FIG. 6, a turning center 67 of the vehicle 1A is located at a position where the rotation axis line of the second wheels 8 (the axis line of the second axles 6L and 6R) and the rotation axis line of the first wheels 9 (the axis line of the first axles 7L and 7R) are intersected with each other in a plan view.

The turning radius R1 of the second wheels 8 is defined by the distance from the turning center 67 to the center point between the second wheels 8 and 8 in the vehicle widthwise direction, while the turning radius R2 of the first wheels 9 is defined by the distance from the turning center 67 to the center point between the first wheels 9 and 9 in the vehicle widthwise direction.

Accordingly, in the articulate-type vehicle structured such that the first and second frames 3A and 2 are coupled in a relatively rotatable manner to each other about the pivot shaft 10 and, also, the distance L1 in the lengthwise direction between the pivot shaft 10 and the second wheels 8 is different from the distance L2A in the lengthwise direction between the pivot shaft 10 and the first wheels 9, the difference between the turning radius R2 of the first wheels 9 and the turning radius R1 of the second wheels 8 increases as the turning angle of the vehicle increases.

More specifically, in the articulate-type vehicle structured such that the distance L2A in the vehicle lengthwise direction between the pivot shaft 10 and the first wheels 9 positioned on the rear side is made smaller than the distance L1 in the vehicle lengthwise direction between the pivot shaft 10 and the second wheels 8 positioned on the front side as in the present embodiment, the turning radius R2 of the first wheels 9 becomes greater than the turning radius R1 of the first wheels 8 as the turning angle of the vehicle increases and, therefore, a length of the passage trajectory through which the first wheels 9 pass during the turning movement of the vehicle becomes larger than that of the second wheels 8 during the same.

On the contrary, in an articulate-type vehicle structured such that the distance L2A in the vehicle lengthwise direction between the pivot shaft 10 and the first wheels 9 positioned on the rear side is larger than the distance L1 in the vehicle lengthwise direction between the pivot shaft 10 and the second wheels 8 positioned on the front side, the turning radius R2 of the first wheels 9 becomes smaller than the turning radius R1 of the first wheels 8 as the turning angle of the vehicle increases and, therefore, the length of the passage trajectory of the first wheels 9 during the turning movement of the vehicle becomes smaller than that of the second wheels 8 during the same.

Further, in a vehicle having front wheels as steering wheels, a turning radius of the front wheels becomes larger than that of the rear wheels as the turning angle of the vehicle increases and, therefore, the length of the passage trajectory of the front wheels during the turning movement of the vehicle becomes larger than that of the rear wheels during the same.

In order to drive both the front wheels and the rear wheels without inducing slippages and drags in the front wheels and the rear wheels in such a vehicle which induces a difference in turning radius between the front wheels and the rear wheels, it is necessary to create a speed difference between a driving speed for the front wheels and a driving speed for the rear wheels, according to the tuning radius of the vehicle.

To cope with this point, the vehicle 1A according to the present embodiment is structured to change the capacity of the first hydraulic motor 14 according to the turning angle of the vehicle when the first/second-motor driving mode is selected.

More specifically, the vehicle 1A further includes a turning-angle sensor 35 for detecting the turning angle of the vehicle in comparison with the vehicle 1 according to the first embodiment, and the controller 31 is structured to control the operation of the hydraulic-motor actuating mechanism according to the turning angle of the vehicle based on a signal from the turning-angle sensor 35 for changing the amount of the capacity of the first hydraulic motor 14, in the first/second driving mode.

In the present embodiment, the turning-angle sensor 35 takes the form of a handle-angle sensor for detecting the angle by which the steering operation member 16 has been steered. However, instead thereof, the turning-angle sensor 35 can be structured to detect the angle by which the first frame 3A and the second frame 2 have been rotated with respect to each other.

Hereinafter, there will be described an example of control for changing over the driving mode by the controller 31 in the vehicle 1A according to the present embodiment.

Figure 7:
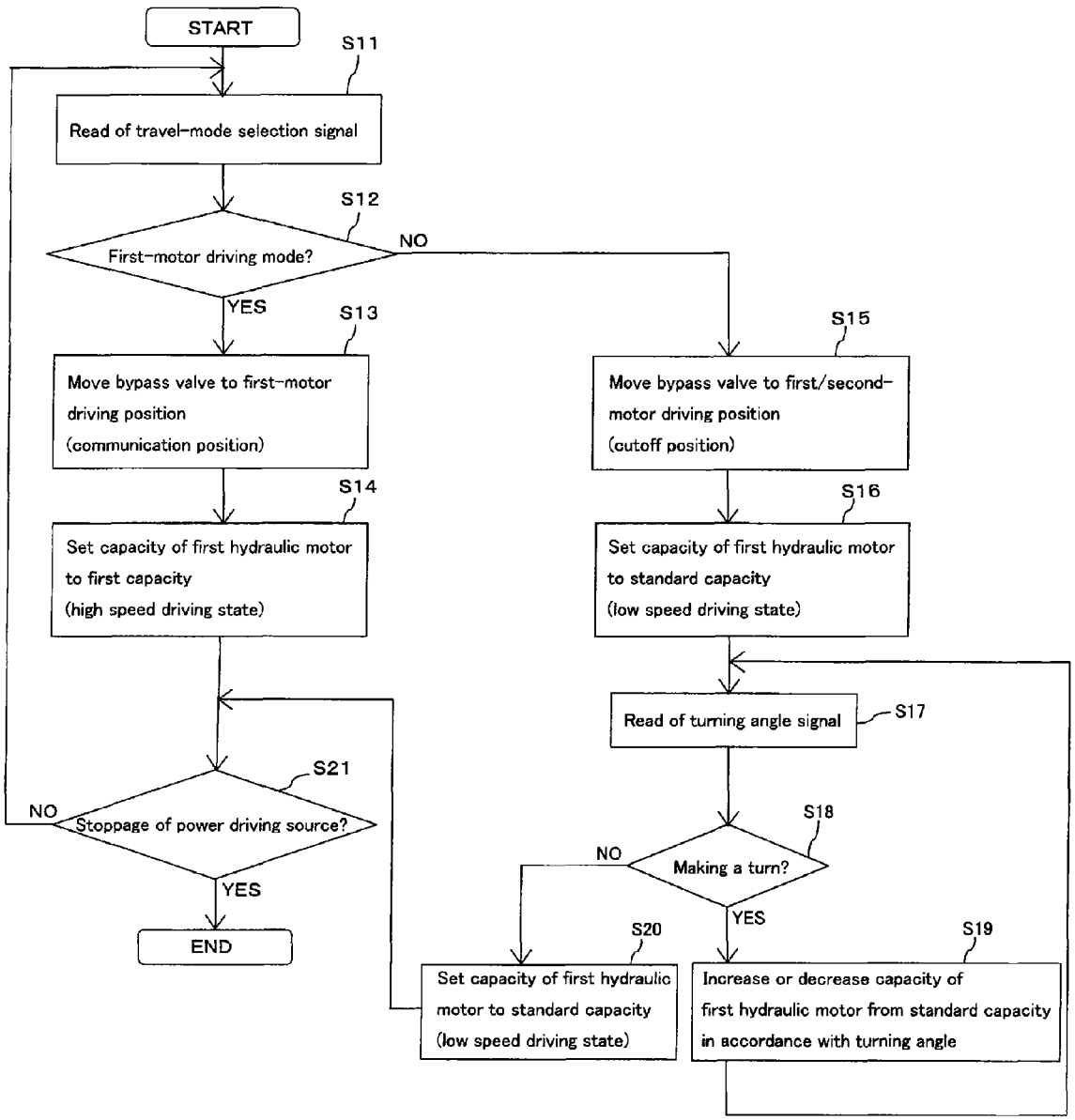
FIG. 7 is a flow chart of an example of a driving mode changeover control by a controller in the hydraulic drive vehicle according to the second embodiment.

FIG. 7 illustrates the flow of an example of control for changing over the driving mode by the controller 31 in the vehicle 1A.

When the controller 31 starts control for changing over the driving mode in response to the activation of the driving power source 11 (START), the controller 31 reads a travel-mode selection signal from the operating position detection sensor (step S11) and determines whether or not the first-motor driving mode is being selected (step S12).

If step S12 results in YES (namely, if the first-motor driving mode is being selected), the controller 31 positions the bypass valve 30 at the first-motor driving position 39a (see FIG. 4) through the bypass-valve actuating mechanism for realizing the first-motor driving mode (step S13) and, also, sets the amount of the capacity of the first hydraulic motor 14 to the first capacity through the hydraulic-motor actuating mechanism (step S14).

Then, the controller 31 determines whether or not the driving power source 11 is being stopped (step S21). If the driving power source 11 is being operated, the controller 31 returns to step S11. If the driving power source 11 is being stopped, the controller 31 ends the control (END).

On the contrary, if step S12 results in NO (namely, if the first/second-motor driving mode is being selected), the controller 31 positions the bypass valve 30 at the first/second-motor driving position 39b (see FIG. 5 and FIG. 6) through the bypass-valve actuating mechanism for realizing the first/second-motor driving mode (step S15) and, also, sets the amount of the capacity of the first hydraulic motor 14 to the standard capacity through the hydraulic-motor actuating mechanism (step S16).

Thereafter, the controller 31 reads a turning angle signal from the turning-angle sensor 35 (step S17) and determines whether or not the vehicle is making a turn (step S18).

If step S18 results in YES (namely, if the vehicle is being made a turn), the controller 31 controls the hydraulic-motor actuating mechanism, such that the amount of the capacity of the first hydraulic motor 14 is increased or decreased from the standard capacity, by an amount corresponding to the turning angle of the vehicle (step S19).

In the vehicle 1A according to the present embodiment, as described above, the turning radius R2 of the first wheels 9 which are operatively driven by the first hydraulic motor 14 becomes larger than the turning radius R1 of the second wheels 8, according to the turning angle of the vehicle.

Accordingly, in step S19, the controller 31 controls the hydraulic-motor actuating mechanism, such that the amount of the capacity of the hydraulic motor 14 decreases from the standard capacity by an amount corresponding to the turning angle of the vehicle.

This structure makes it possible to make a driving speed of the first wheels 9 whose turning radius increase as the turning angle of the vehicle increases higher than that of the second wheels 8, thereby preventing the occurrence of slippages or drags in the first and/or second wheels during the turning movement of the vehicle in the first/second-motor driving mode.

In the present embodiment, as described above, in the first-motor driving state, the amount of the capacity of the first hydraulic motor 14 is set to the first capacity smaller than the standard capacity.

Preferably, the first capacity is set to a capacity corresponding to a driving speed to be outputted from the first hydraulic motor 14 when the vehicle makes a turn to a maximum extent in the first/second motor driving mode and, also, the controller 31 operates the hydraulic-motor actuating mechanism, in step S19, such that the amount of the capacity of the first hydraulic motor 14 is changed from the standard capacity to the first capacity as the turning angle of the vehicle changes from 0 to a maximum angle.

The preferable structure makes it possible to achieve a high-speed travel in the first-motor driving mode and also a prevention of slippages and drags of the wheels during the straight traveling movement and the turning movement of the vehicle in the first/second-motor driving mode, while simplifying the structure of the motor-side capacity adjustment mechanism 14a and the control by the controller 31.

In a case where the turning radius R2 of the first wheels 9 which are operatively driven by the first hydraulic motor 14 becomes smaller than the turning radius R1 of the second wheels 8 in accordance with the turning angle of the vehicle, it is of cause that the controller 31 controls the hydraulic-motor actuating mechanism, in step S19, such that the amount of the capacity of the first hydraulic motor 14 is increased from the standard capacity by an amount corresponding to the turning angle of the vehicle.

In this case, the motor-side capacity adjustment mechanism 14a is structured so as to change the amount of the capacity of the first hydraulic motor 14 between the first capacity smaller than the standard capacity and a second capacity which is larger than the standard capacity and which corresponds to the driving speed to be outputted from the first hydraulic motor 14 when the vehicle makes a turn to the maximum extent.

After the processing in step S19, the controller 31 performs the processing in step S17 and step S18, again. If step S18 results in NO (namely, if the vehicle is traveling straight), the controller 31 operates the hydraulic-motor actuating mechanism such that the amount of the capacity of the first hydraulic motor 14 becomes the standard capacity (step S20).

Then, the controller 31 determines whether or not the driving power source 11 is being stopped (step S7). If the driving power source 11 is being operated, the controller 31 returns to step S11. If the driving power source 11 is being stopped, the controller 31 ends the control (END).

Third Embodiment

Hereinafter, there will be described still another embodiment of the hydraulic drive vehicle according to the present invention, with reference to the attached drawings.

Figure 8:
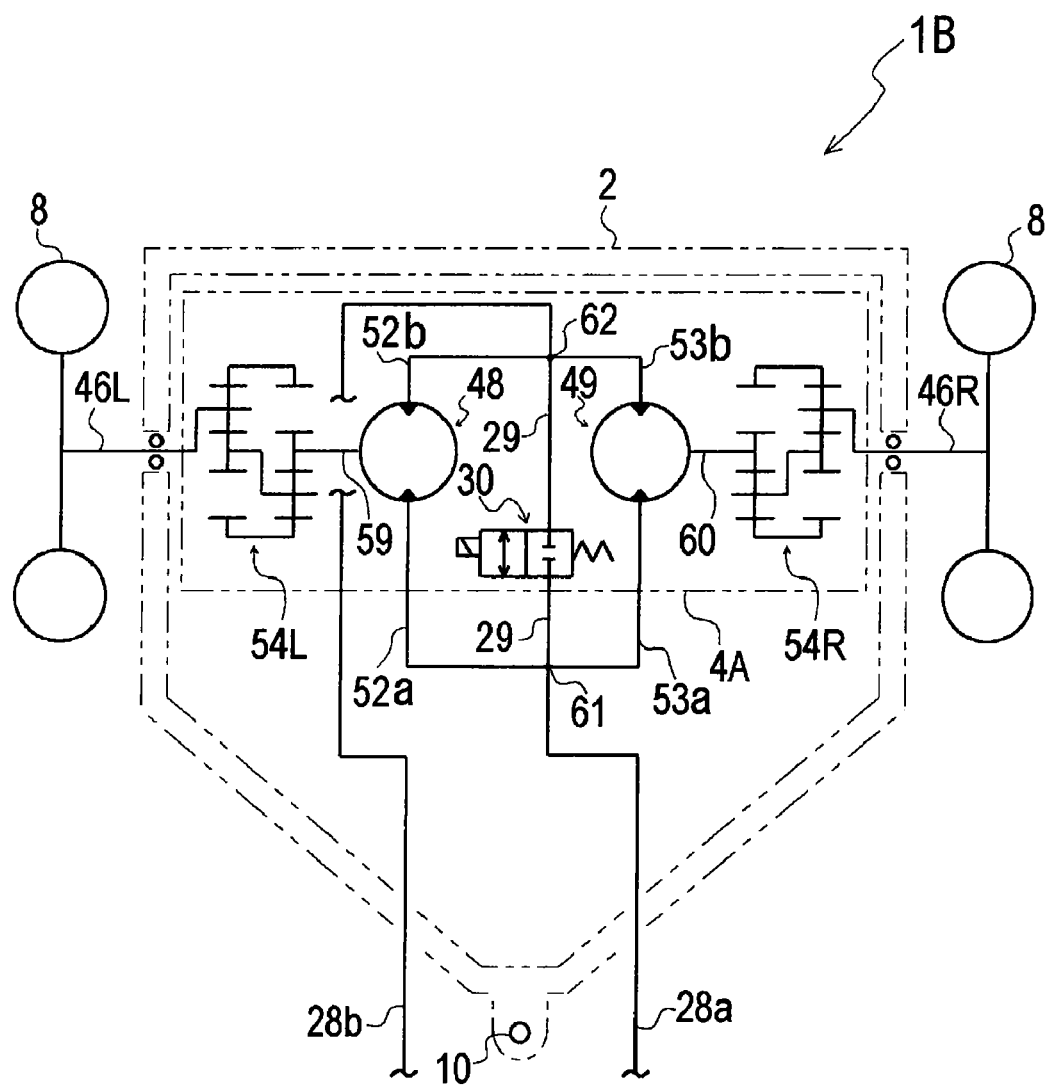
FIG. 8 is a partial schematic view of a power transmission in a hydraulic drive vehicle according to a third embodiment of the present invention.

FIG. 8 illustrates a partial schematic view of the power transmission in a vehicle 1B according to the present embodiment.

In the drawing, the same components as those in the first and second embodiments will be designated by the same reference characters, and detailed description thereof will be properly omitted.

As illustrated in FIG. 8, the vehicle 1B according to the present embodiment includes a second axle-driving device 4A instead of the second axle-driving device 4 in comparison with the vehicle 1 or 1A according to the first or second embodiment.

The second axle-driving device 4 in the first and second embodiments is structured to drive the pair of second wheels 8 by the single second hydraulic motor 13, as described above.

Namely, the second axle-driving device 4 includes the single fixed-displacement type hydraulic motor 13, and the mechanical differential device 20 which differentially transmits the rotational power from the hydraulic motor 13 to the pair of second wheels 8.

On the contrary, the second axle-driving device 4A includes a pair of left and right fixed-displacement type second hydraulic motors 48 and 49 for operatively driving the pair of second wheels 8, respectively, and is structured such that the pair of second hydraulic motors 48 and 49 differentially drive the pair of second wheels 8 by utilizing hydraulic pressures.

More specifically, in the present embodiment, as illustrated in FIG. 8, the pump/second-motor line 28a whose first end fluidly connected to the hydraulic pump 12 is modified to have a second end branched into a left-side line 52a and a right-side line 53a at a branch point 61. The left-side and right-side lines 52a and 53a are fluidly connected to the pair of left and right second hydraulic motors 48 and 49, respectively.

Further, the second-motor/first-motor line 28b whose first end fluidly connected to the first hydraulic motor 14 is modified to have a second end branched into a left-side line 52b and a right-side line 53b at a branch point 62. The left-side and right-side lines 52b and 53b are fluidly connected to the pair of left and right second hydraulic motors 48 and 49, respectively.

As described above, in the present embodiment, the pair of second hydraulic motors 48 and 49 are fluidly connected in parallel to the hydraulic pump 12 and the first hydraulic motor 14.

Accordingly, the hydraulic fluid from the hydraulic pump 12 is distributed and supplied to the pair of second hydraulic motors 48 and 49 according to the loads on the pair of left and right second wheels 8, thereby differentially driving the pair of second wheels 8.

Namely, when the vehicle makes a turn, the passage trajectory of one (hereinafter, referred to as a inner wheel in turning) of the pair of second wheels 8 which is positioned on an inner side with the turning center as a reference is shorter than the passage trajectory of other one (hereinafter, referred to as a outer wheel in turning) of the pair of second wheels 8 which is positioned on an outer side with the turning center as a reference, so that the rotational load on the inner wheel in turning is larger than that on the outer wheel in turning.

Accordingly, the amount of the hydraulic fluid supplied from the hydraulic pump 12 to one (hereinafter, referred to as the outer second hydraulic motor in turning) of the pair of second hydraulic motors 48 and 49 that drives the outer wheel in turning becomes larger than the amount of the hydraulic fluid supplied to the other second hydraulic motor (hereinafter, referred to as a second hydraulic motor in turning) that drives the inner wheel in turning. Therefore, the outer second hydraulic motor in turning is rotated at a higher speed than the inner second hydraulic motor in turning.

Thus, when the vehicle makes a turn, it is possible to drive both the pair of second wheels 8 with the pair of second hydraulic motors 48 and 49, without inducing slippages and drags of the pair of second wheels 8.

Further, in a case where the pair of second wheels 8 are operatively driven by the pair of second hydraulic motors 48 and 49 which are fluidly connected in parallel to the hydraulic pump 12 and the first hydraulic motor 14 as in the present embodiment, the capacities of the pair of second hydraulic motors 48 and 49 are set to half the fixed capacity in order to make the total sum of the amounts of the capacities of the pair of second hydraulic motors 48 and 49 equal to the fixed capacity of the second hydraulic motor 13.

Further, in the present embodiment, the bypass line 29 fluidly connects the pump/second-motor line 28a and the second-motor/first-motor line 28b, and the bypass valve 30 is inserted in the bypass line 29, similarly to in the respective embodiments.

Further, in the present embodiment, the second axle-driving device 4A includes a pair of left and right speed reduction mechanisms 54L and 54R for reducing speeds of the rotational outputs of the pair of second hydraulic motors 48 and 49 with the same speed reduction ratio, and the rotational powers which have been reduced in speed by the pair of speed reduction mechanisms 54L and 54R are transmitted to a pair of left and right second axles 46L and 46R.

The speed reduction mechanisms 54L and 54R may each include planetary speed reduction devices which are connected in series.

As a matter of cause, in the case of using the second axle-driving device 4A in combination with the first axle-driving device 5, the speed reduction ratios of the speed reduction mechanisms included in the first and second axle-driving devices are set, such that the peripheral speed of the first wheels 9 agrees with the peripheral speed of the second wheels 8 during the straight traveling of the vehicle.

Further, in the vehicles according to the respective embodiments, it is also possible to employ a first axle-driving device 5A including a pair of variable-displacement type first hydraulic motors 50 and 51 for driving the pair of first wheels 9 instead of the first axle-driving device 5 including the single variable-displacement type first hydraulic motor 14 and the differential device 23.

Figure 9:
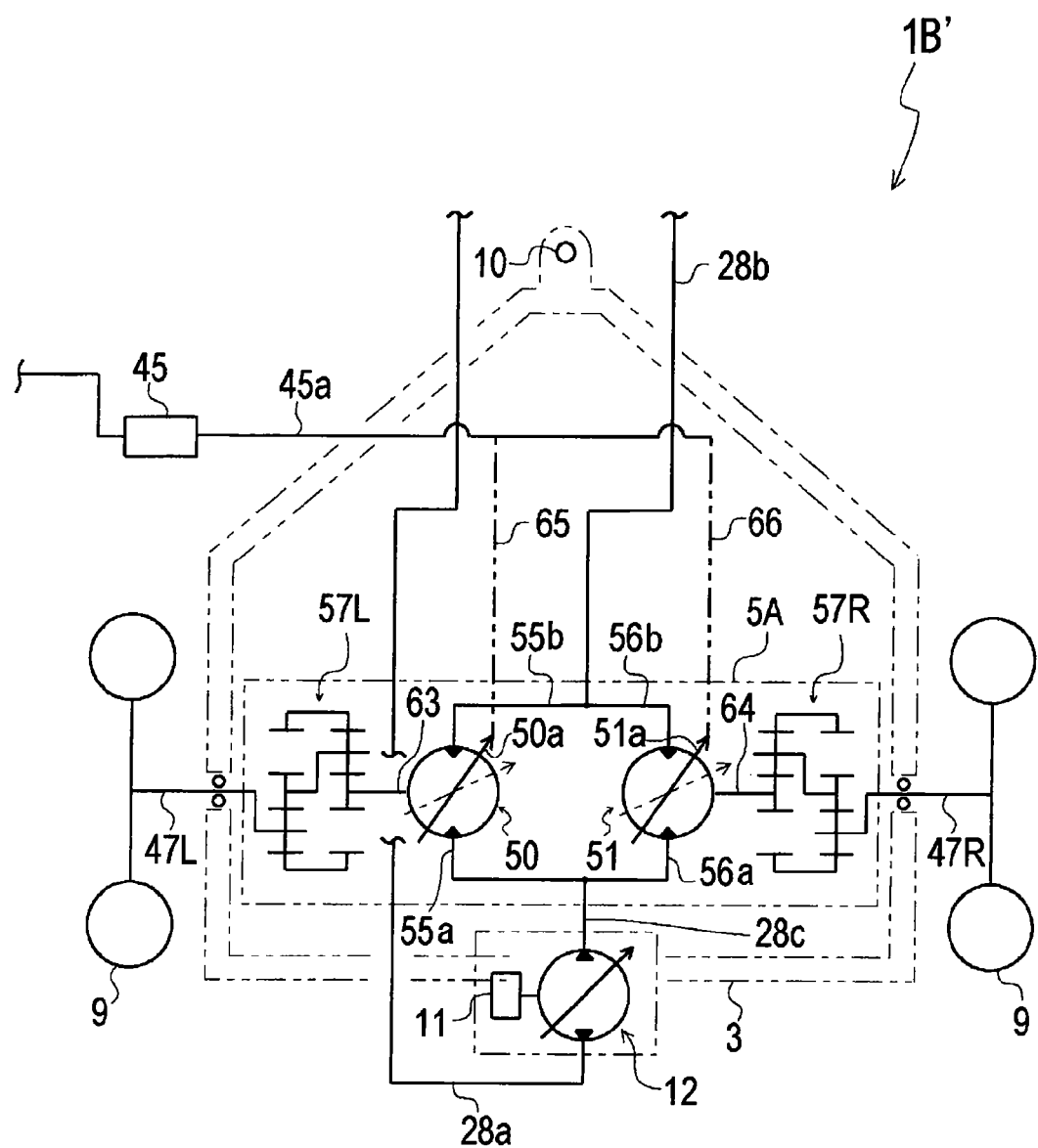
FIG. 9 is a partial schematic view of a power transmission in a hydraulic drive vehicle according to a modified embodiment of the present invention.

FIG. 9 illustrates a partial schematic view of the power transmission in a vehicle 1B' including the first axle-driving device 5A.

In the figure, the same components as those in the respective embodiments will be designated by the same reference characters, and detailed description thereof will be properly omitted.

As illustrated in FIG. 9, the first axle-driving device 5A includes a pair of left and right variable-displacement type first hydraulic motors 50 and 51 for operatively driving the pair of first wheels 9 and is structured such that the pair of first hydraulic motors 50 and 51 differentially drive the pair of first wheels 9 utilizing hydraulic pressures.

More specifically, in the vehicle 1B' including the first axle-driving device 5A, as illustrated in FIG. 9, the second-motor/first-motor line 28b whose first end fluidly connected to the second hydraulic motor 13 (or the pair of second hydraulic motors 48 and 49) is modified to have a second end branched into a left-side line 55a and a right-side line 56a. The left-side and right-side lines 55a and 56a are fluidly connected to the pair of left-side and right-side first hydraulic motors 50 and 51, respectively.

Further, the first-motor/pump line 28c whose first end fluidly connected to the hydraulic pump 12 is modified to have a second end branched into a left-side line 55b and a right-side line 56b. The left-side and right-side lines 55b and 56b are fluidly connected to the pair of left and right first hydraulic motors 50 and 51, respectively.

As described above, in the present embodiment, the pair of first hydraulic motors 50 and 51 are fluidly connected in parallel to the hydraulic pump 12 and the second hydraulic motor 13 (or the pair of second hydraulic motors 48 and 49).

Accordingly, the hydraulic fluid supplied directly or indirectly from the hydraulic pump 12 is distributed and supplied to the pair of first hydraulic motors 50 and 51 according to the loads on the pair of left and right first wheels 9, thereby differentially driving the pair of first wheels 9 utilizing hydraulic pressures.

Further, as in the vehicle 1B' illustrated in FIG. 9, in the case where the pair of first wheels 9 are operatively driven by the pair of first hydraulic motors 50 and 51 which are fluidly connected in parallel to the hydraulic pump 12 and the first hydraulic motor 14 (or the pair of second hydraulic motors 48 and 49, the amounts of the capacities of the pair of first hydraulic motors 50 and 51 are set to half the amount of the capacity of the first hydraulic motor 14, in order to make the total sum of the amounts of the capacities of the pair of first hydraulic motors 50 and 51 during the straight traveling movement equal to the amount of the capacity of the first hydraulic motor 14 during the same.

Namely, respective standard capacities of the pair of first hydraulic motors 50 and 51 are set to half the standard capacity of the first hydraulic motor 14.

Accordingly, respective first capacities of the pair of first hydraulic motors 50 and 51 are set to half the first capacity of the first hydraulic motor 14.

Further, the motor-side capacity adjustment mechanisms 50a and 51a of the pair of first hydraulic motors 50 and 51 are operated in a synchronized manner to each other by the hydraulic-motor actuating mechanism 45.

Further, the first axle-driving device 5A illustrated in FIG. 9 includes a pair of left and right speed reduction mechanisms 57L and 57R for reducing the speeds of the rotational outputs from the pair of first hydraulic motors 50 and 51, and the rotational powers which have been reduced in speed by the pair of speed reduction mechanisms 57L and 57R are transmitted to a pair of left and right first axles 47L and 47R.

Further, the speed reduction mechanisms 57L and 57R may each include two planetary speed reduction devices which are connected in series to each other.

Further, in the case of using the first axle-driving device 5A illustrated in FIG. 8 in combination with the second axle-driving device 4A, the four hydraulic motors included in the first axle-driving device 5A and the second axle-driving device 4A can have the same structure, except the difference between the variable-displacement type and the fixed-displacement type, and the four speed reduction mechanisms included in the axle-driving devices can also have the same structure.

Fourth Embodiment

Hereinafter, another embodiment of a hydraulic drive vehicle according to the present invention will be described, with reference to the attached drawings.

A vehicle 1C according to the present embodiment includes a hydraulic-motor actuating mechanism 145 instead of the hydraulic-motor actuating mechanism 45.

More specifically, the hydraulic-motor actuating mechanism 45 in the respective embodiments is structured so as to be controlled in operation by the controller 31 in either case of actuating the motor-side capacity adjustment mechanism 14a (or 50a, 51a) when changing over the driving mode and actuating the motor-side capacity adjustment mechanism 14a (or 50a, 51a) during the turning movement of the vehicle in the first/second-motor driving mode.

Namely, the hydraulic-motor actuating mechanism 45 is structured so as to actuate the motor-side capacity adjustment mechanism 14a (or 50a, 51a), by being controlled in operation by the controller 31, based on a electric signal from the operating position detection sensor which detects a position to which the driving-mode changeover operation member 36 has been operated, in changing over the driving mode. Further, the hydraulic-motor actuating mechanism 45 is structured so as to actuate the motor-side capacity adjustment mechanism 14a (or 50a, 51a), by being controlled in operation by the controller 31, based on a electric signal from the turning-angle sensor 35, during the turning movement of the vehicle, in the first/second-motor driving mode.

On the contrary, the hydraulic-motor actuating mechanism 145 in the present embodiment is structured so as to actuate the motor-side capacity adjustment mechanism 14a (or 50a, 51a) by using the mechanical movement of the steering operation member 16 during the turning movement of the vehicle in the first/second-motor driving mode, while actuating the motor-side capacity adjustment mechanism 14a (or 50a, 51a) by using the electric signal corresponding to the position to which the driving-mode changeover operation member 36 has been operated in changing over the driving mode.

Figure 10:
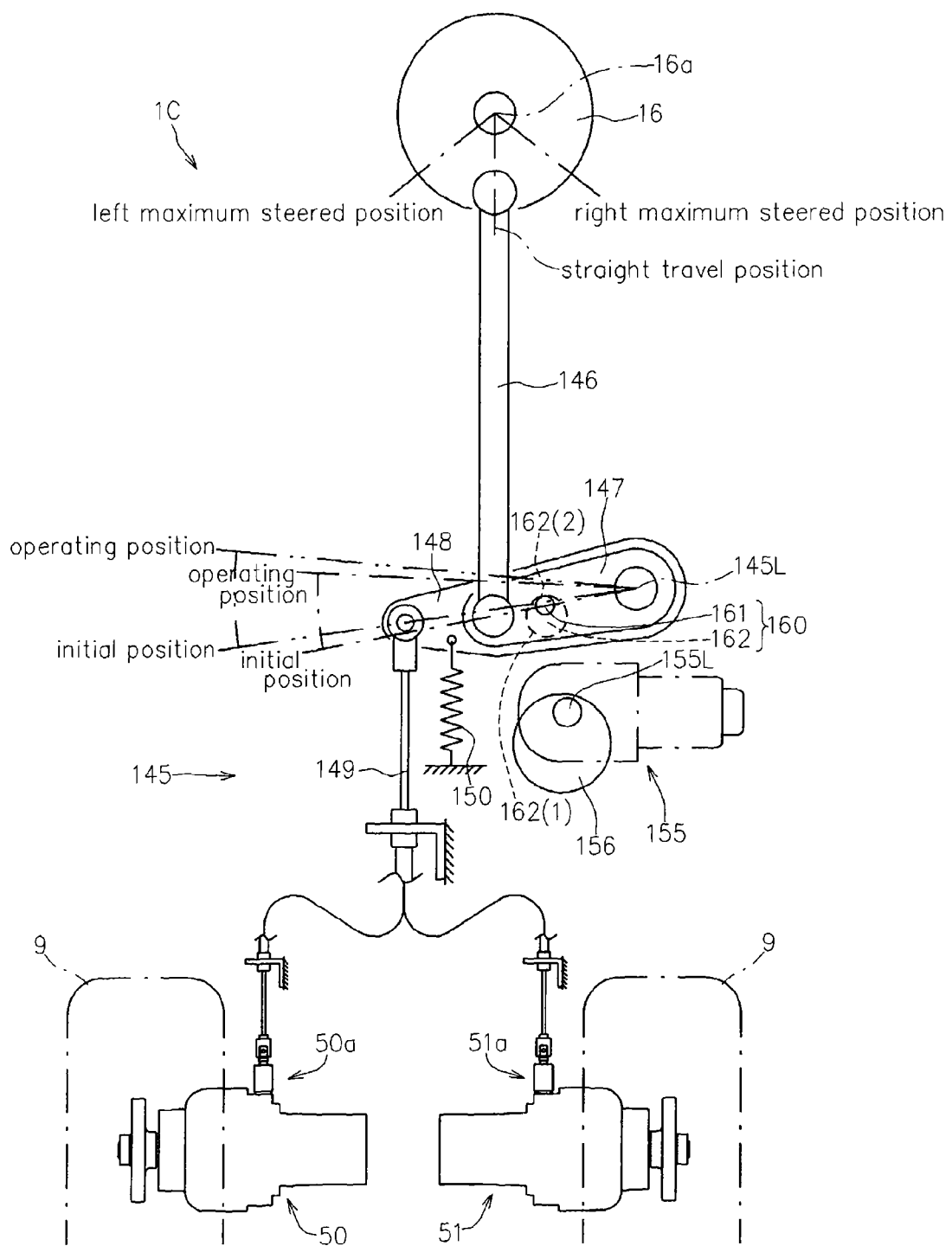
FIG. 10 is a schematic view of a hydraulic-motor actuating mechanism in a hydraulic drive vehicle according to a fourth embodiment of the present invention, and shows the schematic view at the straight traveling movement of the vehicle when the first/second-motor driving state is selected.

FIG. 10 illustrates a schematic view of the hydraulic-motor actuating mechanism 145.

In the drawing, the same components as those in the embodiments will be designated by the same reference characters, and detailed description thereof will be properly omitted.

The hydraulic-motor actuating mechanism 145 is applied to a vehicle that includes the steering operation member 16 capable of being manually operated in such a way as to be rotated about a steering operation axis line 16a for performing the turning movement of the vehicle, the vehicle being structured such that the turning radius of the first wheels 9 becomes larger than the turning radius of the second wheels 8 as the turning angle of the vehicle increases.

More specifically, as illustrated in FIG. 10, the hydraulic-motor actuating mechanism 145 includes an input-side actuating arm 147 capable of swinging between an initial position and an actuating position about a swing reference axis line 145L, an output-side actuating arm 148 capable of swinging between an initial position and an actuating position about the swing reference axis line 145L independently of the input-side actuating arm 147, an input-side link 146 which operatively couples the steering operation member 16 and the input-side actuating arm 147 to each other, an output-side link 149 which operatively couples the output-side actuating arm 148 and the capacity adjustment mechanism 14a (or 50a, 51a) to each other, a biasing member 150 which biases the output-side actuating arm 148 toward the initial position about the swing reference axis line 145L, and an electric motor 155 which acts on the output-side actuating arm 148.

The electric motor 155 is structured so as to be in an operating state and in a non-operating state when the bypass valve 30 is positioned at the first-motor driving position 39a and the a first/second-motor driving position 39a, respectively, based on a manual operation on the changeover operation member 36.

Figure 11:
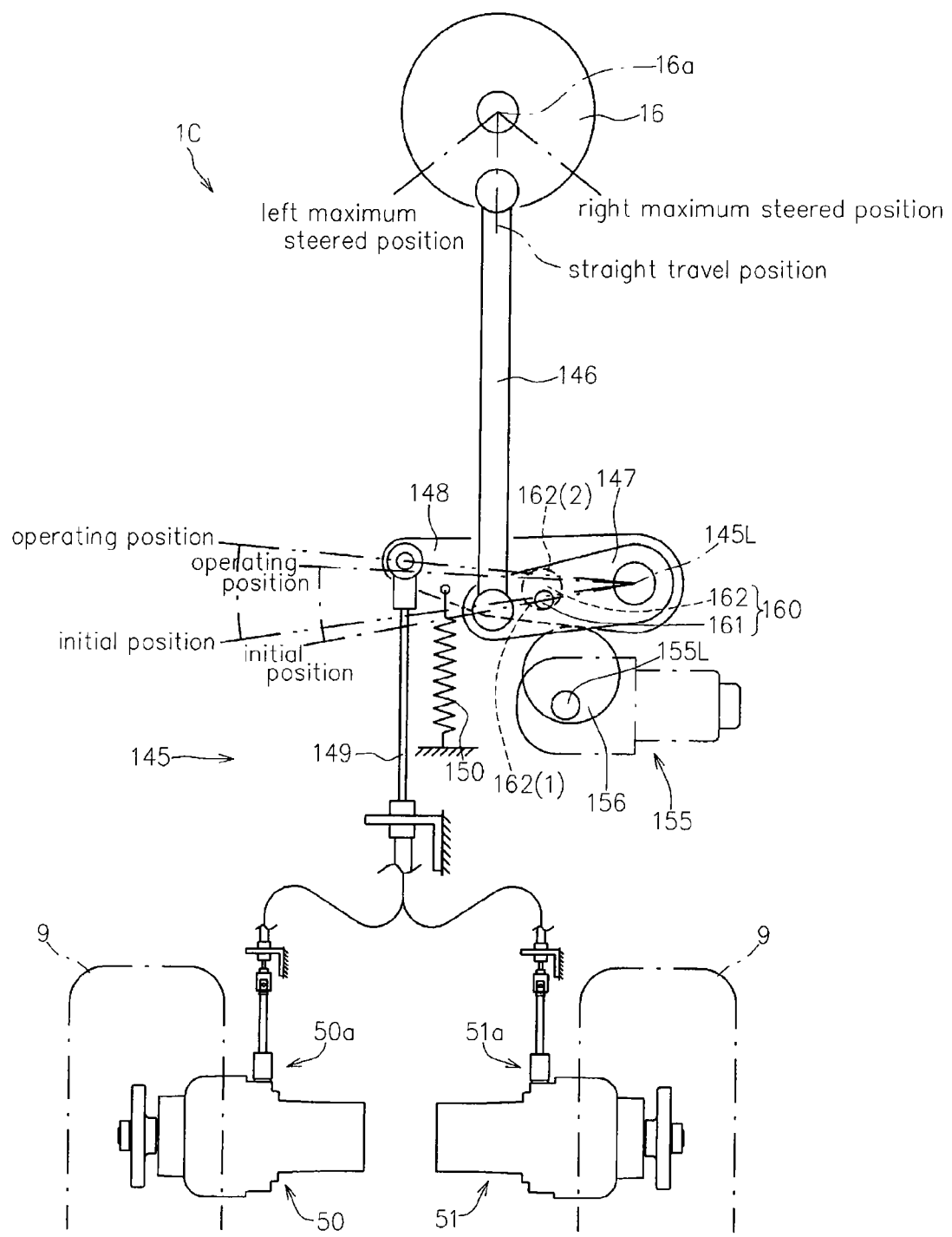
FIG. 11 is a schematic view of the hydraulic-motor actuating mechanism shown in FIG. 10, and shows the schematic view at the straight traveling movement of the vehicle when the first-motor driving state is selected.

FIG. 11 illustrates a schematic view of the hydraulic-motor actuating mechanism 145 at a state where the electric motor 155 is in the operating state.

More specifically, the electric motor 155 is structured such that, in the operating state, the electric motor 155 presses the output-side actuating arm 148 toward the operating position from the initial position against a biasing force of the biasing member 150 about the swing reference axis line 145L as illustrated in FIG. 11 and, in the non-operating state, the electric motor 155 allows the output-side actuating arm 148 to be positioned at the initial position due to the biasing force of the biasing member 150, as illustrated in FIG. 10.

In the present embodiment, the electric motor 155 includes a cam actuating member 156 which can be rotated only in one direction about a rotation reference axis line 155L, the cam actuating member 156 being capable of taking an initial position illustrated in FIG. 10 and an operating position illustrated in FIG. 11.

As illustrated in FIG. 10 and FIG. 11, the input-side link 146 operatively couples the steering operation member 16 and the input-side actuating arm 147 to each other so as to have the input-side actuating arm 147 positioned at the initial position at the time when the steering operation member 16 is positioned at a straight travel position about the steering operation axis line 16a and to have the input-side actuating arm 147 swung from the initial position toward the operating position by an angle corresponding to the amount by which the steering operation member 16 has been operated at the time when the steering operation member 16 is operated from the straight travel position about the steering operation axis line 16a in either of one and the other directions.

In the present embodiment, the input-side link 146 has a first end operatively coupled to a portion of the steering operation member 16 which is closest to the input-side actuating arm 147 when the steering operation member 16 is positioned at the straight travel position and has a second end operatively coupled to a free end of the input-side actuating arm 147.

The output-side link 149 operatively couples the output-side actuating arm 148 and the capacity adjustment mechanism 14a (or 50a or 51a), such that the capacity of the first hydraulic motor 14 (or 50, 51) is changed between the standard capacity and the first capacity, according to the swing of the output-side actuating arm 148 between the initial position and the operating position.

Namely, the output-side link 149 operatively couples the output-side actuating arm 148 and the capacity adjustment mechanism 14a (or 50a or 51a) to each other, such that the capacity of the first hydraulic motor 14 (or 50, 51) becomes the standard capacity when the electric motor 155 is in the non-operating state and thus the output-side actuating arm 148 is positioned at the initial position (see FIG. 10), and the capacity of the first hydraulic motor 14 (or 50, 51) becomes the first capacity when the electric motor 155 is in the operating state and thus the output-side actuating arm 148 is positioned at the operating position (see FIG. 11).

In the present embodiment, the output-side link 149 is embodied by a push-pull wire.

Further, the input-side and output-side actuating arms 147 and 148 are provided with a conjunction/constraint mechanism 160 which causes the output-side actuating arm 148 to swing from the initial position to the operating position according to the swing of the input-side actuating arm 147 from the initial position to the operating position and, also, allows only the output-side actuating arm 148 to swing from the initial position to the operating position through the electric motor 155 while maintaining the input-side actuating arm 147 positioned at the initial position.

In the present embodiment, as illustrated in FIG. 10 and FIG. 11, the conjunction/constraint mechanism 160 includes an engagement pin 161 provided at the input-side actuating arm 147, and an engagement hole 162 provided at the output-side actuating arm 148 in which the engagement pin 161 is engaged.

More specifically, the input-side actuating arm 147 and the output-side actuating arm 148 are configured so as to be placed at the respective initial positions if they are swung in one direction about the swing reference axis line 145L and, also, are placed at the respective operating positions if they are swung in the other direction about the swing reference axis line 145L, as illustrated in FIG. 10 and FIG. 11.

The engagement hole 162 is formed in the output-side actuating arm 148 having the structure, such that it has a predetermined length in a circumferential direction with the swing reference axis line 145L as a reference.

Specifically, as illustrated in FIG. 10 and FIG. 11, the engagement hole 162 has a first end 162(1) and a second end 162(2) which are respectively positioned at its one side and the other side about the swing reference axis line 145L, and a middle portion extending between the first and second ends 162(1) and 162(2).

The engagement pin 161 engages with the second end 162(2) of the engagement hole 162 when the input-side actuating arm 147 and the output-side actuating arm 148 are both positioned at the respective initial positions (see FIG. 10) and, also, engages with the first end 162(1) of the engagement hole 162 when the output-side actuating arm 148 is positioned at the operating position while the input-side actuating arm 147 is positioned at the initial position (see FIG. 11).

The hydraulic-motor actuating mechanism 145 operates as follows.

At first, there will be described a case where the first/second-motor driving mode is selected.

When the first/second-motor driving mode is selected, the electric motor 155 is in the non-operating state, so that the output-side actuating arm 148 is positioned at the initial position due to the biasing force of the biasing member 150 (see FIG. 10).

When the steering operation member 16 is positioned at the straight travel position in the first/second-motor driving mode (see FIG. 10), the motor-side capacity adjustment mechanism 14*a* (or 50*a*, 51*a*) is operated through the output-side link 149, such that the capacity of the first hydraulic motor 14 (or 50, 51) becomes the standard capacity. Accordingly, the peripheral speed of the first wheels 9 which are operatively driven by the first hydraulic motor 14 (or 50, 51) becomes equal to the peripheral speed of the second wheels 8 which are operatively driven by the second hydraulic motor 13 (or 48, 49).

Figure 12:
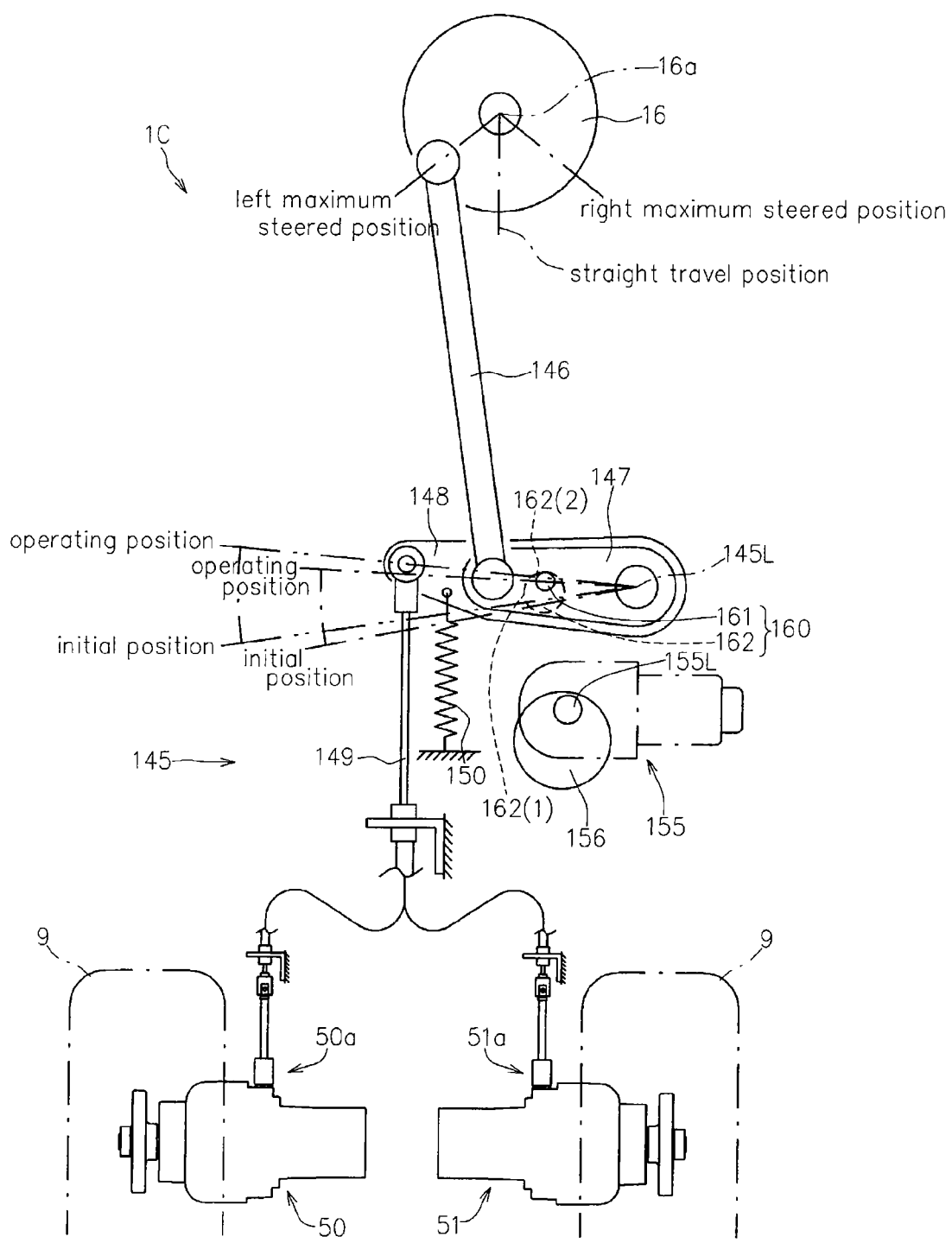
FIG. 12 is a schematic view of the hydraulic-motor actuating mechanism shown in FIG. 10, and shows the schematic view at the turning movement of the vehicle when the first/second-motor driving state is selected.

FIG. 12 illustrates a schematic view of the hydraulic-motor actuating mechanism 145 at a state where the steering operation member 16 has been steered from the straight travel position in either a leftward direction or a rightward direction, in the first/second-motor driving mode.

As illustrated in FIG. 12, when the steering operation member 16 is operated in either leftward or rightward directions from the straight travel position in the first/second-motor driving mode, the input-side actuating arm 147 is swung from the initial position to the operating position through the input-side link 146.

As described above, when the input-side actuating arm 147 and the output-side actuating arm 148 are both positioned at the respective initial positions, the engagement pin 161 engages with the second end 162(2) of the engagement hole 162 (see FIG. 10). Accordingly, when the input-side actuating arm 147 is swung from the initial position to the operating position according to a manual operation on the steering operation member 16, the output-side actuating arm 148 is swung from the initial position to the operating position through the conjunction/constraint mechanism 160 (see FIG. 12).

When the output-side actuating arm 148 is swung from the initial position to the operating position, the motor-side capacity adjustment mechanism 14*a* (50*a*, 51*a*) is operated through the output-side link 149, so that the amount of the capacity of the first hydraulic motor 14 (or 50, 51) is changed from the standard capacity to the first capacity. Accordingly, the peripheral speed of the first wheels 9 which are operatively driven by the first hydraulic motor 14 (or 50, 51) is increased in accordance with the increase of the turning angle of the vehicle, in comparison with the peripheral speed of the second wheels 8 which are operatively driven by the second hydraulic motor 13 (or 48, 49).

Next, there will be described a case where the first-motor driving mode is selected.

When the first-motor driving mode is selected, the electric motor 155 is in the operating state, so that the output-side actuating arm 148 is positioned at the operating position against the biasing force of the biasing member 150 (see FIG. 11).

Accordingly, the motor-side capacity adjustment mechanism 14*a* (50*a*, 51*a*) is operated through the output-side link 149, such that the capacity of the first hydraulic motor 14 (or 50, 51) becomes the first capacity, so that the peripheral speed of the first wheels 9 which are operatively driven by the first hydraulic motor 14 (or 50, 51) is increased, in comparison with the peripheral speed of the second wheels 8 which are operatively driven by the second hydraulic motor 13 (or 48, 49) in the first/second-motor driving mode.

Further, when the first-motor driving mode is selected, as described above, the output-side actuating arm 148 is positioned at the operating position by the electric motor 155.

On the other hand, when the input-side actuating arm 147 is positioned at the initial position since the steering operation member 16 is positioned at the straight travel position, as illustrated in FIG. 11, the engagement pin 161 engages with the first end 162(1) of the engagement hole 162.

Even if the steering operation member 16 is operated in either leftward or rightward directions from the straight travel position and thus the input-side actuating arm 147 is swung from the initial position to the operating position, the engagement pin 161 can freely move from the first end 162(1) to the second end 162(2) within the engagement hole 162.

Namely, the conjunction/constraint mechanism 160 can effectively ensure the turning movement of the vehicle in the first-motor driving mode.

Further, in the present embodiment, there has been described, as an example, a case where the amount of the capacity of the first hydraulic motor 14 (or 50, 51) is changed from the standard capacity to the first capacity according to the swing of the output-side actuating arm 148 from the initial position to the operating position. However, in a case where the turning radius of the first wheels 9 becomes smaller than that of the second wheels 8 according to the increase of the turning angle of the vehicle, the hydraulic-motor actuating mechanism 145 is structured such that the amount of the capacity of the first hydraulic motor 14 (or 50, 51) is changed from the first capacity to the standard capacity according to the swing of the output-side actuating arm 148 from the initial position to the operating position.

With the vehicle 1C having the structure, it is possible to realize changeover between the first-motor driving mode and the first/second-motor driving mode and control for increasing and decreasing the amount of the capacity of the first hydraulic motor 14 (or 50, 51) in response to the turning angle of the vehicle in the first/second-motor driving mode, while simplifying the control of the electric motor 155.

Specifically, in the present embodiment, only by selectively bringing the electric motor 155 into the operating state or the non-operating state, it is possible to realize changeover between the first-motor driving mode and the first/second-motor driving mode and control for increasing and decreasing the amount of the capacity of the first hydraulic motor 14 (or 50, 51) in response to the turning angle of the vehicle in the first/second-motor driving mode.

Figure 13:
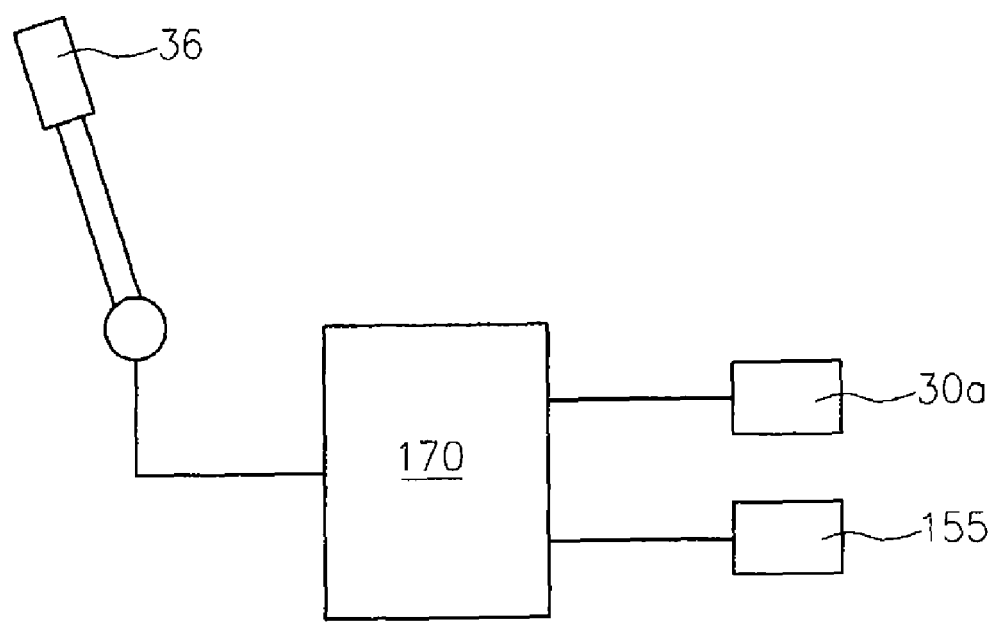
FIG. 13 is a schematic view showing an electric connection of an electric motor of the hydraulic-motor actuating mechanism shown in FIGS. 10-12.

For example, as illustrated in FIG. 13, it is possible to realize control of the operation of the electric motor 155 by electrically interposing a relay box 170 between the changeover operation member 36 and the electric motor 155 so that the relay box 170 can selectively supply or cut off electricity to the electric motor 155 based on a manual operation on the changeover operation member 36.

Further, in the embodiment illustrated in FIG. 13, the relay box 170 is also electrically interposed between the changeover operation member 36 and the solenoid which functions as the bypass-valve actuating mechanism 30*a*, so that the relay box 170 can selectively supply or cut off electricity to the solenoid based on a manual operation on the changeover operation member 36.

The present invention can be applied to all hydraulically-driving vehicles in which a first hydraulic motor for driving first wheels positioned on one side in the vehicle lengthwise direction, a second hydraulic motor for driving second wheels positioned on the other side in the vehicle lengthwise direction and a variable-displacement type hydraulic pump are fluidly connected in series to one another to form a closed circuit.

Fifth Embodiment

Hereinafter, there will be described a hydraulic drive vehicle according to a preferred embodiment in a second aspect of the present invention, with reference to the attached drawings.

Figure 14:
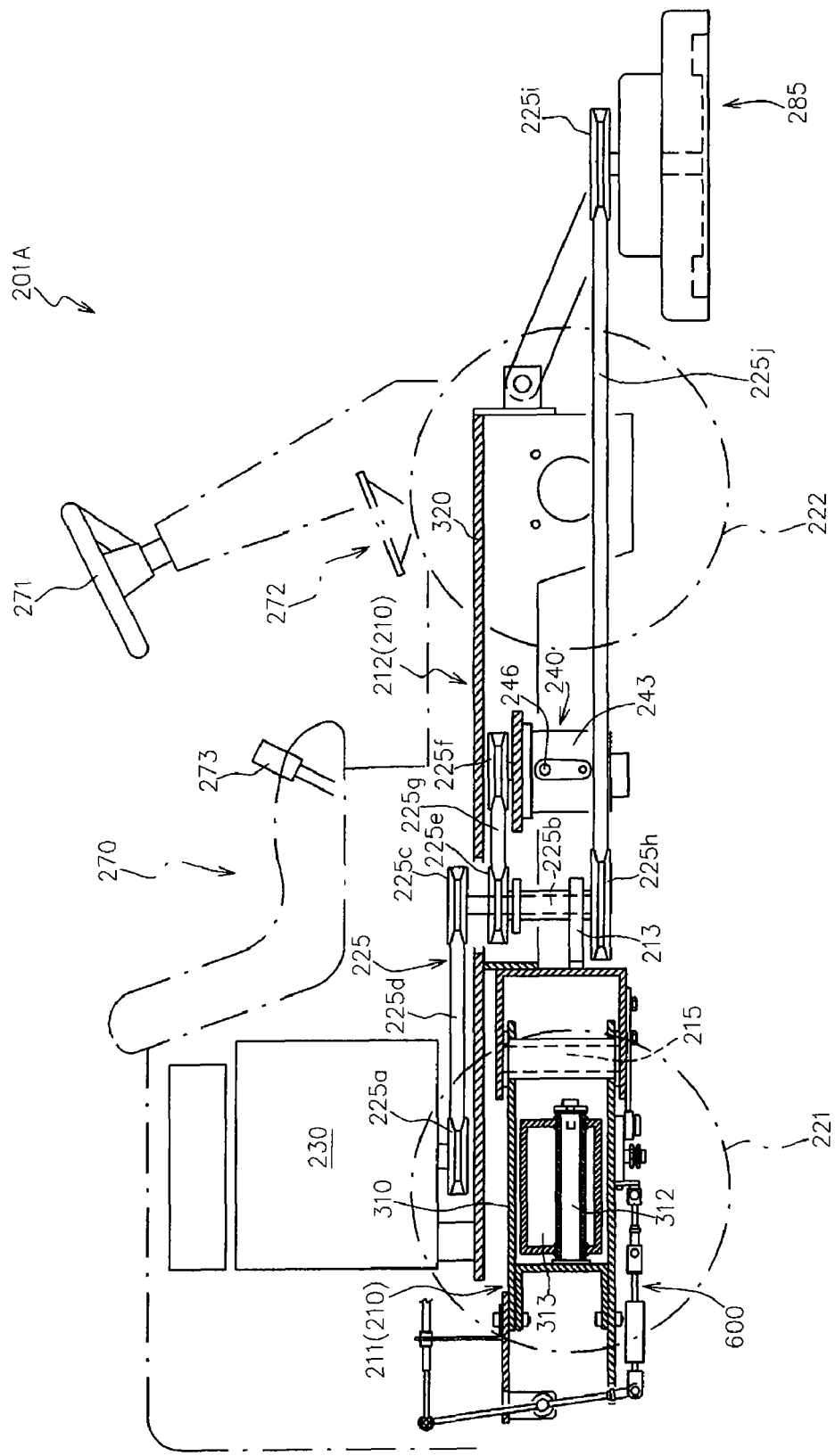
FIG. 14 is a side view of a hydraulic drive vehicle according to a fifth embodiment of the present invention.
Figure 15:
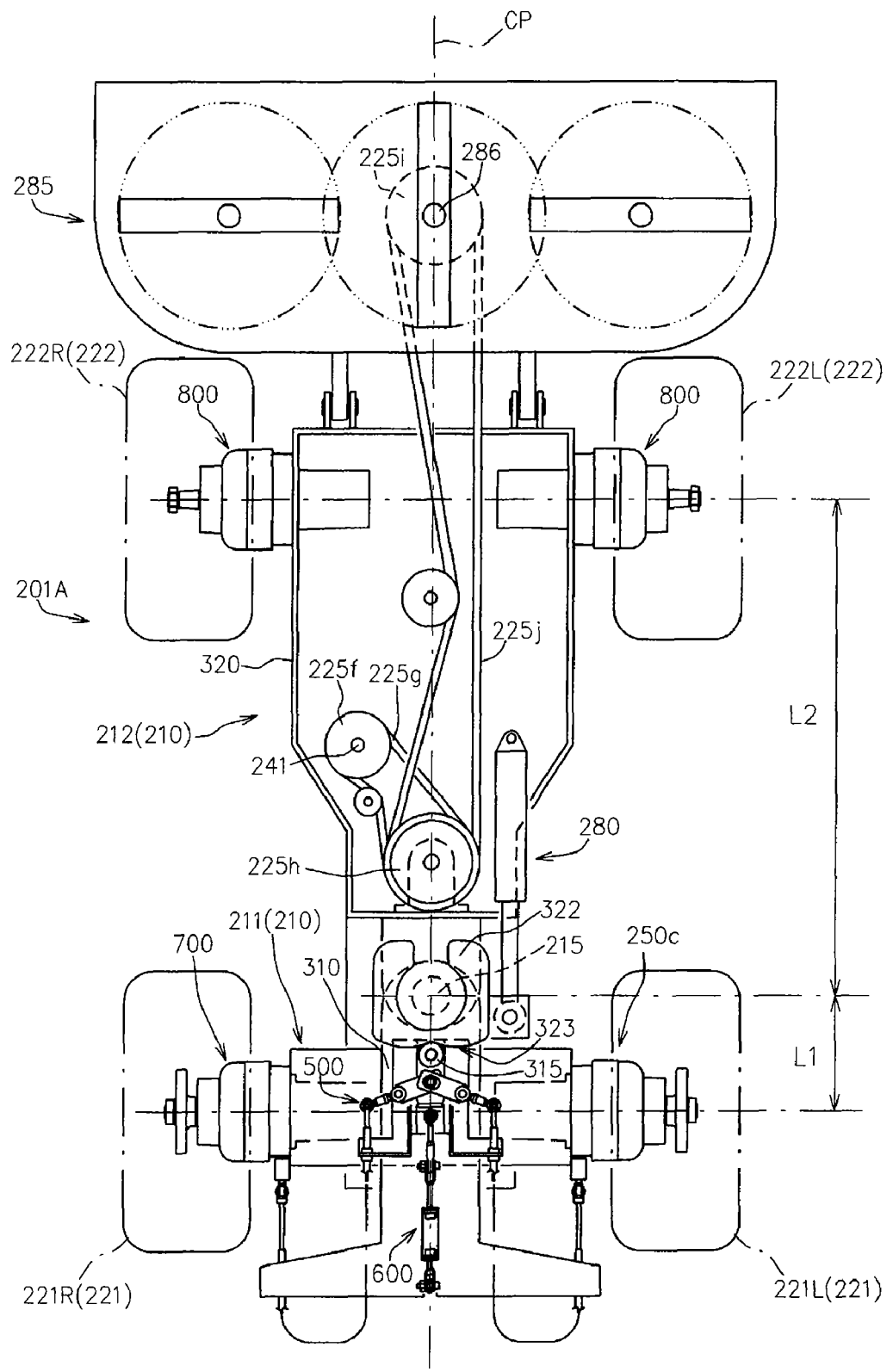
FIG. 15 is a bottom view of the hydraulic drive vehicle shown in FIG. 14.
Figure 16:
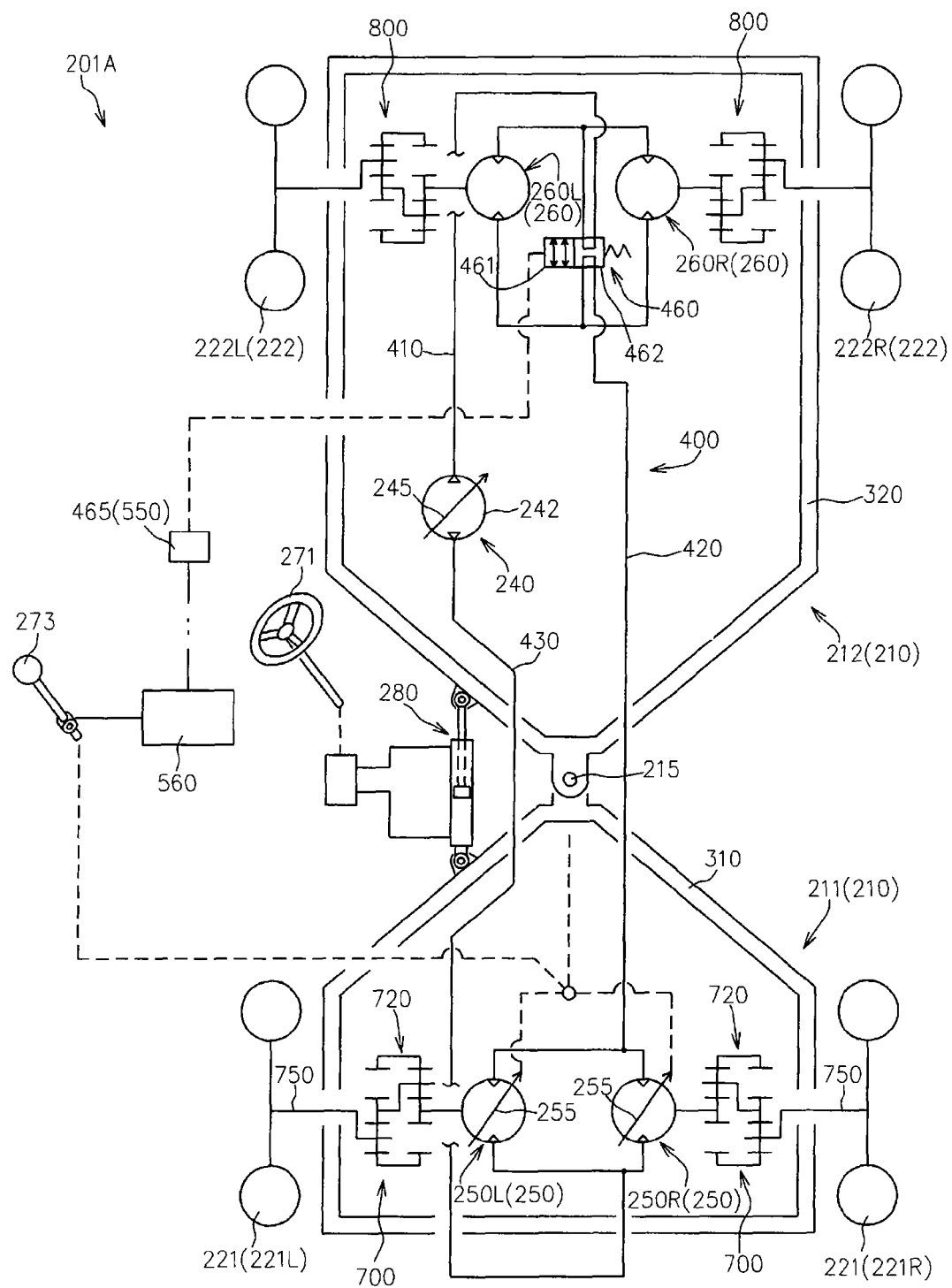
FIG. 16 is a hydraulic circuit diagram of the vehicle shown in FIGS. 14 and 15.

FIGS. 14 to 16 illustrate a side view, a bottom view and a hydraulic circuit diagram of a hydraulic drive vehicle 201A according to the present embodiment, respectively.

As illustrated in FIGS. 14 to 16, the vehicle 201A according to the present embodiment includes a body-foldable type (articulate type) vehicle frame 210 including first and second frames 211 and 212 which are rotatable in the horizontal direction to each other about a pivot shaft 215, and is structured such that a length (hereinafter, referred to as a first-wheel-side length) in the vehicle lengthwise direction between the pivot shaft 215 and first wheels 221 supported by the first frame 211 is different from a length (hereinafter, referred to as a second-wheel-side length) in the vehicle lengthwise direction between the pivot shaft 215 and second wheels 222 supported by the second frame 212.

More specifically, the vehicle 201A includes the vehicle frame 210 including the first and second frames 211 and 212 which are placed on one side (the rear side in the present embodiment) and the other side (the front side in the present embodiment) in the vehicle lengthwise direction and which can be swung relative to each other about the pivot shaft 215 along a substantially-vertical direction, the first wheels 221 (the rear wheels in the present embodiment) which are supported on the first frame 211 such that the first-wheel-side length is L1, the second wheels 222 (the front wheels in the present embodiment) which are supported on the second frame 212 such that the second-wheel-side length is L2 which is different from L1, a driving power source 230 supported on the vehicle frame 210, a variable-displacement type hydraulic pump 240 which is operatively driven by the driving power source 230, a variable-displacement type first hydraulic motor 250 which operatively drives the first wheels 221 and which is supported on the first frame 211, and a fixed-displacement type second hydraulic motor 260 which operatively drives the second wheels 222 and which is supported on the second frame 212.

In the vehicle 201A, the hydraulic pump 240, and the first and second hydraulic motors 250 and 260 are fluidly connected to one another in series.

Namely, as illustrated in FIG. 16, the hydraulic pump 240, and the first and second hydraulic motors 250 and 260 are fluidly connected to one another in series, in such a way as to form a main closed circuit 400, through a pump/second-motor line 410, a second-motor/first-motor line 420 and a first-motor/pump line 430 which establish fluid connection between the hydraulic pump 240 and the second hydraulic motor 260, between the second hydraulic motor 260 and the first hydraulic motor 250, and between the first hydraulic motor 250 and the hydraulic pump 240, respectively.

As illustrated in FIG. 14 and FIG. 15, the vehicle 201A according to the present embodiment further includes a driving seat 270 supported on the vehicle frame 210 (the second frame 212 in the present embodiment), a steering member 271 such as a steering wheel which is capable of manually operated and which is placed near the driving seat 270, a hydraulic steering mechanism 280 which causes the first frame 211 and the second frame 212 to swing relative to each other about the pivot shaft 215 in conjunction with a manual operation on the steering member 271, a speed change operation member 272 such as a speed change pedal which is capable of manually operated for changing the amount of the capacity of the hydraulic pump 240 and which is placed near the driving seat 270, and a mower device 285 which is supported on the second frame 212 so as to be positioned outside of the second wheels 222 (at the front side in the present embodiment) in the vehicle lengthwise direction.

In the present embodiment, the driving power source 230 is supported on the second frame 212, as illustrated in FIG. 14.

The hydraulic pump 240 is supported on the second frame 212 in a state of being operatively connected to the driving power source 230.

As illustrated in FIGS. 14 to 16, the hydraulic pump 240 includes a pump shaft 241 which is operatively coupled to the driving power source 230, a hydraulic-pump main body 242 which is supported by the pump shaft 241 in a relatively non-rotatable manner with respect thereto, a pump housing 243 which supports the pump shaft 241 in a rotatable manner about an axis line and accommodates the hydraulic-pump main body 242, and a pump-side capacity adjustment mechanism 245 which changes the amount of the capacity of the hydraulic-pump main body 242.

As illustrated in FIG. 14 and FIG. 15, the pump shaft 241 is operatively coupled to an output shaft of the driving power source 230, through a pulley/belt transmission mechanism 225.

The pulley/belt transmission mechanism 225 is structured to operatively couple the output shaft of the driving power source 230 to an input shaft of the mower device 285, as well as to the pump shaft.

More specifically, as illustrated in FIG. 14, the pulley/belt transmission mechanism 225 includes an engine-side first pulley 225a which is supported on the output shaft of the driving power source 230 in a relatively non-rotatable manner with respect thereto, an intermediate shaft 225b which is supported on the second frame 212 in a rotatable manner about an axis line through a mounting stay 213, an engine-side second pulley 225c which is supported on the intermediate shaft 225b in a relatively non-rotatable manner with respect thereto, an engine-side belt 225d which is wound around the engine-side first and second pulleys 225a and 225c, a pump-side first pulley 225e which is supported on the intermediate shaft 225b in a relatively non-rotatable manner with respect thereto, a pump-side second pulley 225f which is supported on the pump shaft 241 in a relatively non-rotatable manner with respect thereto, a pump-side belt 225g which is wound around the pump-side first and second pulleys 225e and 225f, a mower-side first pulley 225h which is supported on the intermediate shaft 225b in a relatively non-rotatable manner with respect thereto, a mower-side second pulley 225i which is supported on an input shaft 286 of the mower device 285 in a relatively non-rotatable manner with respect thereto, and a mower-side belt 225j which is wound around the mower-side first and second pulleys 225h and 225i.

The pump-side capacity adjustment mechanism 245 is structured to change the direction of discharge and the amount of the capacity of the hydraulic-pump main body 242, according to a manual operation on the speed-change operation member 272.

Namely, the pump-side capacity adjustment mechanism 245 changes the amount of the capacity of the hydraulic-pump main body 242 according to the manual operation on the speed-change operation member 272, which changes the direction and the amount of the hydraulic fluid discharged from the hydraulic-pump main body 242, thereby changing the direction and the speed of the outputs from the first and second hydraulic motors 250 and 260.

The pump-side capacity adjustment mechanism 245 may include, for example, a movable swash plate (not illustrated) which can be tilted in a normal direction and a reverse direction across a neutral position about a swing reference axis line, and a control shaft 246 (see FIG. 14) which is supported by the pump housing 243 so as to be rotated about its axis line according to a manual operation from the outside and which is operatively coupled to the movable swash plate in such a way as to tilt the movable swash plate about the swing reference axis line according to the rotation of itself about the axis line.

The first and second hydraulic motors 250 and 260 are structured to output rotational powers to the corresponding first and second wheels 221 and 222, by being fluidly driven by the hydraulic fluid from the hydraulic pump 240.

The vehicle 201A according to the present embodiment includes a pair of a left first wheel 221L and a right first wheel 221R as the first wheels 221 and a pair of a left second wheel 222L and a right second wheel 222R as the second wheels 221, as illustrated in FIG. 15 and FIG. 16.

Further, the vehicle 201A includes a pair of a left first hydraulic motor 250L and a right first hydraulic motor 250R which have the same structure to each other and which output rotational powers to the left and right first wheels 221L and 221R, as the first hydraulic motor 250, and also includes a pair of a left second hydraulic motor 260L and a right second hydraulic motor 260R which have the same structure to each other and which output rotational powers to the left and right second wheels 222L and 222R, as the second hydraulic motor 260.

In the vehicle including the pair of left and right first hydraulic motors 250L and 250R as the first hydraulic motor 250 as described above, as illustrated in FIG. 16, the second-motor/first-motor line 420 has a first end fluidly connected to the second hydraulic motor 260 and a second end branched into two ends to be fluidly connected to the pair of left and right first hydraulic motors 250L and 250R. Further, the first-motor/pump line 430 has a first end branched into two ends to be fluidly connected to the pair of left and right first hydraulic motors 250L and 250R and a second end fluidly connected to the hydraulic pump 240.

Namely, the pair of left and right first hydraulic motors 250L and 250R are inserted in the main closed circuit 400 in parallel thereto.

With this structure, the hydraulic fluid from the hydraulic pump 240 is distributed and supplied to the pair of left and right second hydraulic motors 250L and 250R according to the loads on the pair of left and right first wheels 221L and 221R, thereby differentially driving the pair of left and right first wheels 221L and 222R utilizing hydraulic pressures.

More specifically, at the time when the vehicle makes a turn, a passage trajectory of one first wheel (hereinafter, referred to as an inner wheel in turning) of the pair of left and right first wheels 221L and 221R that is positioned on an inner side with the turning center of the vehicle as a reference is smaller than that of the other one first wheel (hereinafter, referred to as an outer wheel in turning) that is positioned on an outer side with the turning center as a reference, so that the rotational load on the inner wheel in turning is become larger than the rotational load on the outer wheel in turning.

Accordingly, the amount of the hydraulic fluid supplied from the hydraulic pump 240 to one first hydraulic motor (hereinafter, referred to as an outer first hydraulic motor in turning) of the pair of left and right second hydraulic motors 250L and 250R, that drives the outer wheel in turning becomes larger than the amount of the hydraulic fluid supplied to the other first hydraulic motor (hereinafter, referred to as an inner first hydraulic motor in turning) that drives the inner wheel in turning, so that the outer first hydraulic motor in turning is rotated at a higher speed than the inner first hydraulic motor in turning.

Thus, it is possible to drive both the pair of first wheels 221L and 221R by the pair of first hydraulic motors 250L and 250R, without inducing slippages and drags of the pair of left and right first wheels 221L and 221R during the turning movement of the vehicle.

Similarly, in the vehicle 201A including the pair of left and right second hydraulic motors 260L and 260R as the second hydraulic motor 260, as illustrated in FIG. 16, the pump/second-motor line 410 has a first end fluidly connected to the hydraulic motor 240 and a second end branched into two ends to be fluidly connected to the pair of left and right second hydraulic motors 260L and 260R. Further, the second-motor/first-motor line 420 has a first end branched into two ends to be fluidly connected to the pair of left and right second hydraulic motors 260L and 260R and a second end fluidly connected to the first hydraulic motor 250, so that the pair of left and right second hydraulic motors 260L and 260R are inserted in the main closed circuit 400 in parallel thereto.

While the vehicle 201A according to the present embodiment includes the pair of left and right first hydraulic motors 250L and 250R for operatively driving the pair of left and right first wheels 221L and 221R, the present invention is not limited to this embodiment.

Namely, the present invention is applicable to a vehicle including a single first hydraulic motor and a mechanical first differential gear device for differentially transmitting rotational power outputted from the single first hydraulic motor to the pair of left and right first wheels, instead of the pair of left and right first hydraulic motors 250L and 250R.

Similarly, the present invention is applicable to a vehicle including a single second hydraulic motor and a mechanical second differential gear device, instead of the pair of left and right second hydraulic motors 260L and 260R.

Further, the present invention is also applicable to a vehicle configured such that either one or both of the first wheels 221 and the second wheels 222 are embodied by a single wheel.

In the present embodiment, the left and right first hydraulic motors 250L and 250R and the left and right second hydraulic motors 260L and 260R are provided as components of wheel motor devices.

Namely, as illustrated in FIG. 15, the vehicle 201A according to the present embodiment has a pair of first wheel motor devices 700 respectively including the left and right first hydraulic motors 250L and 250R, and further has a pair of second wheel motor devices 800 respectively including the left and right second hydraulic motors 260L and 260R.

Figure 17:
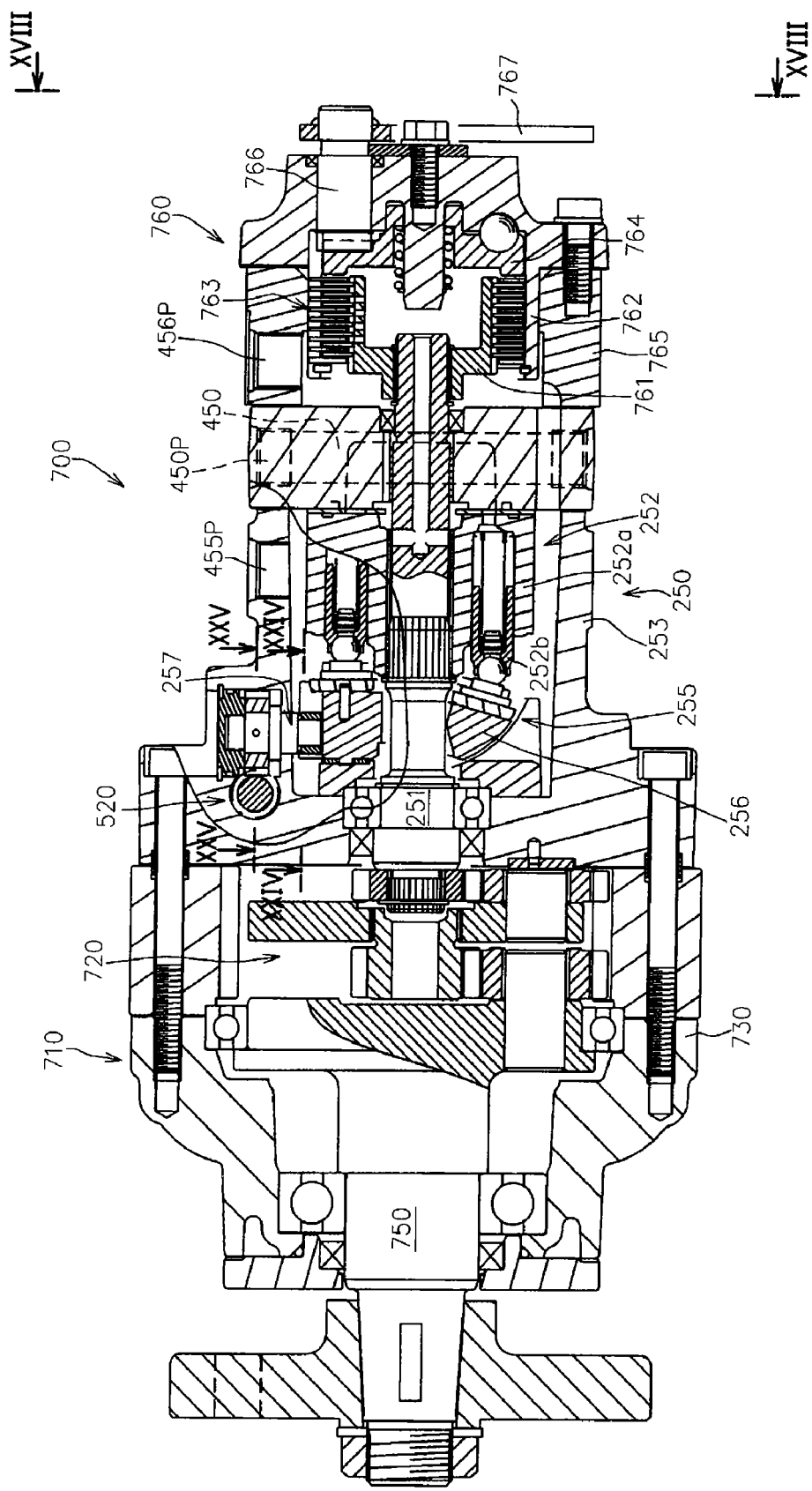
FIG. 17 is a vertical cross-sectional view of a first wheel motor device provided in the vehicle shown in FIGS. 14-16.

FIG. 17 illustrates a longitudinal cross-sectional view of the first wheel motor device 700.

The pair of first wheel motor devices 700 have the same structure and are placed symmetrically to each other about an imaginary center plane CP (see FIG. 15) along the vertical direction at the center of the vehicle widthwise direction.

As illustrated in FIG. 17, the first wheel motor device 700 includes the variable-displacement type first hydraulic motor 250, a speed reduction unit 710 including a speed reduction mechanism 720 for reducing the speed of the rotational power outputted from the first hydraulic motor 250, and an output member 750 for transmitting, to the corresponding first wheel 221, the rotational power which has been reduced in speed by the speed reduction mechanism 720.

As illustrated in FIG. 17, the first hydraulic motor 250 includes a hydraulic-motor main body 252 which is fluidly connected to the hydraulic pump 240, a motor shaft 251 which supports the hydraulic-motor main body 252 in a relatively non-rotatable manner with respect thereto, a motor housing 253 which accommodates the hydraulic-motor main body 252 and which supports the motor shaft 251 in a rotatable manner about its axis line, and a motor-side capacity adjustment mechanism 255 for changing the amount of the capacity of the hydraulic-motor main body 252.

The motor shaft 251 is supported by the motor housing 253 so as to be along the vehicle widthwise direction.

More specifically, as illustrated in FIG. 17, the motor shaft 251 has a first end that is positioned on an outer side in the vehicle widthwise direction and that extends outward from the motor housing 253, and the speed reduction mechanism 720 is coupled to the first end.

In the present embodiment, as illustrated in FIG. 17, the motor shaft 251 has a second end that is positioned on an inner side in the vehicle widthwise direction and that also extends outward from the motor housing 253, and the second end functions as a braking-power receiving portion to which a brake unit 760 provided in the first wheel motor device 700 applies a braking power.

Namely, as illustrated in FIG. 17, the first wheel motor device 700 includes the brake unit 760, in addition to the components.

The brake unit 760 is capable of selectively applying the braking force to the motor shaft 251 that is positioned on an upstream side in a power transmission direction than the speed reduction mechanism 720.

With this structure, it is possible to reduce the braking capacity required for the brake unit 760, thereby reducing the size of the brake unit 760.

In the present embodiment, the brake unit 760 is of a disk brake type.

More specifically, as illustrated in FIG. 17, the brake unit 760 includes a rotational-side member 761 which is supported on the second end of the motor shaft 251 in a relatively non-rotatable manner with respect thereto, a fixed-side member 762 which is prevented from rotating, a group of frictional plates 763 including rotational-side frictional plates which are supported on the rotational-side member 761 in a relatively non-rotatable but in a relatively movable manner in the axial direction with respect thereto and fixed-side frictional plates which are supported on the fixed-side member 762 in a relatively non-rotatable manner but in a relatively movable manner in the axial direction with respect thereto in a state of being opposing to the rotational-side frictional plates. Further, the brake unit 760 includes a brake actuating member 764 which can contact with and separate from the frictional plates 763, and a brake housing 765 which is coupled to the motor housing 253 in a state of accommodating the rotational-side member 761, the fixed-side member 762, the frictional plates 763 and the brake actuating member 764. Further, the brake unit 760 includes a brake operation shaft 766 capable of pushing the brake actuating member 764 toward the frictional plates 763 according to a manual operation, and a brake arm 767 which is coupled to the outer end of the brake operation shaft 766 in a relatively non-rotatable manner with respect thereto.

The brake actuating member 764 is structured to move in directions towards and away from the frictional plates 763 according to the rotation of itself through a cam mechanism.

The brake operation shaft 766 is supported by the brake housing 765 in a rotatable manner about an axis line in a state of having an inner end engaged with the brake actuating member 764 and an outer end extended outward from the brake housing. The brake operation shaft 766 is structured to rotate the brake actuating member 764 through the rotation of itself about the axis line.

The brake arm 767 has a proximal end portion coupled to the outer end of the brake operation shaft 766 in a non-rotatable manner with respect thereto and a free end portion operatively coupled to a brake operation member (not illustrated) provided near the driving seat.

Figure 18:
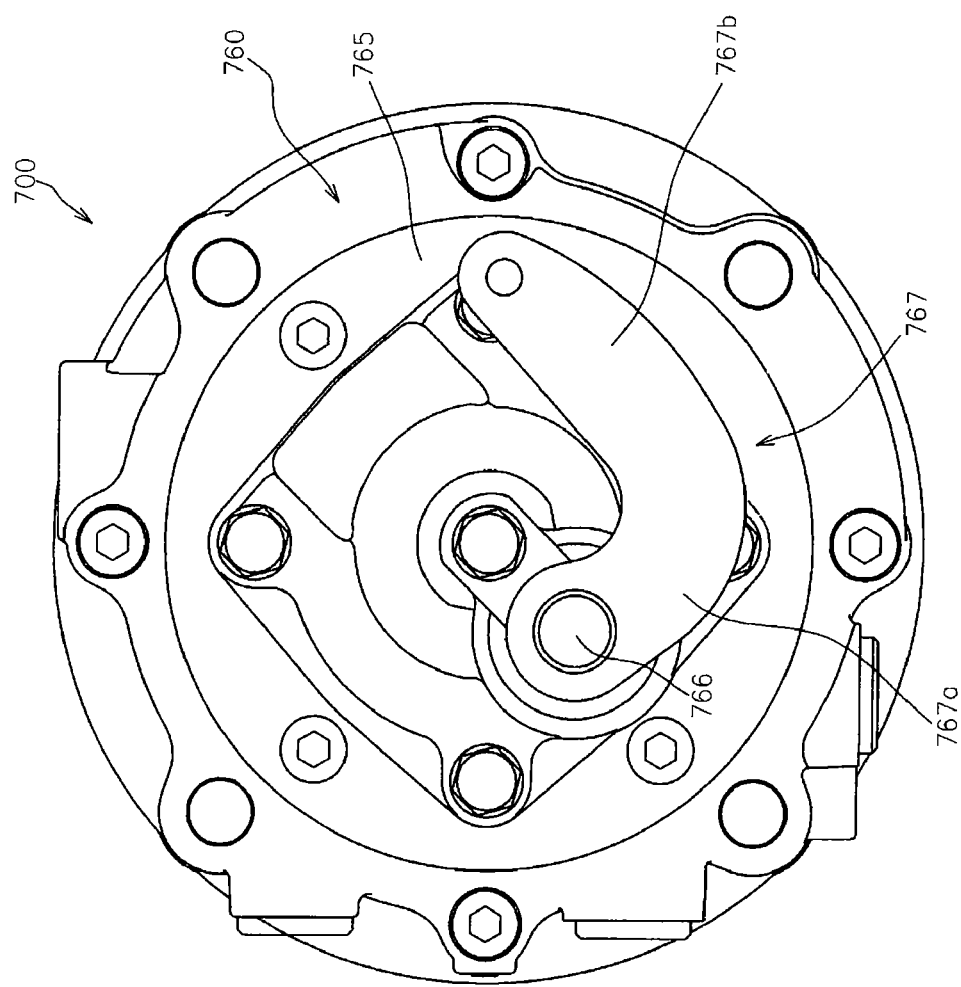
FIG. 18 is an end view taken along the line XVIII-XVIII in FIG. 17.

FIG. 18 illustrates an end view of the first wheel motor device 700 taken along the line XVIII-XVIII in FIG. 17.

Preferably, as illustrated in FIG. 18, the brake arm 767 may include a first portion 767a extending outwardly in the radial direction with the brake operation shaft 766 as a reference from the proximal end which is coupled to the brake operation shaft 766 in a relatively non-rotatable manner with respect thereto, and a second portion 767b extending from an outer end of the first portion 767a in a direction different in which the first portion 767a extends.

The structure makes it possible to effectively prevent the brake arm 767 from extending outwardly from the brake unit 760 as viewed along an axial direction of the brake operation shaft 766, thereby enabling reduction of the size of the brake unit 760 including the brake arm 767.

While, in the present embodiment, as described above, the disk-brake type brake unit 760 is provided, it is also possible to employ, instead thereof, a brake unit of a different type, such as an internal expanding type drum brake or a band brake.

As illustrated in FIG. 17, the hydraulic-motor main body 252 includes a motor-side cylinder block 252a supported on the motor shaft 251 in a relatively non-rotatable manner with respect thereto, and plural motor-side pistons 252b supported by the motor-side cylinder block 252a in a relatively non-rotatable manner but in a relatively reciprocating manner in the axial direction with respect thereto.

The motor-side capacity adjustment mechanism 255 is structured to change the capacity of the hydraulic-motor main body 252 within a range including the standard capacity which makes a peripheral speed of the first wheels 221 driven by the first hydraulic motor 250 substantially equal to a peripheral speed of the second wheels 222 driven by the second hydraulic motor 260.

The motor-side capacity adjustment mechanism 255 will be described in detail, later.

As illustrated in FIG. 17, the speed reduction unit 710 includes the speed reduction mechanism 720 and a speed reduction housing 730 which is coupled to the motor housing 253 so as to accommodate the speed reduction mechanism 720.

The speed reduction mechanism 720 may include a pair of planetary gear mechanisms connected in series to each other, for example.

The output member 750 has a first end coupled to an output side of the speed reduction mechanism 720 and a second end extended outward from the speed reduction housing so as to be coupled to the corresponding first wheel 221.

The second wheel motor devices 800 have substantially the same structure as that of the first wheel motor devices 700, except that the first hydraulic motor 250 is replaced with the second hydraulic motor 260.

Namely, the second wheel motor devices 800 include the fixed-displacement type second hydraulic motor 260, the speed reduction unit 710, the output member 750 and the brake unit 760.

Further, the second hydraulic motor 260 has substantially the same structure as that of the first hydraulic motor 250, expect that the motor-side capacity adjustment mechanism 255 is replaced with a fixed swash plate (not illustrated).

As illustrated in FIG. 14 and FIG. 15, the second frame 212 includes a second-frame main body 320 which directly or indirectly supports the pair of left and right second wheels 222L and 222R and the pair of left and right second hydraulic motors 260L and 260R.

As described above, in the present embodiment, the pair of second hydraulic motors 260L and 260R form components of the pair of second wheel motor devices 800.

Accordingly, the second-frame main body 320 is structured to directly or indirectly support the pair of second wheel motor devices 800 to which the pair of second wheels 222L and 222R are coupled, respectively.

Similarly, the first frame 211 includes a first-frame main body 310 which directly or indirectly supports the first wheels 221 and the first hydraulic motors 250.

In the present embodiment, the first-frame main body 310 directly or indirectly supports the pair of first wheel motor devices 700 to which the pair of first wheels 221L and 221R are coupled, respectively.

Further, the first and second frame main bodies 310 and 320 are coupled to each other such that they can swing about the pivot shaft 215.

Figure 19:
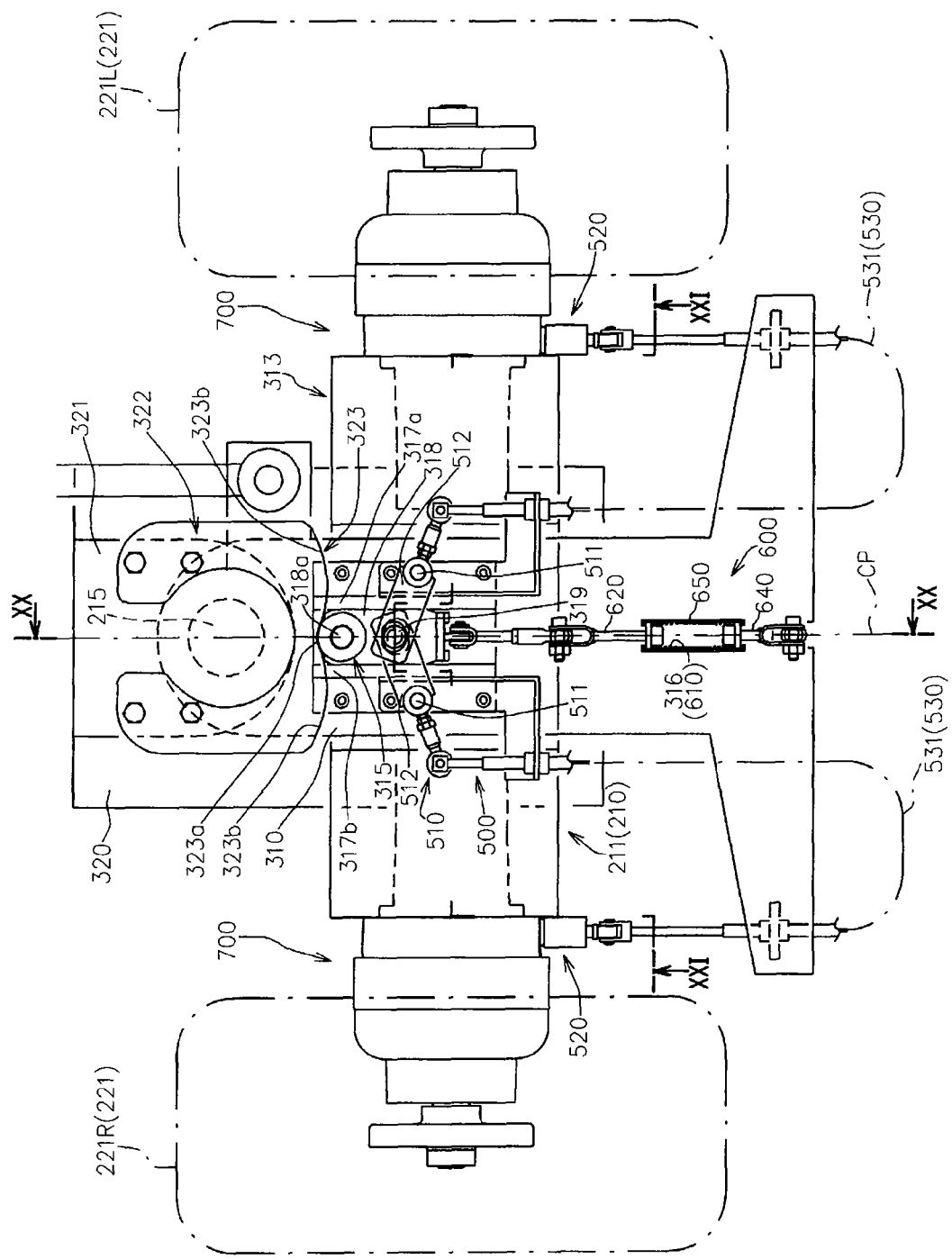
FIG. 19 is a bottom view of a vicinity of a first frame in the vehicle shown in FIGS. 14-17.

FIG. 19 illustrates a bottom view of a portion around the first frame 211.

Figure 20:
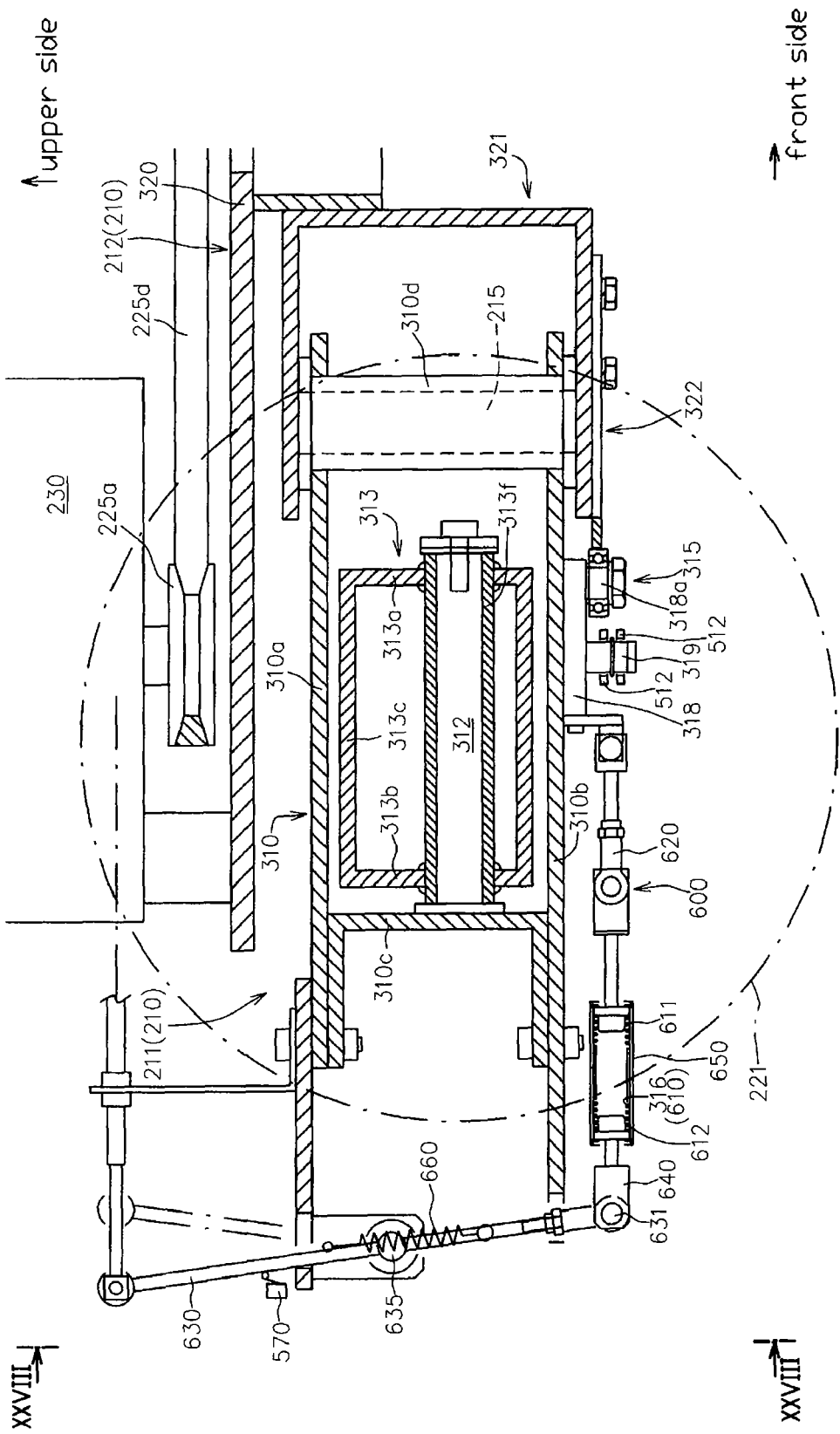
FIG. 20 is a cross-sectional view taken along the line XX-XX in FIG. 19.
Figure 21:
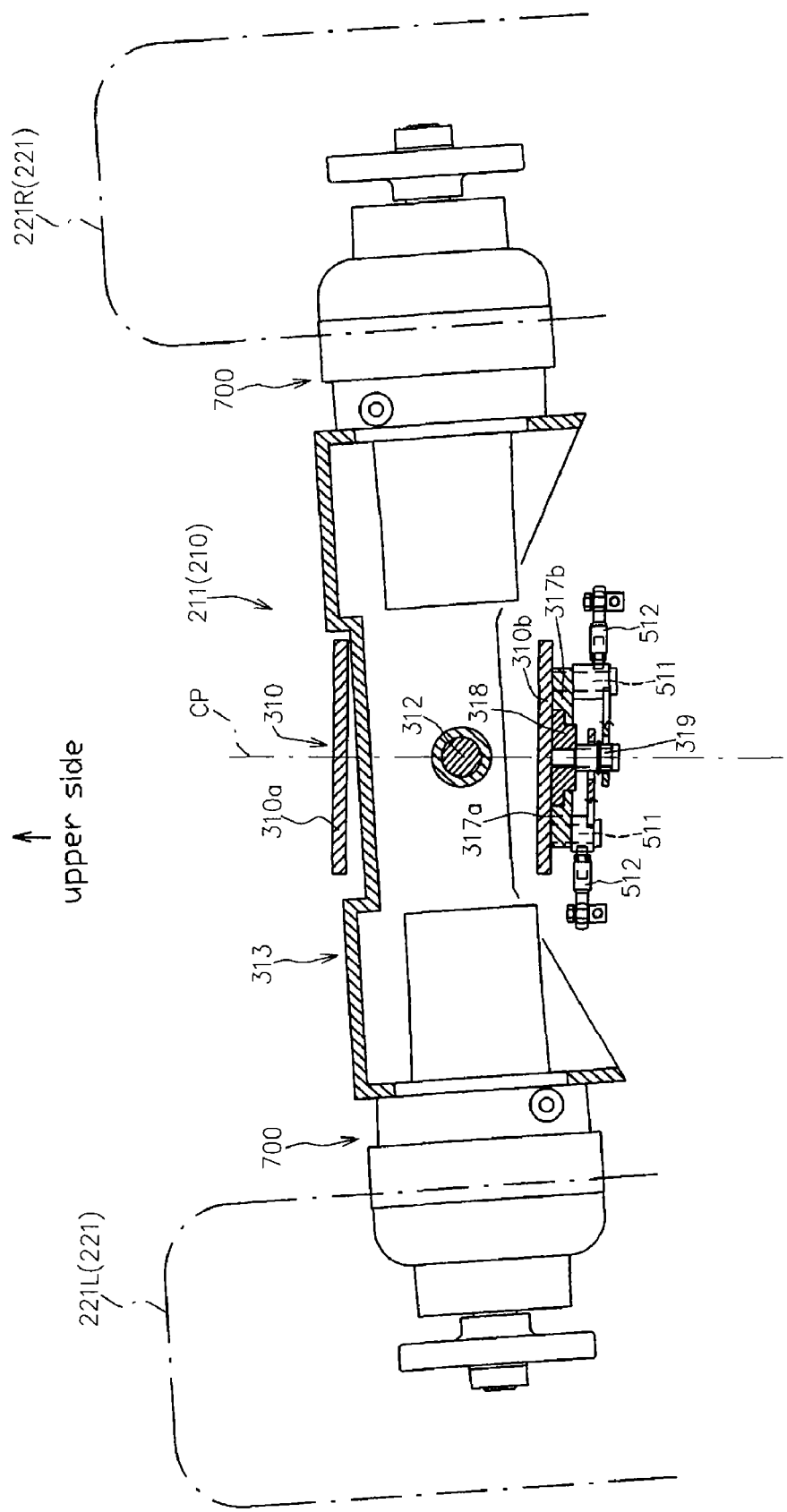
FIG. 21 is a cross-sectional view taken along the line XXI-XXI in FIG. 19, and shows a state where a swing frame of the first frame is swung.

Further, FIG. 20 and FIG. 21 illustrate cross-sectional views taken along the line XX-XX and the line XXI-XXI in FIG. 19, respectively.

As illustrated in FIGS. 19 to 21, in the present embodiment, the first frame 211 includes a swing frame 313 which is supported by the first-frame main body 310 in a swinging manner about a leftward/rightward swing reference shaft 312 along the vehicle longitudinal direction, in addition to the first-frame main body 310, and the pair of first wheel motor devices 700 are supported by the left and right ends of the swing frame 313, respectively.

With this structure, it is possible to improve the follow-ability of the pair of first wheels 221L and 221R coupled to the pair of first wheel motor devices 700 with respect to the ground surface. This effect is advantageous in traveling on slanted grounds and grounds having concave and convex surfaces.

More specifically, as illustrated in FIG. 20 and FIG. 21, the first-frame main body 310 includes an upper wall 310a which is along a substantially-horizontal direction, a lower wall 310b which is along a substantially-horizontal direction so as to face to the upper wall 310a at a position downwardly spaced apart from the upper wall 310a, a coupling wall 310c which couples the upper wall 310a and the lower wall 310b to each other, a first supporting cylinder 310b which is along a substantially-vertical direction so as to couple the front portions of the upper wall 310a and the lower wall 310b, and the leftward/rightward swing reference shaft 312 supported by the coupling wall 310c so as to be along the vehicle lengthwise direction.

As illustrated in FIG. 20, the pivot shaft 215 is inserted in the first supporting cylinder 310d, and the upper end and the lower end of the pivot shaft 215 are coupled in a relatively non-rotatable manner to a mounting stay 321 provided at the second-frame main body 320.

Figure 22:
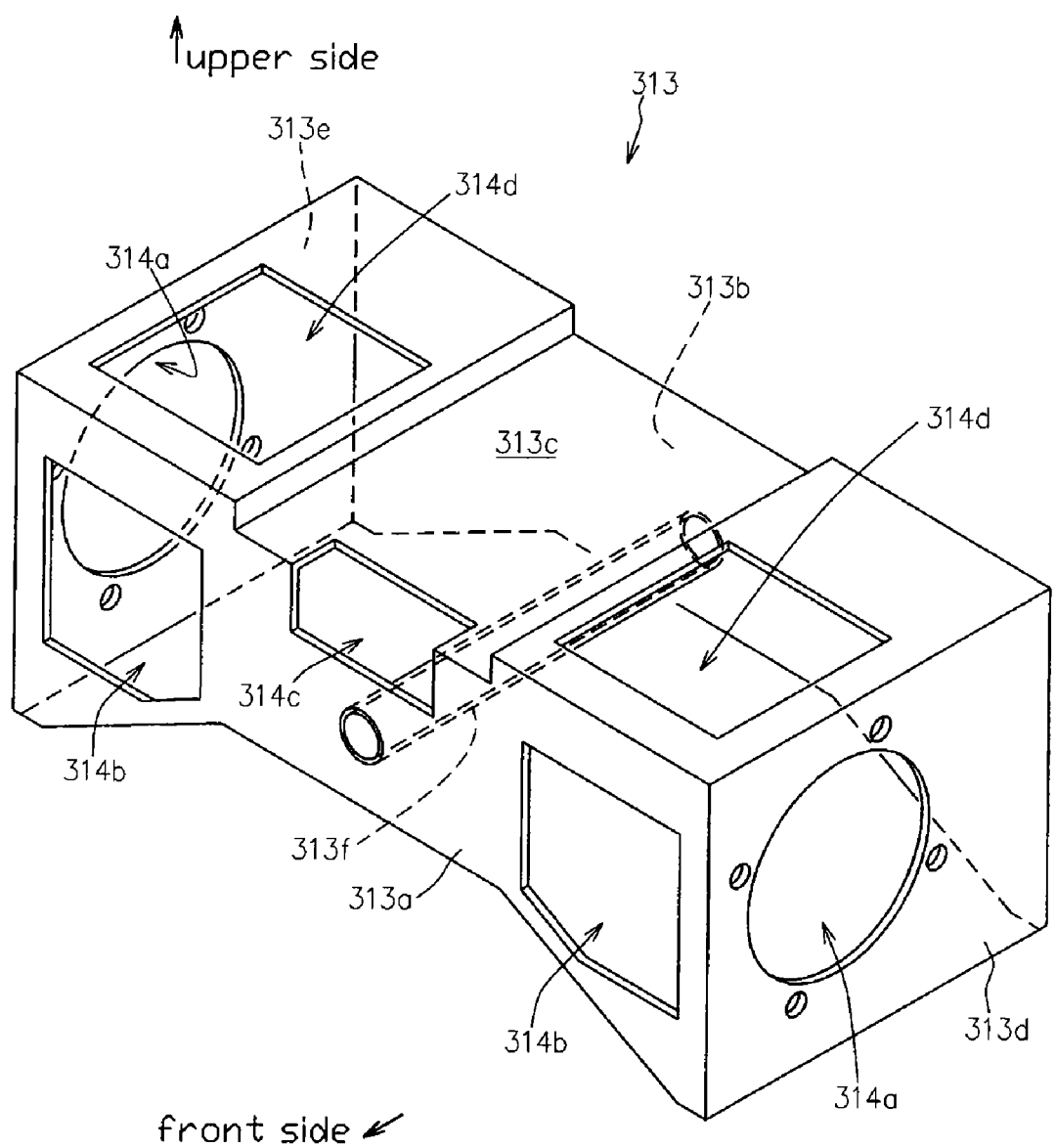
FIG. 22 is a perspective view of the swing frame as viewed from front and upper sides.

FIG. 22 illustrates a perspective view of the swing frame 313 as viewed from front and upper sides.

As illustrated in FIGS. 20 to 22, the swing frame 313 includes a front wall 313a extending in the vehicle widthwise direction in a state of being along a substantially-vertical direction, a rear wall 313b which is faced to the front wall 313a at a position rearwardly spaced apart from the front wall 313a, an upper wall 313c coupling the upper end portions of the front wall 313a and the rear wall 313b, a first side wall 313d which couples the front wall 313a, the rear wall 313b and the upper wall 313c to one another at their first end portions in the vehicle widthwise direction, a second side wall 313e which couples the front wall 313a, the rear wall 313b and the upper wall 313e to one another at their second end portions in the vehicle widthwise direction, and a second supporting cylinder 313f which is supported by the front wall 313a and the rear wall 313b so as to be along the vehicle lengthwise direction and in which the leftward/rightward swing reference shaft 312 is inserted.

The first and second side walls 313c and 313d are formed with mounting holes 314a, and the corresponding first wheel motor devices 700 are coupled to the first and second side walls 313c and 313d through the mounting holes 314a.

Preferably, as illustrated in FIG. 22, the swing frame 313 may be formed with a pair of access openings 314b at its portions which are faced to a pair of first-motor side hydraulic-fluid ports 450P provided at the pair of first wheel motor devices 700.

By providing the pair of access openings 314b, it is possible to increase the efficiency of operations for attaching and detaching conduits to and from the pair of first wheel motor devices 700.

Specifically, each of the motor housings 253 of the first hydraulic motors 250 in the first wheel motor devices 700 is formed with a pair of first-motor side hydraulic-fluid channels 450 (see FIG. 17) which form a portion of the main closed circuit 400.

The pair of first-motor side hydraulic-fluid channels 450 are fluidly connected to the hydraulic-motor main bodies 252, and have at least first ends opened to an outer surface of the motor housings 253 to form the pair of first-motor side hydraulic-fluid ports 450P.

Similarly, the pump-side housing 243 of the hydraulic pump 240 is provided with a pair of pump-side hydraulic-fluid ports (not illustrated) and, each of the motor housings of the second hydraulic motors 260 is provided with a pair of second-motor side hydraulic-fluid ports (not illustrated).

These hydraulic-fluid ports are fluidly connected to one another through external conduits to form the main closed circuit 400.

Accordingly, by providing the access openings 314b at portions of the swing frame 313 which are faced to the pair of first motor-side hydraulic-fluid ports 450P, it is possible to improve the efficiency of operations for attaching and detaching the external conduits.

As described above, the vehicle 201A according to the present embodiment includes the pair of left and right first wheel motor devices 700, and the first hydraulic motors 250 in the pair of first wheel motor devices 700 are inserted in the main closed circuit 400 in parallel.

In this structure, a second-motor/first-motor conduit (not illustrated) which forms a part of the second-motor/first-motor line 420 has an end closer to the first hydraulic motors that is branched into two ends through a T-shaped joint (not illustrated) to be fluidly connected to the corresponding one first-motor side hydraulic-fluid port 450P in the left first wheel motor device 700 and the corresponding one first-motor side hydraulic fluid port 450P in the right first wheel motor device 700.

Further, a first-motor/pump conduit (not illustrated) which forms a part of the first-motor/pump line 430 has an end closer to the first hydraulic motors that is branched into two ends through a T-shaped joint (not illustrated) to be fluidly connected to corresponding the other first-motor side hydraulic fluid port 450P in the left first wheel motor device 700 and corresponding the other first-motor side hydraulic fluid port 450P in the right first wheel motor device 700.

In such a case that the second-motor/first-motor conduit and the first-motor/pump conduit are branched through the T-shaped joints as described above, the swing frame 313 may be preferably formed with a second access opening 314c at the portion of the swing frame 313 at which the T-shaped joints are positioned as illustrated in FIG. 22, which can improve the efficiency of operations for attaching and detaching the T-shaped joints.

Further, in the present embodiment, as illustrated in FIG. 17, the first wheel motor device 700 is provided with a motor-side drain port 455P formed in the motor housing 253 and a brake-side drain port 456P formed in the brake housing 765.

In this case, as illustrated in FIG. 22, the swing frame 313 may be formed with third access openings 314d at portions of the swing frame 313 that corresponds to the motor-side drain port 455P and the brake-side drain port 456P in the pair of first wheel motor devices 700.

By forming the third access openings 314d, it is possible to improve the efficiency of operations for attaching and detaching conduits to and from the drain ports 455P and 456P.

Meanwhile, as described above, in the vehicle 201A according to the present embodiment, the first-wheel side length L1 is different from the second-wheel side length L2.

In such an articulate type vehicle structured such that the first-wheel side length L1 is different from the second-wheel side length L2, a difference in turning radius between the first and second wheels 221 and 222 occurs during the turning movement of the vehicle, and the difference in turning radius increases as the turning angle of the vehicle increases.

Figure 23:
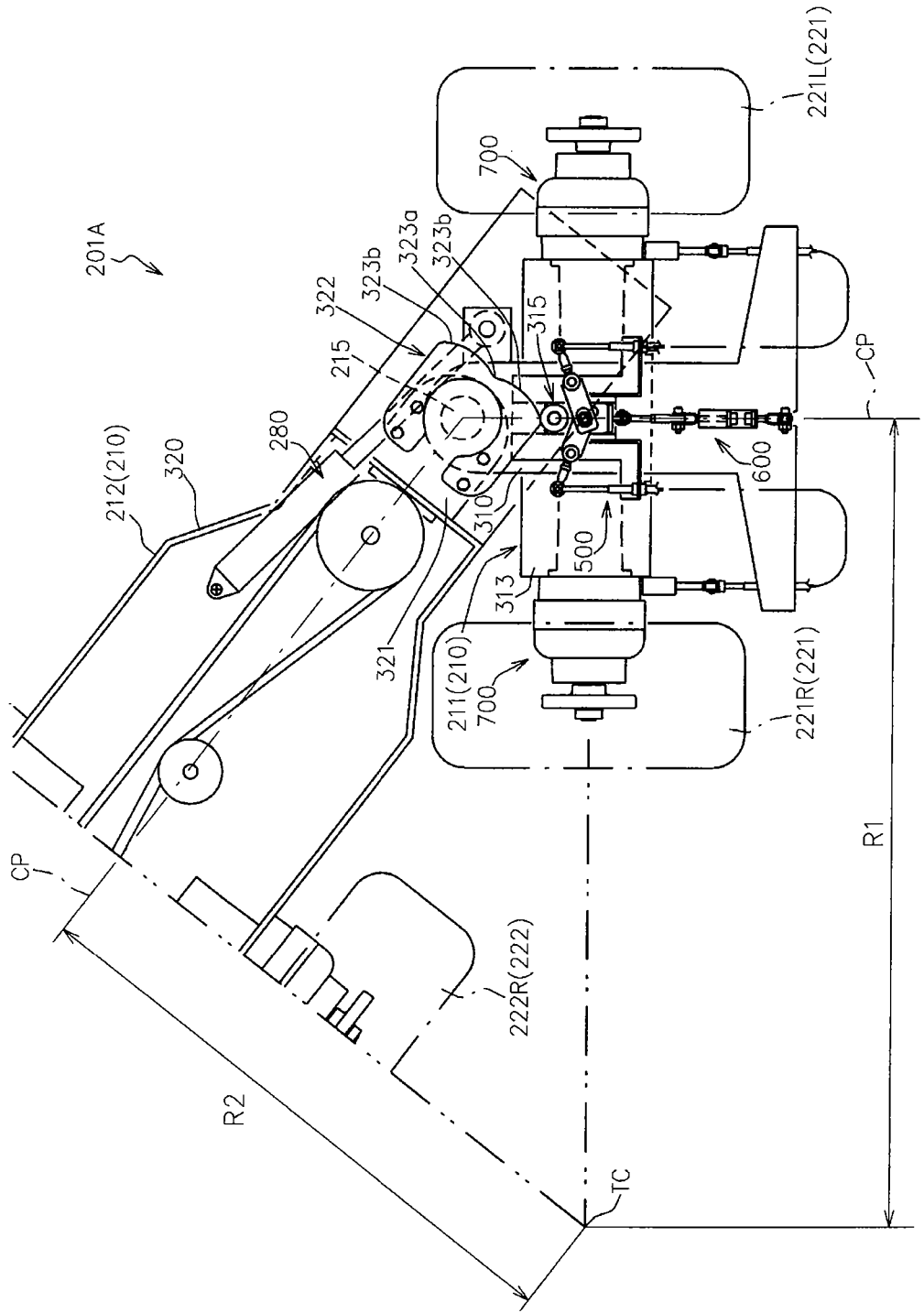
FIG. 23 is a partial bottom view of the vehicle shown in FIGS. 14-17 at the turning movement of the vehicle.

FIG. 23 illustrates a partial bottom view of the vehicle 201A at a state where the vehicle is making a turn.

As illustrated in FIG. 23, the vehicle 201A has a turning center TC located at a position where the rotation axis of the first wheels 221 and the rotational axis of the second wheels 222 are intersected with each other in a plan view.

The turning radius R1 of the second wheels 221 is defined by the distance from the turning center TC to the center point between the second wheels 221 in the vehicle widthwise direction, while the turning radius R2 of the second wheels 222 is defined by the distance from the turning center TC to the center point between the second wheels 222 in the vehicle widthwise direction.

In an articulate type vehicle structured such that the first-wheel side length L1 is different from the second-wheel side length L2, as illustrated in FIG. 23, a difference is induced between the turning radius R1 of the first wheels 222 and the turning radius R2 of the second wheels 222, and the difference in turning radius increases as the turning angle of the vehicle increases.

More specifically, in a case where the first-wheel-side length L1 between the pivot shaft 215 and the first wheels 221 positioned on the rear side is smaller than the second-wheel-side length L2 between the pivot shaft 215 and the second wheels 222 positioned on the front side as in the present embodiment, the turning radius R1 of the first wheels 221 becomes greater than the turning radius R2 of the second wheels 222 as the turning angle of the vehicle increases and, as a result, the length of the passage trajectory of the first wheels 221 during the turning movement of the vehicle becomes larger than that of the second wheels 222.

On the contrary, in a case where the first-wheel side length L1 between the pivot shaft 215 and the first wheels 221 positioned on the rear side is larger than the second-wheel side length L2 between the pivot shaft 215 and the second wheels 222 positioned on the front side, the turning radius R1 of the first wheels 221 becomes smaller than the turning radius R2 of the second wheels 222 as the turning angle of the vehicle increases and, as a result, the length of the passage trajectory of the first wheels 221 during the turning movement of the vehicle becomes smaller than that of the second wheels 222.

In order to drive both the first and second wheels without inducing slippages or drags in the first and second wheels 221 and 222 in a vehicle which increases the difference between the turning radius R1 of the first wheels 221 and the turning radius R2 of the second wheels 222 in accordance with the increase of the turning angle of the vehicle, it is necessary to create a difference between a driving speed for the first wheels 221 and a driving speed for the second wheels 222, according to the difference in turning radius between the first and second wheels 221 and 222.

The vehicle 201A according to the present embodiment includes the following structure for coping with the aforementioned circumstance.

As illustrated in FIG. 19 and FIG. 20, the second frame 212 includes a cam pushing member 322 having a cam surface 323, the cam pushing member 322 being secured to the second frame main body 321 in a relatively non-rotatable manner with respect thereto such that it swings about the pivot shaft 215 together with the second frame main body 320.

In the present embodiment, the cam pushing member 322 is secured to the lower wall of the mounting stay 321 provided at the second frame main body 320.

As illustrated in FIGS. 19 to 21, the first frame 211 further includes a cam follower member 315 which is mounted to the first frame main body 310 such that it is faced to the cam surface 323 at a state where the cam follower member 315 is relatively immovable about the pivot shaft 215 but is relatively movable in a predetermined first direction with respect to the first frame main body 310, and a biasing member 316 which operatively presses the cam follower member 315 toward the cam surface 323.

In the present embodiment, as illustrated in FIGS. 19 to 21, a guide member 317 for defining a movement path of the cam follower member 315 along the first direction is mounted to the first frame main body 310.

The guide member 317 defines the movement path such that the first direction is along the vehicle lengthwise direction.

More specifically, as illustrated in FIG. 19 and FIG. 20, the guide member 317 includes a pair of left and right guide members 317a and 317b which are placed such that they are spaced apart from each other in the vehicle widthwise direction with the imaginary center plane CP sandwiched therebetween, so that the space extending in the vehicle lengthwise direction between the pair of left and right guide members 317a and 317b defines the movement path.

The first frame main body 310 is further provided with a movable member 318 which is movable along the first direction (the vehicle lengthwise direction in the present embodiment) within the movement path, and the cam follower member 315 is supported by the movable member 318.

Preferably, as illustrated in FIG. 19 and FIG. 20, the movable member 318 can be provided with a supporting shaft 318a along a substantially vertical direction, and a bearing member which functions as the cam follower member 315 can be externally inserted on the supporting shaft 318a.

With this structure, it is possible to effectively reduce the frictional resistance between the cam follower member 315 and the cam surface 323.

In the present embodiment employing the movable member 318, the biasing member 316 presses the cam follower member 315 toward the cam surface 323 through the movable member 318.

The cam surface 323 includes a reference area 323*a* with which the cam follower member 315 is engaged when the second frame main body 320 is positioned at the straight travel position (see FIG. 19) with respect to the first frame main body 310, and a pair of control areas 323*b* extending in one direction and the other direction about the axis of the pivot shaft 215 from the reference area 323*a*.

The pair of control areas 323*b* have shapes symmetrical to each other with the reference area 323*a* as a reference and, also, are structured such that a radial distance from the axis line of the pivot shaft 215 to the control areas 323*b* gradually increases and decreases as a distance from the reference area 323*a* about the axis line of the pivot shaft 215 increases.

In the present embodiment, as illustrated in FIG. 19 and FIG. 23, the pair of control areas 323*b* are structured such that the radial distance from the axis of the pivot shaft 215 to the control areas 323*b* gradually increases and decreases as the distance from the reference area 323*a* about the axis of the pivot shaft 215 increases.

Specifically, the cam follower member 315 is pressed toward the cam pushing member 322 directly or indirectly by the biasing member 316 so as to be constantly engaged with the cam surface 323.

When the second frame main body 320 is positioned at the straight travel position with respect to the first frame main body 310, the cam follower member 315 engages with the reference area 323*a* and, thus, is positioned at a standard position in the first direction (the vehicle lengthwise direction in the present embodiment (see FIG. 19). Further, when the second frame main body 320 is swung from the straight travel position with respect to the first frame main body 310 about the pivot shaft 215, the cam follower member 315 engages with one of the pair of control areas 323*b* and, thus, is moved from the standard position in the first direction by an amount corresponding to the amount of the swing of the second frame main body 320 with respect to the first frame main body 310 (see FIG. 23).

The vehicle 201A according to the present embodiment is structured to actuate the motor-side capacity adjustment mechanisms 255 utilizing the movement of the cam follower member 315 in the first direction.

With the vehicle 201A having the structure, it is possible to actuate the motor-side capacity adjustment mechanisms 255 in such a way as to effectively compensate for the difference in turning radius induced between the first and second wheels 221 and 222, without providing a specific structure in the motor-side capacity adjustment mechanism 255.

Specifically, the cam follower member 315 moves in the same direction along the first direction by an amount corresponding to the turning angle of the vehicle, no matter whether the vehicle 201A makes a turn in the leftward direction or in the rightward direction.

Accordingly, by utilizing the movement of the cam follower member 315 along the first direction, it is possible to actuate the motor-side capacity adjustment mechanisms 255 by an amount corresponding to the turning angle of the vehicle, no matter which direction the vehicle 201A makes a turn.

More specifically, as illustrated in FIG. 19, FIG. 20 and FIG. 23, the vehicle 201A further includes a hydraulic-motor actuating mechanism 500 for actuating the motor-side capacity adjustment mechanisms 255 according to the movement of the cam follower member 315 along the first direction.

The motor-side capacity adjustment mechanism 255 will now be described, at first.

In the vehicle 201A according to the present embodiment, as described above, the first-wheel side length L1 is smaller than the second-wheel-side length L2 and, thus, the turning radius R1 of the first wheels 221 becomes larger than the turning radius R2 of the second wheels 222 as the turning angle of the vehicle increases.

In the vehicle 201A having the aforementioned structure, the motor-side capacity adjustment mechanism 255 is structured so as to change the capacity of the first hydraulic motors 250 between a standard capacity and a first capacity smaller than the standard capacity, the standard capacity making the peripheral speed of the first wheel 221 driven by the first hydraulic motor 250 substantially equal to the peripheral speed of the second wheel 222 driven by the second hydraulic motor 260.

The first capacity is a capacity which makes the peripheral speed of the first wheel 221 larger than the peripheral speed of the second wheel 222 in such a way as to compensate for the difference in tuning radius induced at a state where the vehicle make a turn to a maximum extent.

Figure 24:
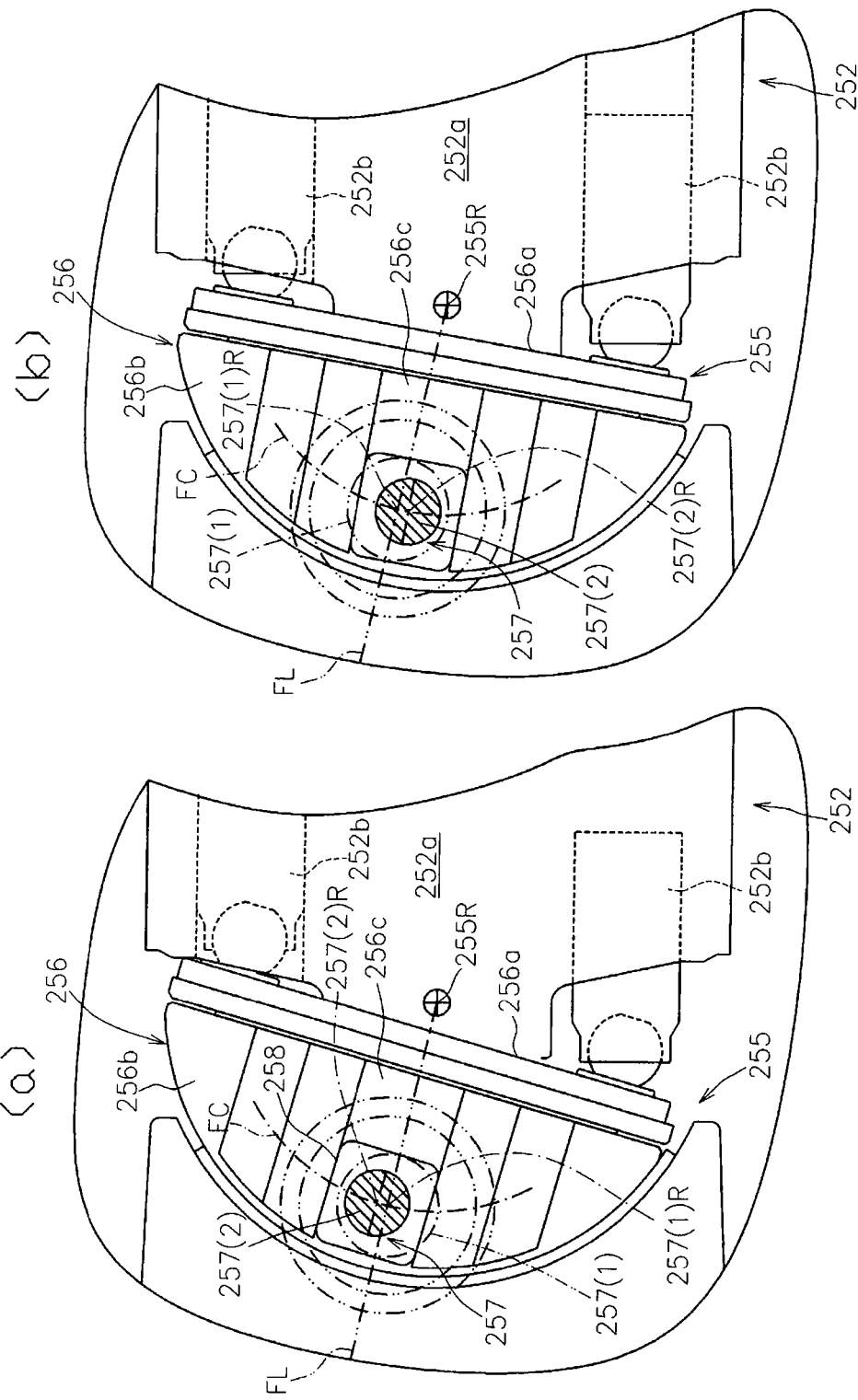
FIG. 24 is a cross-sectional view taken along the line XXIV-XXIV in FIG. 17, and FIGS. 24($a$) and 24($b$) show a first hydraulic motor of the first wheel motor device in a state of having a standard capacity and a first capacity, respectively.

FIG. 24 illustrates a cross-sectional view taken along the line XXIV-XXIV in FIG. 17.

More specifically, as illustrated in FIG. 17 and FIG. 24, the motor-side capacity adjustment mechanism 255 includes a motor-side movable swash plate 256 capable of being slanted about a tilting axis line 255R orthogonal to the motor shaft 251 in such a way as to define a range of a reciprocating movement of the motor-side pistons 252*b*, and a motor-side control shaft 257 which is supported by the motor housing 253 in a relatively rotatable manner about an axis line in a state of being in parallel to the tilting axis line 255R and which slants the motor-side movable swash plate 256 about the tilting axis line 255R according to the rotation of itself about its axis line which are caused by an operation from the outside.

Further, FIGS. 24(*a*) and 24(*b*) illustrate a standard position and a first position of the motor-side movable swash plate 256 that cause the first hydraulic motor 250 to have the standard capacity and the first capacity, respectively.

As illustrated in FIG. 24, the motor-side movable swash plate 256 can be slanted about the tilting axis line 255R at a state where it directly or indirectly engages with free ends of the motor-side pistons 252*b*, thereby changing the range of the reciprocating movement of the motor-side pistons 252*b* according to the angle of the slant thereof about the tilting axis line 255R.

As illustrated in FIG. 17 and FIG. 24, the motor-side control shaft 257 includes a first end portion 257(1) which is supported by the motor housing 253 in a rotatable manner about its axis line 257(1)R, and a second end portion 257(2) which is engaged with the motor-side movable swash plate 256 in such a way as to slant the motor-side movable swash plate 256 about the tilting axis line 255R in accordance with the rotation of the first end portion 257(1) about the axis line 257(1)R.

As illustrated in FIG. 24, the second end portion 257(2) is eccentric with respect to the first end portion 257(1) and is engaged in an engagement groove 256*c* formed in the motor-side movable swash plate 256.

Specifically, as illustrated in FIG. 24, the motor-side movable swash plate 256 includes a piston engagement surface 256*a* which is faced in the direction along the axial direction of the motor shaft 251 and which directly or indirectly engages with the free ends of the motor-side pistons 252*b* and, further, includes a control end surface 256*b* which is faced in the direction along the tilting axis line 255R such that it faces the motor-side control shaft 257.

As shown in FIG. 24, the engagement groove 256c is formed in the control end surface 256b so as to extend in a radial direction with the tilting axis line 255R as a reference.

The second end portion 257(2) of the motor-side control shaft 257, which has the axis line 257(2)R that is eccentric with respect to the axis line 257(1)R of the first end portion 257(1) (see FIG. 24), is engaged into the engagement groove 256c so as to be movable in a radial direction but immovable in a circumferential direction relative to the motor-side movable swash plate 256 with the tilting axis line 255R as a reference.

In the present embodiment, the second end portion 257(2) is engaged into the engagement groove 256c via an outserted member 258 in which the second end portion 257(2) is inserted and which has a rectangular shape in planar view.

In the motor-side control shaft 257 thus configured, when the first end portion 257(1) is rotated about the axis line 257(1)R, the second end portion 257(2) is rotated about the axis line 257(1)R of the first end portion 257(1), so that the motor-side movable swash plate 256 is slanted about the tilting axis line 255R.

Preferably, the motor control shaft 170 is configured in such a manner that, when the motor-side movable swash plate 256 is positioned at the standard position, the axis line 257(2) of the second end portion 257(2) of the motor-side control shaft 257 is positioned at a first position that is fallen on a virtual circular arc FC having a center coaxial with the tilting axis line 255R and passing through the axis line 257(1)R of the first end portion 257(1) and that is positioned on a first side than a virtual reference line FL passing through the tilting axis line 255R and the axis line 257(1)R of the first end portion 257(1) in a circumferential direction with the tilting axis line 255R as a reference (refer to FIG. 24A).

The preferable configuration makes it possible to effectively prevent the motor-side movable swash plate 256 from being unintentionally displaced from the standard position when the vehicle is in the straight traveling state.

More specifically, during the hydraulic-motor main body 252 is driven to rotate about its rotational axis by hydraulic fluid supplied directly or indirectly from the hydraulic-pump main body 242, the hydraulic fluid supplied from the hydraulic-pump main body 242 to the hydraulic-motor main body 252 acts on the motor-side movable swash plate 256 so as to press the motor-side movable swash plate 256 toward the neutral position.

That is, the motor-side movable swash plate 256 is constantly pressed toward the neutral position by hydraulic fluid. Therefore, there is required a retaining force acting against a biasing force (hereinafter, referred to as a neutrally directed biasing force) that is caused by hydraulic fluid to press the motor-side movable swash plate 256 toward the neutral position, in order to keep the motor-side movable swash plate 256 at the standard position when the vehicle is in the straight traveling state.

As already described, in the present embodiment, the second end portion 257(2) of the motor-side control shaft 257 is engaged into the engagement groove 256c formed in the motor-side movable swash plate 256, while being eccentric with respect to the first end portion 257(1).

In this configuration, if the second end portion 257(2) is applied with a force of rotating the second end portion 257(2) about the axis line 257(1)R of the first end portion 257(1), the motor-side movable swash plate 256 positioned at the standard position is slanted about the tilting axis line 255R.

In other words, if the second end portion 257(2) is not applied with a force of rotating the second end portion 257(2) about the axis line 257(1) of the first end portion 257(1), the motor-side movable swash plate 256 can be kept at the predetermined tilting position.

That is, in a configuration that does not allow the neutrally directed biasing force to function as the force of rotating the second end portion 257(2) about the axis line 257(1)R of the first end portion 257(1), the motor-side movable swash plate 256 can be stably kept at the standard position.

In this regard, provided that the axis line 257(2)R of the second end portion 257(2) of the motor-side control shaft 257 is located on the virtual circular arc FC when the motor-side movable swash plate 256 is located at the standard position, it is possible to have the neutrally directed biasing force along the virtual circular arc FC substantially aligned with a straight line passing through the axis line 257(2)R of the second end portion 257 and the axis line 257(1)R of the first end portion 257(1).

With the configuration, it is possible to prevent as much as possible the neutrally directed biasing force from functioning as the force of rotating the second end portion 257(2) about the axis line 257(1)R of the first end portion 257(1), thereby stably keeping the motor-side movable swash plate 256 at the standard position.

In place of and/or in addition to the preferable configuration at the time when the motor-side movable swash plate 256 is positioned at the standard position, it is possible to have a configuration in which, when the motor-side movable swash plate 256 is positioned at the first position, the axis line 257(2) of the second end portion 257(2) is positioned at a second position that is fallen on the virtual circular arc FC and that is positioned on a second side than the virtual reference line FL about the tilting axis line 255R.

The configuration makes it possible to effectively prevent the motor-side movable swash plate 256 form tilting toward the neutral side across the first position, thereby effectively preventing the driving speed for the first wheels 221 driven by the first hydraulic motor 250 from unintentionally increasing.

Next, the hydraulic-motor actuating mechanism 500 will be described.

Figure 25:
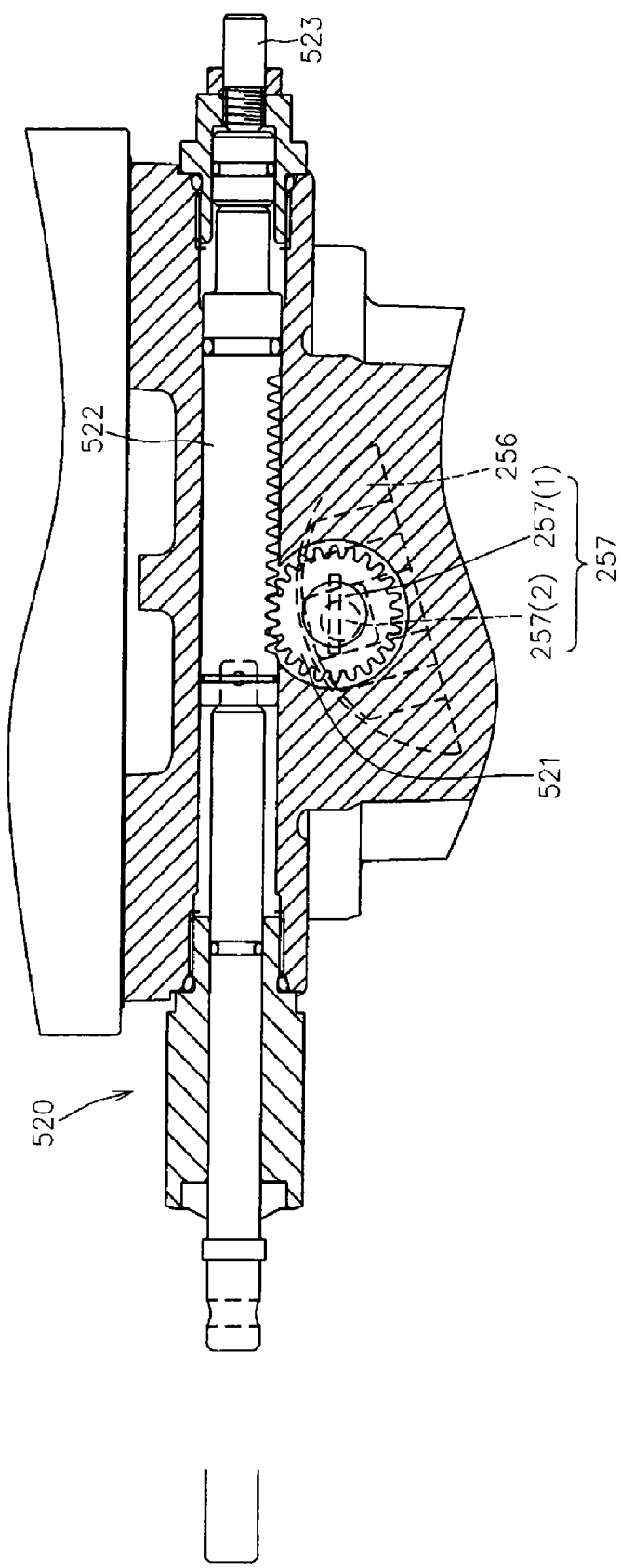
FIG. 25 is a cross-sectional view taken along the line XXV-XXV in FIG. 17.

FIG. 25 illustrates a cross-sectional view taken along the line XXV-XXV in FIG. 17.

As illustrated in FIG. 19 and FIG. 25, the hydraulic-motor actuating mechanism 500 includes a cam-follower-side actuating mechanism 510 which is operatively coupled to the cam follower member 315, a pair of motor-side actuating mechanisms 520 which are operatively coupled to the motor-side capacity adjustment mechanisms 255 of the pair of first hydraulic motors 250, and a coupling member 530 which operatively couples the cam-follower-side actuating mechanism 510 to the pair of motor-side actuating mechanisms 520.

As illustrated in FIG. 17 and FIG. 25, the motor-side actuating mechanisms 520 include an actuating gear 521 which is provided at the first end portion 257(1) of the motor-side control shaft 257 in a relatively non-rotatable manner with respect thereto, and an actuating piston 522 which can move in the direction orthogonal to the motor control shaft 257 and which is provided with a rack engaged with the actuating gear 521.

The motor-side actuating mechanisms 520 are structured to tilt the motor-side movable swash plate 256 between the first position and the standard position, in accordance with a movement of the actuating piston 522 in one direction and the other direction in the axial direction through the coupling member 530.

In the present embodiment, the motor-side actuating mechanisms 520 include a first stop member 523 which defines an end of the movement of the actuating piston 522 in one direction in the axial direction.

Preferably, the first stop member 523 can be adjustable in position with respect to the actuating piston 522.

As illustrated in FIG. 19, the cam-follower-side actuating mechanism 510 includes a pair of left and right supporting shafts 511 which are supported by the first frame main body 310 so as to be along a substantially vertical direction at positions symmetrical to each other in the vehicle widthwise direction with the cam follower member 315 as a reference, and a pair of left and right swing arms 512 which are supported by the pair of left and right supporting shafts 511 at their longitudinal intermediate positions and which have first ends operatively coupled to the cam follower member 315.

As illustrated in FIG. 19, in the present embodiment, the movable member 318 is provided with a coupling shaft 319 and, also, the pair of left and right swing arms 512 are formed at the first ends with elongated holes in which the coupling shaft 319 is engaged. The pair of swing arms 512 are operatively coupled to the cam follower member 315 through the movable member 318.

The coupling member 530 includes a pair of left and right push-pull wires 531 which have first ends coupled to free ends of the pair of left and right swing arms 512 and second ends coupled to the motor-side capacity adjustment mechanisms 255 in the pair of first hydraulic motors 250.

With the hydraulic-motor actuating mechanism 500 having the structure, it is possible to actuate the motor-side capacity adjustment mechanisms 255 in the pair of first hydraulic motors 250 at a state where they are accurately synchronized with each other.

Particularly, since the push-pull wires 531 are used as the coupling member 530, it is possible to actuate the motor-side capacity adjustment mechanisms 255 in the pair of left and right first hydraulic motors 250 at a state where they are accurately synchronized with each other, even when the pair of first wheel motor devices 700 are swung about the leftward/rightward swing reference shaft 312.

The vehicle 201A according to the present embodiment is structured to be capable of selecting a driving mode (hereinafter, referred to as a first/second-motor driving mode) for driving both the first wheels 221 and the second wheels 222 and a driving mode (hereinafter, referred to as a first-motor driving mode) for driving only the first wheels 221. Further, the vehicle 201A according to the present embodiment is structured such that, in the first-motor driving mode, the range within which a traveling speed can be varied by operating the pump-side capacity adjustment mechanism 245 in the variable-displacement type hydraulic pump 240 is shifted to a higher speed range than in the first/second-motor driving mode, thereby widening the variable range in which the traveling speed of the vehicle can be varied.

More specifically, as illustrated in FIG. 14, FIG. 16 and FIG. 20, the vehicle 201A further includes a driving-mode changeover operation member 273 capable of being manually operated for changing over the driving mode, a bypass valve 460 which selectively performing fluid connection or fluid disconnection between the pump/second-motor line 410 and the second-motor/first-motor line 420, a bypass-valve actuating mechanism 550 which moves the bypass valve 460 based on a manual operation on the changeover operation member 273, and a conjunction/constraint mechanism 600 which moves the cam follower member 315 based on a manual operation on the changeover operation member 273.

As illustrated in FIG. 16, the bypass valve 460 is structured to be selectively positioned at a first-motor driving position 461 and a first/second-motor driving position 462. At the first-motor driving position 461, the bypass valve 460 fluidly connects the pump/second-motor line 410 and the second-motor/first-motor line 420 for realizing the first-motor driving mode for driving only the first hydraulic motors 250 (the pair of left and right first hydraulic motors 250L and 250R in the present embodiment). At the first/second-motor driving position 462, the bypass valve 460 fluidly disconnects these lines for realizing the first/second-motor driving mode for driving both the first and second hydraulic motors 250 and 260 (the pair of left and right first hydraulic motors 250L and 250R and the pair of left and right second hydraulic motors 260L and 260R in the present embodiment).

Specifically, when the bypass valve 460 is positioned at the first/second-motor driving position 462, the hydraulic fluid discharged from the hydraulic pump 240 is supplied in series to the second hydraulic motors 260 and the first hydraulic motors 250, thereby driving both the second hydraulic motors 260 and the first hydraulic motors 250.

On the other hand, when the bypass valve 460 is positioned at the first-motor driving position 461, the hydraulic fluid discharged from the hydraulic pump 240 is supplied to only first hydraulic motors 250 while bypassing the second hydraulic motors 260, thereby driving only the first hydraulic motors 250.

Further, in the first-motor driving mode, the second wheels 222 function as driven wheels. Accordingly, no slippage and no drag occur in both the first and second wheels 221 and 222 during both of the straight traveling movement and the turning movement of the vehicle.

Specifically, when the second wheels 222 function as driven wheels, the second hydraulic motors 250 exerts their pumping function, due to the rotation of the second wheels 222.

In regard to this point, a 4-port/2-position type changeover valve is employed as the bypass valve 460. Namely, when the bypass valve 460 is positioned at the first-motor driving position 461, the second hydraulic motors 260 are at a state where their discharge sides are fluidly connected to their suction sides through a sub closed circuit different from the main closed circuit 400, so that the second hydraulic motors 260 can rotate in accordance with the rotation of the second wheels 222.

Figure 26:
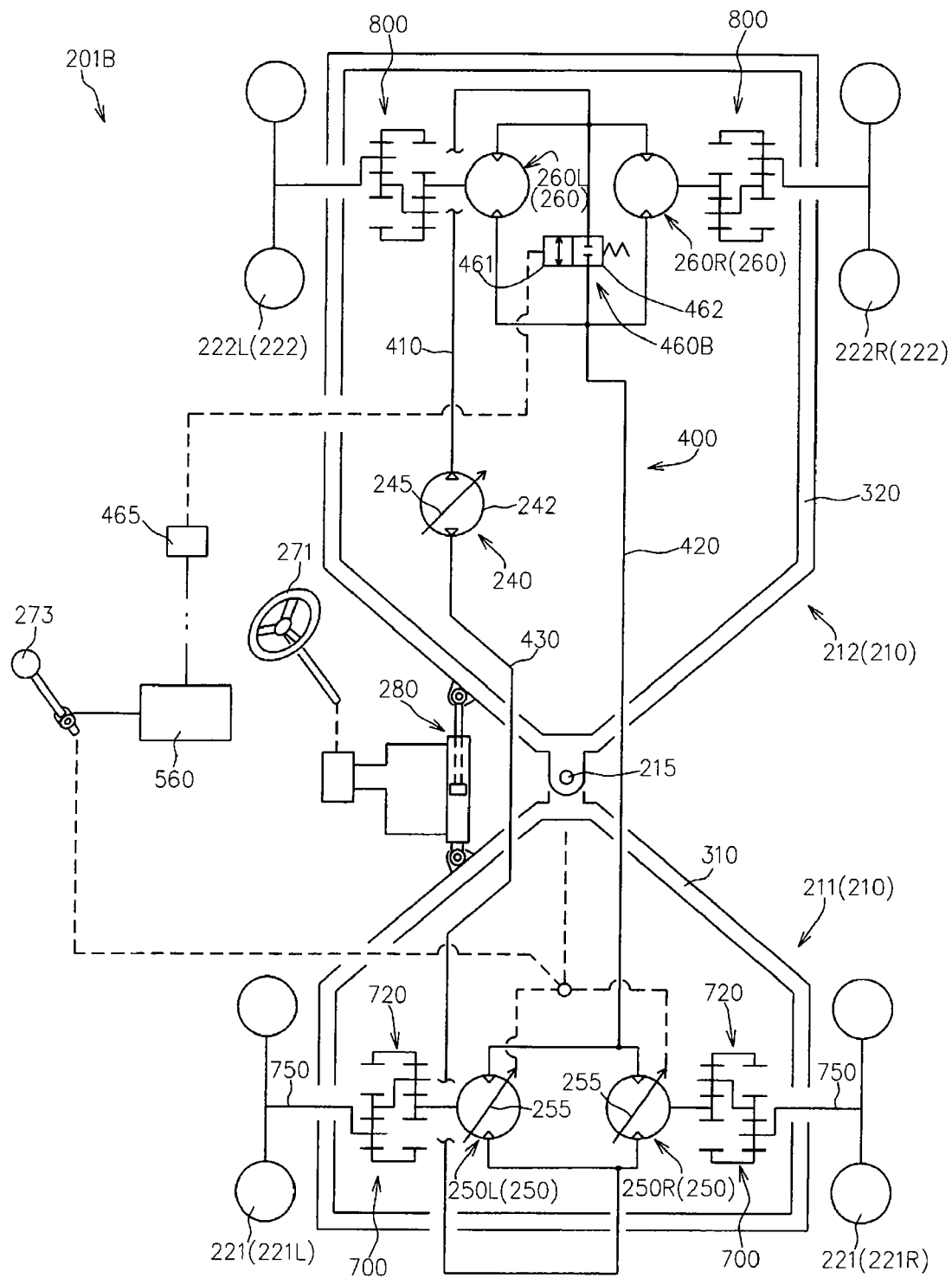
FIG. 26 is a hydraulic circuit diagram of a hydraulic drive vehicle modified from the fifth embodiment.

Instead of this structure, as illustrated in FIG. 26, it is also possible to employ a 2-port/2-position type bypass valve 460B, instead of the bypass valve 460.

In the vehicle 201B illustrated in FIG. 26, when the bypass valve 460B is positioned at the first-motor driving position 461, the hydraulic fluid discharged from the hydraulic pump 240 can flow through either of passing lines in which the second hydraulic motors 260 are inserted and a bypassing line which bypasses the second hydraulic motors 260.

In this case, the second hydraulic motors 260 are operatively coupled to the second wheels 222 and, therefore, are subjected to the rotational loads on the second wheels 222. Accordingly, the hydraulic fluid discharged from the hydraulic pump 240 flows through the bypassing line which is subjected to the load smaller than the passing line, so that only the first hydraulic motors 250 are driven.

Although the second hydraulic motors 260 rotate in response to the rotation of the second wheels 222 which function as driven wheels and, in the vehicle 201B illustrated in FIG. 26, the discharge sides of the second hydraulic motors 260 are fluidly connected to their suction sides through the main closed circuit 400. This allows the second hydraulic motors 260 to rotate in response to rotation of the second wheels 222.

The changeover operation member 273 is provided near the driving seat 270, as illustrated in FIG. 14.

The changeover operation member 273 is structured to selectively take a first-motor driving position and a first/second-motor driving position according to a manual operation thereon.

The bypass-valve actuating mechanism 550 can take various forms, provided that it can selectively position the bypass valve 460 (or 460B) at the first-motor driving position 461 or the first/second-motor driving position 462 based on a manual operation on the changeover operation member 273.

In the present embodiment, an electromagnetic changeover valve is employed as the bypass valve 460 (or 460B), and the solenoid 465 in the electromagnetic changeover valve functions as the bypass-valve actuating mechanism 550.

Specifically, as illustrated in FIG. 16, the vehicle 201A according to the present embodiment includes an operating position detection sensor 570 (see FIG. 20) for directly or indirectly detecting the position to which the changeover operation member 273 has been operated, and a controller 560 which receives a travel-mode selection signal from the operating position detection sensor 570, and the solenoid 465 which functions as the bypass-valve actuating mechanism 550 is controlled in operation by the controller 560.

Figure 27:
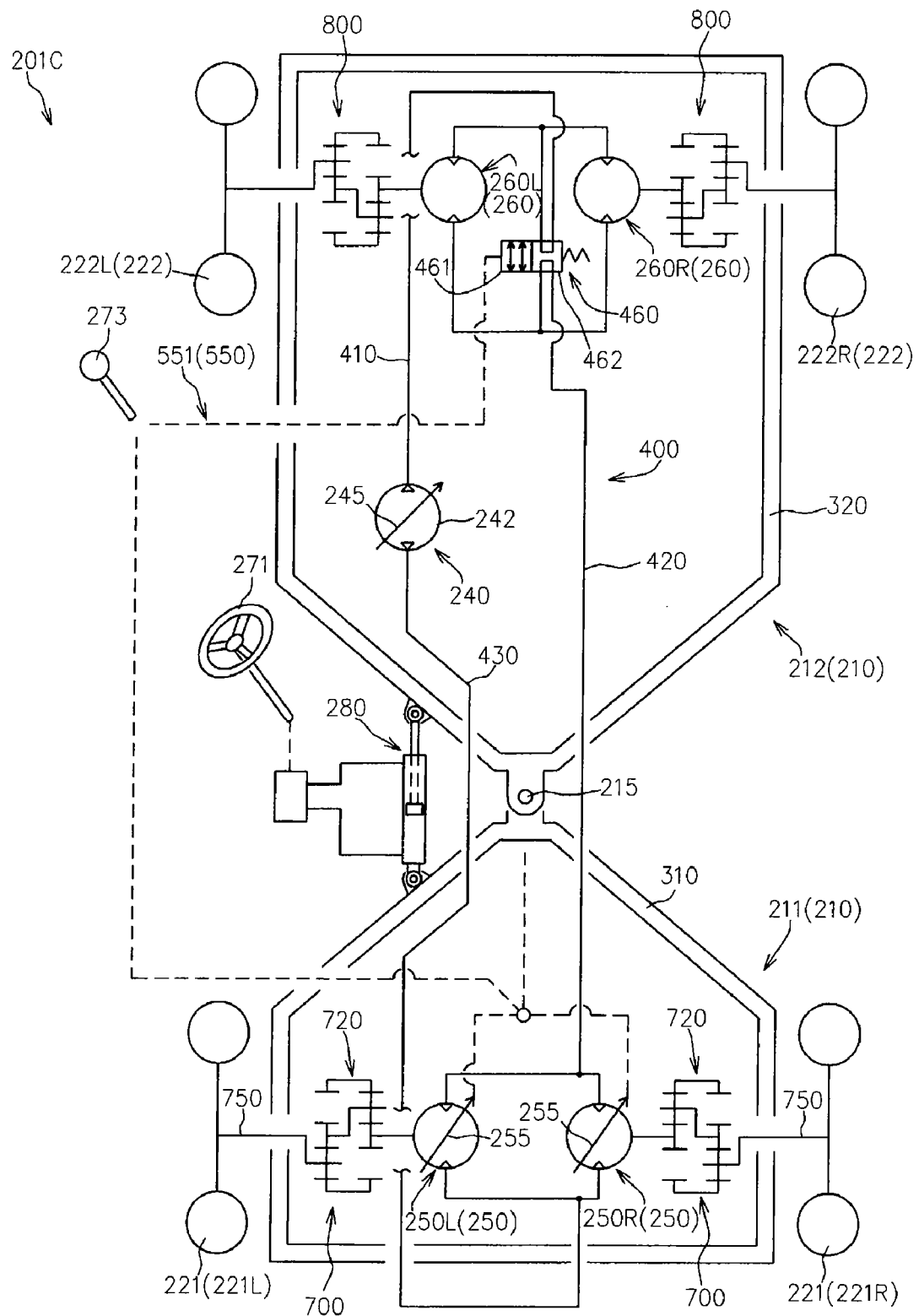
FIG. 27 is a hydraulic circuit diagram of another hydraulic drive vehicle modified from the fifth embodiment.

Instead of this structure, as illustrated in FIG. 27, it is also possible to employ a mechanical link mechanism 551 for moving the bypass valve 460 utilizing the mechanical movement of the changeover operation member 273, as the bypass-valve actuating mechanism 550.

The conjunction/constraint mechanism 600 is structured to move the cam follower member 315 in the first direction according to a manual operation on the changeover operation member 273 and, also, is structured to allow the cam follower member 315 to be moved by the cam pushing member 322 in the first direction while maintaining the changeover operation member 273 positioned at the first/second-motor driving position.

More specifically, in the vehicle 201A according to the present embodiment, as described above, the first-wheel-side length L1 is smaller than the second-wheel-side length L2 and, also, the motor-side capacity adjustment mechanisms 255 are structured to change the capacities of the first hydraulic motors 250 between the standard capacity and the first capacity smaller than the standard capacity.

Further, the pair of control areas 323b of the cam surface 323 are structured such that the radial distance from the axis of the pivot shaft 215 to the control areas 323 gradually increases and decreases as a distance from the reference area 323a about the axis of the pivot shaft 215 increases. Accordingly, when the second frame main body 320 is positioned at the straight travel position with respect to the first frame main body 310 (see FIG. 19), the cam follower member 315 is positioned at the standard position on one side in the first direction (on the front side in the present embodiment. Further, when the second frame main body 320 is swing about the pivot shaft 215 to a maximum extent (see FIG. 23), the cam follower member 315 is positioned at a maximum movement position on the other side in the first direction (on the rear side in the present embodiment).

In the vehicle 201A having the structure, the conjunction/constraint mechanism 600 is configured so as to position the cam follower member 315 at the standard position and at the maximum movement position, respectively, when the changeover operation member 273 is positioned at the first/second-motor driving position and at the first-motor driving position. Further, the conjunction/constraint mechanism 600 is structured to allow the cam follower member 315 to be controlled in position by the cam pushing member 322 while maintaining the changeover operation member 273 positioned at the first/second-motor driving position.

With the vehicle 201A including the conjunction/constraint mechanism 600, it is possible to drive the first and second wheels 221 and 222 without inducing slippages and drags in the first and second wheels 221 and 222 during both straight traveling movement and the steering movement of the vehicle, when the first/second-motor driving mode is selected. Further, when the first-motor driving mode is selected, it is possible to drive the first wheels 221 at a higher speed than when the first/second-motor driving mode is selected.

In the present embodiment, as illustrated in FIG. 19 and FIG. 20, the conjunction/constraint mechanism 600 includes a coil spring 610 which functions as the biasing member for operatively pressing the cam follower member 315 toward the cam surface 323, a cam-follower-member side coupling member 620 which operatively couples the coil spring 610 and the cam follower member 315 to each other, an operation-side link member 630 which is operatively coupled to the changeover operation member 273, an operation-side coupling member 640 which operatively couples the coil spring 610 and the operation-side link member 630 to each other, and an intermediate coupling member 650 which couples the cam-follower-member side coupling member 620 and the operation-side coupling member 640 to each other.

The coil spring 610 is placed along the first direction at a position closer to the other side in the first direction than the cam follower member 315.

In the present embodiment, as described above, the first direction is set to be along the vehicle lengthwise direction and, as illustrated in FIG. 19 and FIG. 20, the coil spring 610 is along the vehicle lengthwise direction at a position closer to the rear side of the vehicle than the cam follower member 315.

The cam-follower-member side coupling member 620 has a first end engaged with a first end 611 of the coil spring 610 which is closer to the cam follower member 315 and, also, has a second end operatively coupled to the cam follower member 315, so that cam-follower-member side coupling member 620 is moved in the first direction together with the cam follower member 315.

In the present embodiment, as described above, the cam follower member 315 is supported by the movable member 318. Accordingly, the cam-follower-member side coupling member 620 has the second end coupled to the movable member 318.

Figure 28:
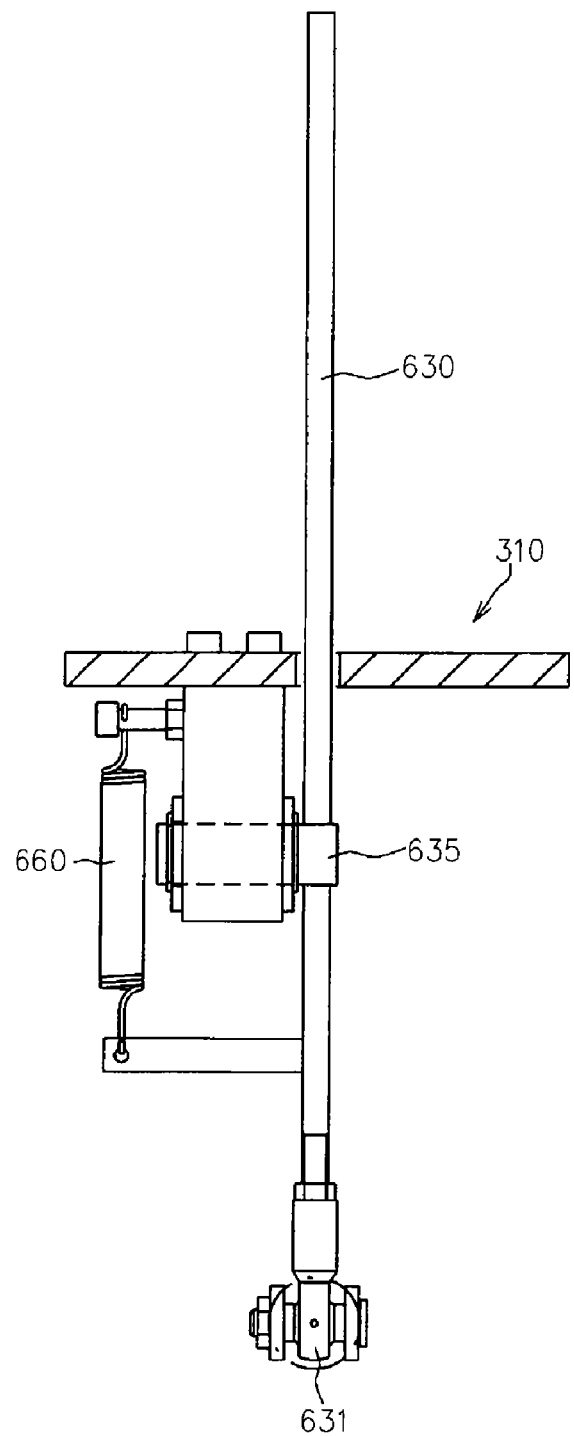
FIG. 28 is an end view taken along the line XXVIII-XXVIII in FIG. 20.

FIG. 28 illustrates an end view taken along the line XXVIII-XXVIII in FIG. 20.

As illustrated in FIG. 20 and FIG. 28, the operation-side link member 630 includes an actuating portion 631 which faces a second end 612 of the coil spring 610 at the opposite side from the first end 611. Further, the operation-side link member 630 is operatively coupled to the changeover operation member 273, such that, when the changeover operation member 273 is positioned at the first-motor driving position and at the first/second-motor driving position, the actuating portion 631 is at a position spaced apart from the second end 612 and a position close thereto, respectively.

In the present embodiment, as illustrated in FIG. 20 and FIG. 28, the operation-side link member 630 is supported by the first frame main body 310 in a swinging manner about a rotation axis 635 along the vehicle widthwise direction so as to swing between a first/second-motor driving position (see a solid line in FIG. 20) and a first-motor driving position (see a chain line in FIG. 20) which are respectively positioned on one side and the other side about the rotation axis 635. Further, the operation-side link member 630 has a first end operatively coupled to the changeover operation member 273 and has a second end which functions as the actuating portion 631.

As illustrated in FIG. 20, the operation-side coupling member 640 has a first end engaged with the second end 612 of the coil spring 610 such that it faces the first end of the cam-follower side coupling member 620 with the coil spring 610 sandwiched therebetween and, also, has a second end coupled to the actuating portion 631 of the operation-side link member 630, so that the operation-side coupling member 640 moves in the first direction in accordance with the swing of the operation-side link member 630 about the rotation axis 635.

As illustrated in FIG. 20, the intermediate coupling member 650 couples the first ends of the cam-follower-member side coupling member 620 and the operation-side coupling member 640 to each other, at a state where the intermediate coupling member 650 allows the first ends of the cam-follower-member coupling member 620 and the operation-side coupling member 640 to move relative to each other in such a direction as that they come close to each other while compressing the coil spring 610 and, also, prevents the first ends from moving relative to each other in such a direction that they separate from each other.

The conjunction/constraint mechanism 600 having the structure operates as follows.

At first, there will be described a case where the first/second-motor driving move is selected.

When the changeover operation member 273 is positioned at the first/second-motor driving position, the operation-side link member 630 is positioned at the first/second-motor driving position (the solid line in FIG. 20) about the rotation axis 635, and the cam follower member 315 is engaged with the cam surface 323 of the cam pushing member 322 through the coil spring 610 and the cam-follower-member side coupling member 620.

Accordingly, when the vehicle travels straight, the cam follower member 315 engages with the reference area 323*a* of the cam surface 323 and, thus, is positioned at the standard position in the first direction (see FIG. 19). Further, when the vehicle makes a turn, the cam follower member 315 engages with one of the pair of control areas 323*b* of the cam surface 323 and thus is moved from the standard position, by an amount corresponding to the turning angle of the vehicle, toward the other side (the rear side in the present embodiment) in the first direction (see FIG. 23).

Although the cam-follower-member side coupling member 620 is also moved toward the other side in the first direction along with the movement of the cam follower member 315 toward the other side in the first direction from the standard position, the intermediate coupling member 650 allows the cam-follower-member side coupling member 620 to come close to the operation-side coupling member 640 while compressing the coil spring 610, as described above. Accordingly, the cam follower member 315 is allowed to be controlled in position by the cam pushing member 322.

Next, there will be described a case where the first-motor driving mode is selected.

When the changeover operation member 273 is manually operated from the first/second-motor driving position to the first-motor driving position, along therewith, the operation-portion side link member 630 is rotated about the rotation axis 635 from the first/second-motor driving position (the solid line in FIG. 20) to the first-motor driving position (the chain line in FIG. 20).

This movement of the operation-side link member 630 causes the cam follower member 315 to move from the standard position to the maximum movement position, through the operation-side coupling member 640, the intermediate coupling member 650 and the cam-follower-member side coupling member 620.

Then, when the cam follower member 315 is moved from the standard position to the maximum movement position, the hydraulic-motor actuating mechanism 500 actuates the motor-side capacity adjustment mechanisms 255 such that the capacities of the first hydraulic motors 250 become the first capacity, so that the first hydraulic motors 250 are in a state of being driven at a higher speed range.

Preferably, as illustrated in FIG. 20 and FIG. 28, the conjunction/constraint mechanism 600 includes a detent biasing member 660 for holding the operation-side link member 630 at the first/second-motor driving position.

The detent biasing member 660 holds the operation-side link member 630 at the first/second-motor driving position with a biasing force enough to cause the coil spring 610 to be compressed, when the cam follower member 315 is pushed toward the other side in the first direction by the cam pushing member 322 at a state where the operation-side link member 630 is positioned at the first/second-motor driving position.

More preferably, the detent biasing member 660 is structured to bias the operation-side link member 630 toward one side and the other side about the rotation axis 635, respectively, when the operation-side link member 630 is positioned at the first/second-motor driving position on one side about the rotation axis 635 and at the first-motor driving position on the other side about the rotation axis 635.

In the present embodiment, the detent biasing member 660 has a first end coupled to the first frame main body 310 and a second end coupled to the operation-side link member 630.

Further, the second end of the detent biasing member 660 is respectively positioned at one side and the other side about the rotation shaft with a reference line connecting the first end of the detent biasing member 660 to the rotation axis 635 as a reference when the operation-side link member 630 is positioned at the first/second-motor driving position and at the first-motor driving position.

In the vehicle 201B including the 2-port/2-position type bypass valve 460B illustrated in FIG. 26, when the first-motor driving mode (a so-called two-wheel driving mode) is selected and, also, the pump/second-motor line 410 and the first-motor/pump line 430 are fluidly connected to the discharge side and the suction side of the hydraulic pump 240, respectively, high pressures are created at both the suction sides and the discharge sides of the second hydraulic motors 260, which may cause the second wheels 222 functioning as the driven wheels to be subjected to the rotational resistances of the second hydraulic motors 260. If such a situation occurs, the hydraulic pump 240 is subjected to a load, thereby degrading the transmission efficiency.

More specifically, the main closed circuit 400 is, in general, structured such that, when the vehicle travels in a forward direction, the hydraulic fluid discharged from the hydraulic pump 240 is supplied to the first hydraulic motors 250 for driving the rear wheels (the first wheels 221 in the present embodiment), the hydraulic fluid discharged from the first hydraulic motors 250 is supplied to the second hydraulic motors 260 for driving the front wheels (the second wheels 222 in the present embodiment), and the hydraulic fluid discharged from the second hydraulic motors 260 is then returned to the hydraulic pump 240.

Namely, the main closed circuit 400 is structured such that, when the vehicle travels in a forward direction, the first-motor/pump line 430 and the pump/second-motor line 410 are fluidly connected to the discharge side and the suction side of the hydraulic pump 240, respectively. This is for causing the hydraulic motors (the first hydraulic motors 250 in the present embodiment) for driving the rear wheels (the first wheels 221 in the present embodiment) to function as a main hydraulic motor.

In this case, when the vehicle travels in a rearward direction, the pump/second-motor line 410 and the first-motor/pump line 430 are fluidly connected to the discharge side and the suction side of the hydraulic pump 240, respectively.

Accordingly, when the vehicle travels in a rearward direction in a state that the first-motor driving mode is selected, high pressures are created in the pump/second-motor line 410 and the second-motor/first-motor line 420 which are respectively positioned on the suction side and the discharge side of the second hydraulic motors 260, which induces the inconvenience that the second wheels 222 functioning as the driven wheels are subjected to the rotational resistances of the second hydraulic motors 260.

Figure 29:
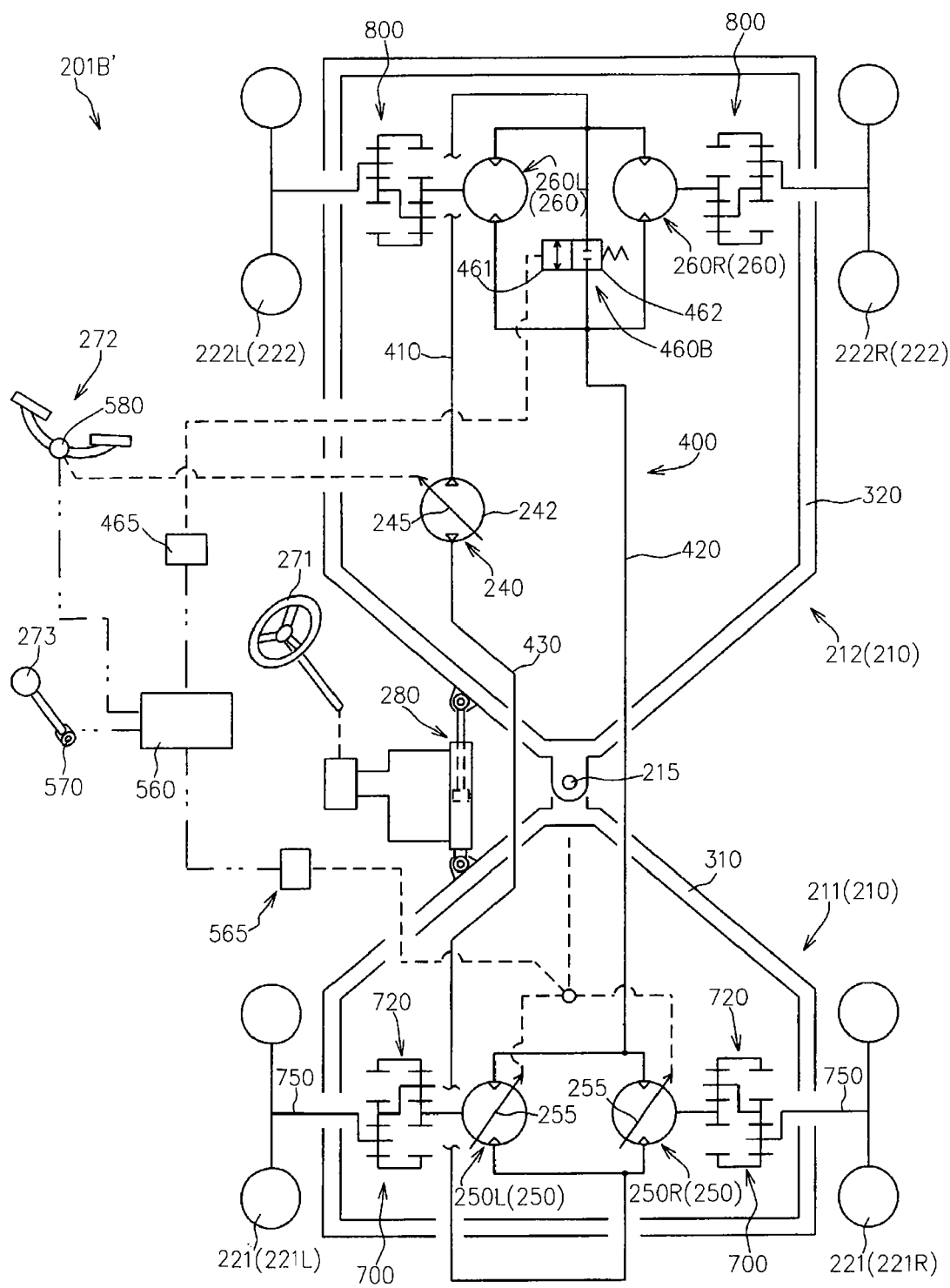
FIG. 29 is a hydraulic circuit diagram of a hydraulic drive vehicle improved from the modified embodiment shown in FIG. 26.

FIG. 29 illustrates a hydraulic circuit diagram of a hydraulic drive vehicle 201B' capable of preventing the inconvenience while including the 2-port/2-position type bypass valve 460B.

In the vehicle 201A or 201B, as illustrated in FIGS. 20, 26 and the like, the changeover operation member 273 is mechanically coupled to the conjunction/constraint mechanism 600, more specifically to the operation-side link member 630.

On the contrary, the vehicle 201B' further includes an electric mechanism 565 which is electrically controlled in operation by the controller 560 based on a manual operation on the changeover operation member 273, and a travel-condition detection sensor 580 for detecting the condition of the traveling of the vehicle.

The electric mechanism 565 actuates the conjunction/constraint mechanism 600, more specifically the operation-side link member 630.

The electric mechanism 565 can take various forms, provided that it can be electrically controlled in operation by the controller 560.

For example, the electric mechanism 565 may be embodied by an electric motor or a combination of a solenoid valve and a hydraulic cylinder mechanism.

The travel-condition detection sensor 580 can take various types of forms, provided that it can detect the direction of travel of the vehicle 201B'.

For example, the travel-condition detection sensor 580 may be structured so as to detect whether the vehicle 201B' is in a forward traveling state, a stopping state (a neutral state) or a rearward traveling state, based on the position to which the speed-change operation member 272 has been operated.

Instead thereof, the travel-condition detection sensor 580 may be structured so as to detect the state of the operation of the pump-side capacity adjustment mechanism 245 (the position to which the movable swash plate or the control shaft 246 has been operated).

In the vehicle 201B', the operating position detection sensor 570 is placed to detect the position to which the changeover operation member 273 has been operated on an upstream side of the conjunction/constraint mechanism 600 in the direction of the transmission of operation forces.

For example, the operating position detection sensor 570 may be structured so as to directly detect the position to which the changeover operation member 273 has been operated.

In the vehicle 201B', the controller 560 is capable of performing a basic control and a rearward travel control. At the basic control, the controller 560 controls he operation of the electric mechanism 565 in such a way as to position the operation-side link member 630 at the first/second-motor driving position while controlling the operation of the solenoid 465 in such a way as to position the bypass valve 260B at a first/second motor driving position (a cutoff position) when the controller 560 determines that the first/second-motor driving mode is being selected through the changeover operation member 273 based on the signal from the operating position detection sensor 570, and also controls the operation of the electric mechanism 565 in such a way as to position the operation-side link member 630 at the first-motor driving position while controlling the operation of the solenoid 465 in such a way as to positioning the bypass valve 260B at the first-motor driving position (a communication position) when the controller 560 determines that the first-motor driving mode is being selected through the changeover operation member 273 based on the signal from the operating position detection sensor 570. On the other hand, at the rearward travel control, the controller 560 forcibly shifts the driving mode to the first/second-motor driving mode if the vehicle is brought into a rearward traveling state even when the first motor driving mode is being selected through the changeover operation member 273 and also cancels the forcible first/second-motor driving mode and restores the driving mode to the first-motor driving mode which has been manually selected when the vehicle is shifted from the rearward traveling state to the neutral state or the forward traveling state.

There will now be described the control by the controller 560 in the vehicle 201B', by exemplifying a case where the pump/second-motor line 410 and the first-motor/pump line 430 are fluidly connected to the discharge side and the suction side of the hydraulic pump 240, respectively, when the vehicle travels in a rearward direction.

Figure 30:
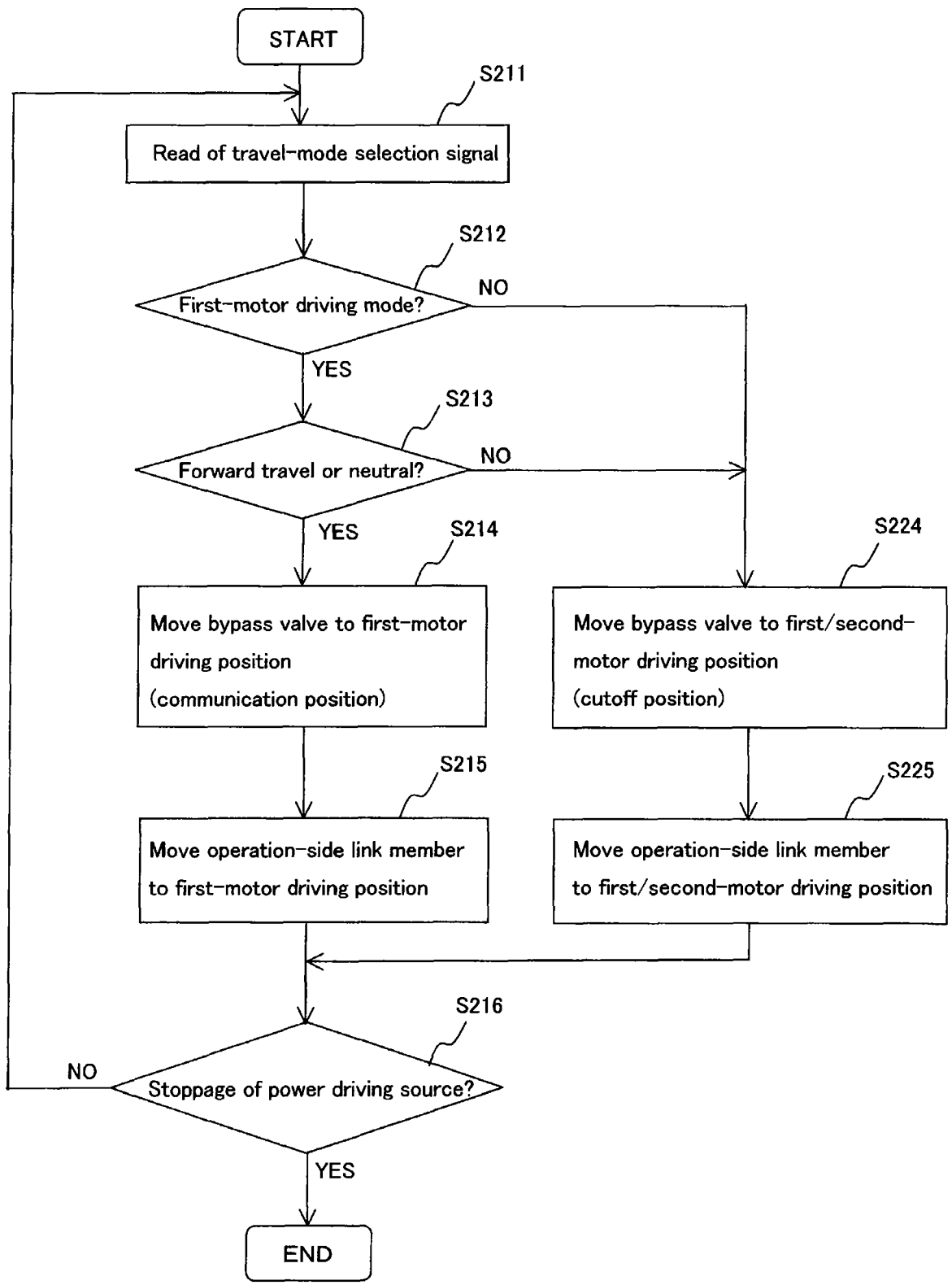
FIG. 30 is a flow chart of an example of a driving mode changeover control by a controller in the vehicle shown in FIG. 29.

FIG. 30 illustrates an example of the flow of control by the controller 560 in the vehicle 201B'.

If the controller 560 starts control for changing over the driving mode in response to the activation of the driving power source 230 (START), the controller 560 reads the travel-mode selection signal from the operating position detection sensor 570 (Step S211) and determines whether or not the first-motor driving mode is being selected (Step S212).

If step S212 results in YES (namely, if the first-motor driving mode is being selected), the controller 560 determines whether or not the vehicle is in the forward traveling state (including a neutral state), based on the signal from the travel-state detection sensor 580 (step S213).

If step S213 results in YES (namely, if the vehicle is in the state except for the rearward traveling state), the controller 560 positions the bypass valve 260B at the first-motor driving position through the solenoid 465 which functions as the bypass-valve actuating mechanism 550 for realizing the first-motor driving mode (Step S214) and, also, positions the operation-side link member 630 at the first-motor driving position through the electric mechanism 565 for setting the amount of the capacity of the first hydraulic motor 50 at the first capacity (Step S215).

Thereafter, the controller 560 determines whether or not the driving power source 230 is stopped (Step S216). If the driving power source 230 is operated, the controller 560 returns to step S211. If the driving power source 230 is stopped, the controller 560 ends the control (END).

On the other hand, if step S212 results in NO (namely, if the first/second-motor driving mode is being selected) or step S213 results in NO (namely, if the vehicle is in the rearward traveling state when the first-motor driving mode is selected), the controller 560 positions the bypass valve 260B at the first/second-motor driving position through the solenoid 465 which functions as the bypass-valve actuating mechanism 550 for realizing the first/second-motor driving mode (Step S224) and, also, positions the operation-side link member 630 at the first/second-motor driving position through the electric mechanism 565 for setting the amount of the capacity of the first hydraulic motor 50 at the standard capacity (Step S225).

Thereafter, the controller 560 shifts to step S216.

The control for forcibly shifting the driving mode to the first/second driving mode for preventing the convenience caused by the rearward travel of the vehicle including the 2-port/2-position type bypass valve when the first driving mode is selected can be applied to the vehicles according to the first to fourth embodiments.

Figure 31:
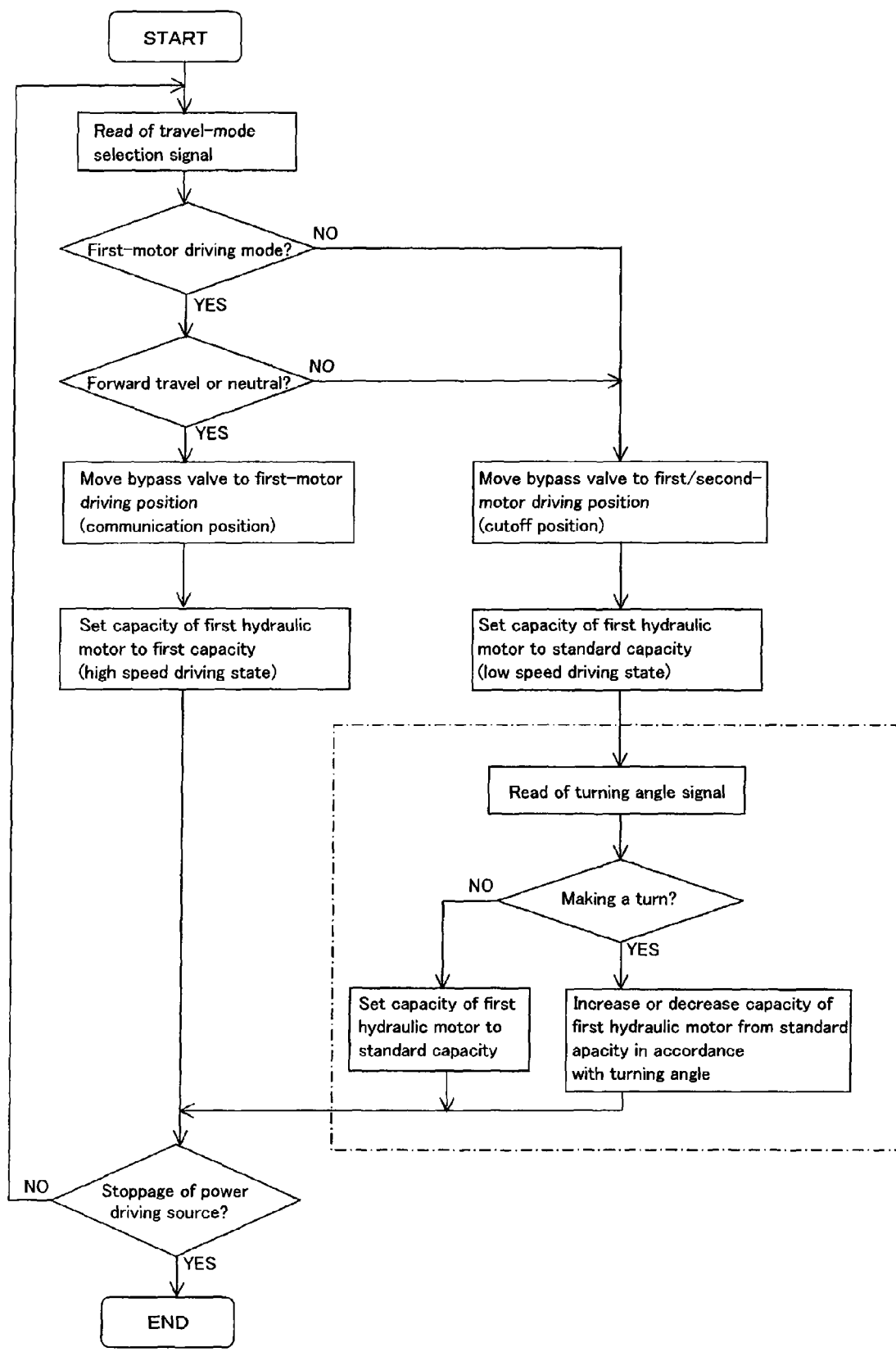
FIG. 31 is a flow chart of an example of a driving mode changeover control by a controller in the vehicles according to the first to fourth embodiments.

FIG. 31 illustrates an example of the control flow for the vehicles according to the first to fourth embodiments.

In the vehicle according to the first embodiment which induces no difference in turning radius between the first wheels 9 and the second wheels 8 in accordance with the turning angle of the vehicle, steps enclosed with a chain line are omitted.

Sixth Embodiment

Hereinafter, there will be described a hydraulic drive vehicle according to another embodiment in the second aspect of the present invention, with reference to the attached drawings.

Figure 32:
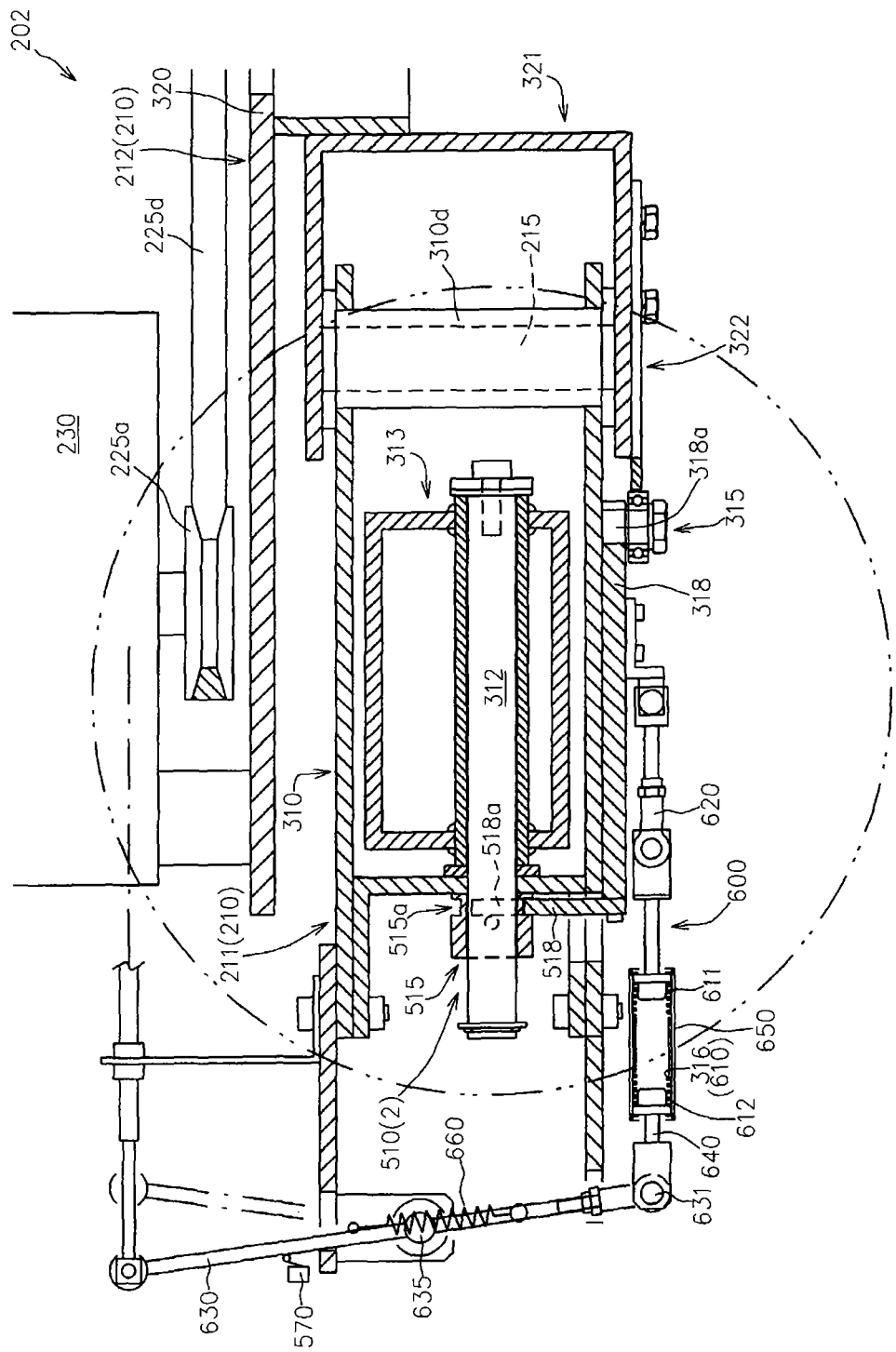
FIG. 32 is a partial side view of a hydraulic drive vehicle according to a sixth embodiment of the present invention.
Figure 33:
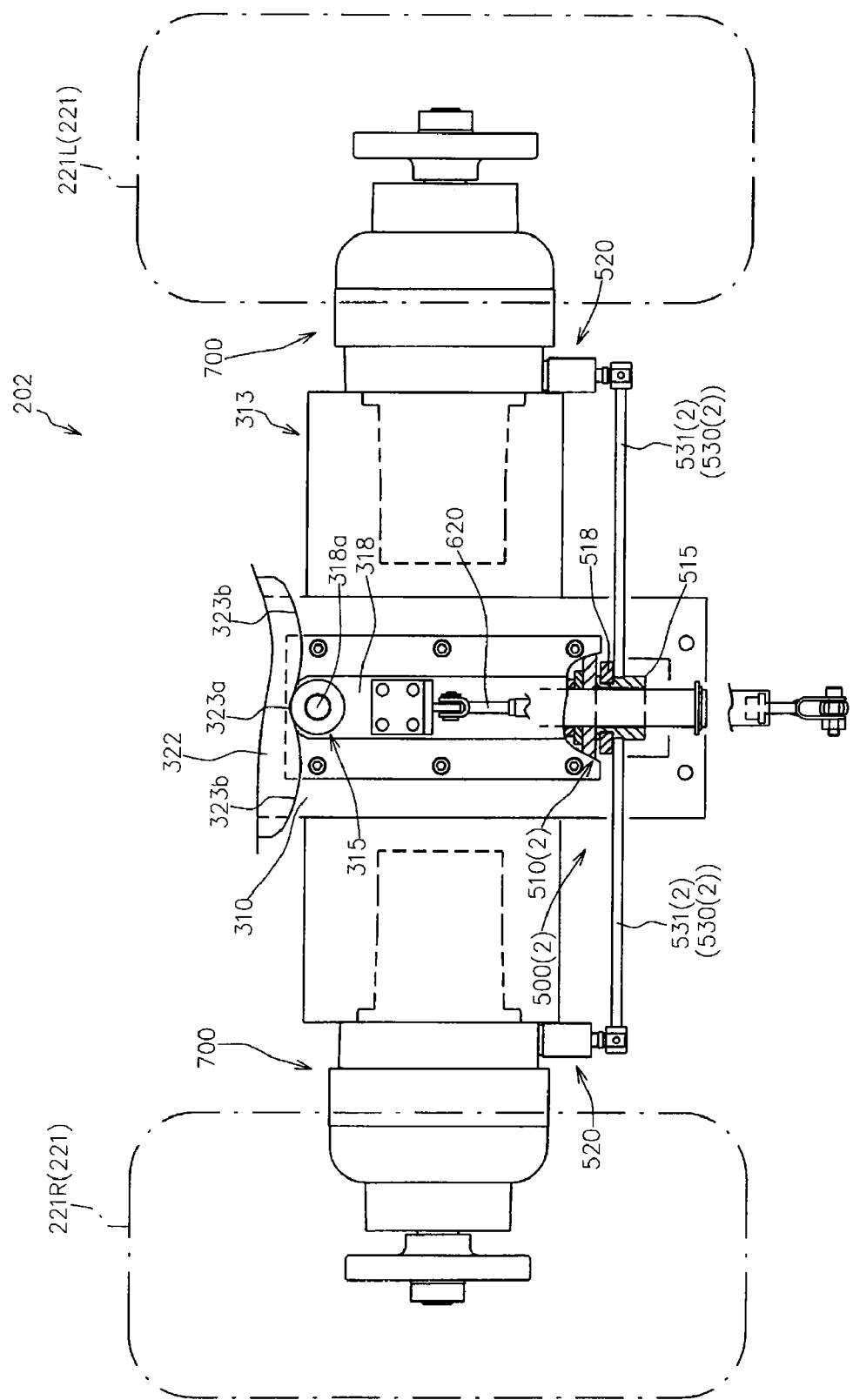
FIG. 33 is a partial bottom view of the vehicle shown in FIG. 32.
Figure 34:
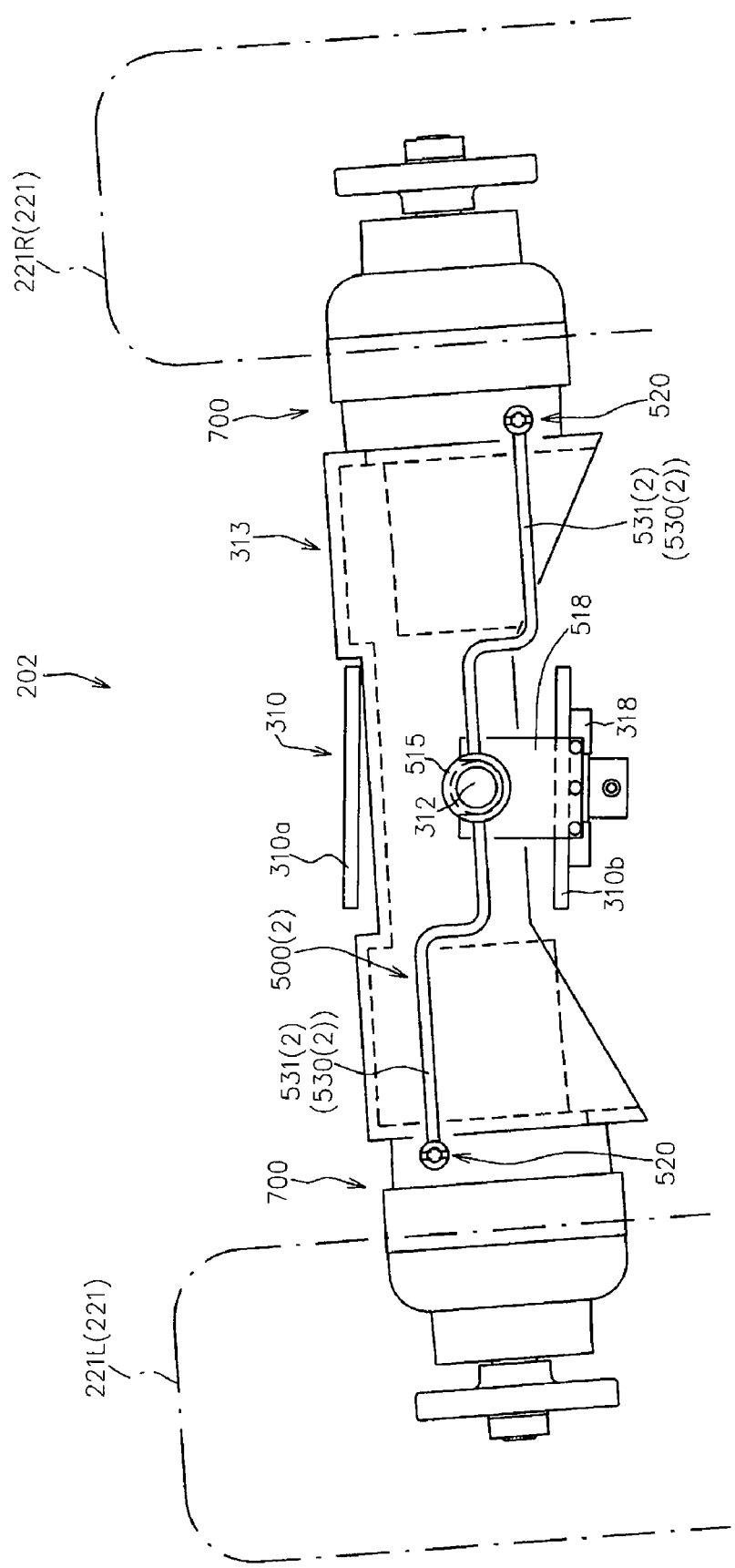
FIG. 34 is a partial rear view of the vehicle shown in FIGS. 32 and 33.

FIGS. 32 to 34 illustrate a partial side view, a partial bottom view and a partial rear view of a hydraulic drive vehicle 202 according to the present embodiment, respectively.

In the figures, the same components as those in the fifth embodiment will be designated by the same reference characters, and detailed description thereof will be properly omitted.

The vehicle 202 according to the present embodiment is different from the vehicle according to the fifth embodiment, in that the hydraulic-motor actuating mechanism 500 is replaced with a hydraulic-motor actuating mechanism 500(2).

As illustrated in FIGS. 32 to 34, the hydraulic-motor actuating mechanism 500(2) includes a cam-follower-side actuating mechanism 510(2) operatively coupled to the cam follower member 315, the pair of motor-side actuating mechanisms 520, and a coupling member 530(2) which operatively couples the cam-follower-side actuating mechanism 510(2) and the pair of motor-side actuating mechanisms 520 to each other.

The cam-follower-side actuating mechanism 510(2) includes a rotational member 515 which is relatively immovable in the first direction but is relatively rotatable about the leftward/rightward swing reference shaft 312 with respect to the cam follower member 315.

In the present embodiment, as illustrated in FIG. 32 and FIG. 34, the rotational member 315 is relatively immovable in the first direction but is relatively rotatable about the leftward/rightward swing reference shaft with respect to the cam follower member 315, through an engagement member 518 coupled to the movable member 318.

More specifically, as illustrated in FIG. 32, the engagement member 518 is formed with a slit 518a.

On the other hand, the rotational member 515 is formed to have a cylindrical shape and, also, is provided with an engagement groove 515a formed at an intermediate portion of its outer peripheral surface which is positioned between a first end surface and a second end surface, as illustrated in FIG. 32.

The rotational member 515 is formed to have an outer diameter larger than an opening width of the slit 518a at the portion other than the intermediate portion provided with the engagement groove 515a while having an outer diameter smaller than the opening width of the slit 518a at the intermediate portion provided with the engagement groove 515a.

The rotational member 515 is coupled to the engagement member 518 through an engagement of the intermediate portion into the slit 518a such that the rotational member 515 is relatively immovable in the first direction but is relatively rotatable about the leftward/rightward swing reference shaft 312 with respect to the engagement member 518.

Preferably, the rotational member 515 may have a center hole which penetrates therethrough between the first end surface and the second end surface and into which the leftward/rightward swing reference shaft 312 is inserted in a relatively rotatable manner with respect thereto.

With this structure, it is possible to effectively prevent the rotational member 515 from being disengaged from the slit 518a accidentally.

The coupling member 530(2) has a pair of left and right rods 531(2) which have first ends coupled to the rotational member 515 and second ends coupled to the capacity adjustment mechanisms 255 in the pair of first hydraulic motors 250, as illustrated in FIG. 33 and FIG. 34.

With the vehicle 202 including the hydraulic-motor actuating mechanism 500(2), it is also possible to operate the motor-side capacity adjustment mechanisms 255 in the pair of first hydraulic motors 250 at a state where they are accurately synchronized with each other, while allowing the pair of left and right first wheel motor devices 700 to swing about the leftward/rightward swing reference shaft 312.

Further, in the fifth and sixth embodiments, the pair of left and right first wheel motor devices 700 are configured so as to be swingable about the leftward/rightward swing reference shaft 312, but the present invention is not limited to the embodiments, as a matter of cause.

Figure 35:
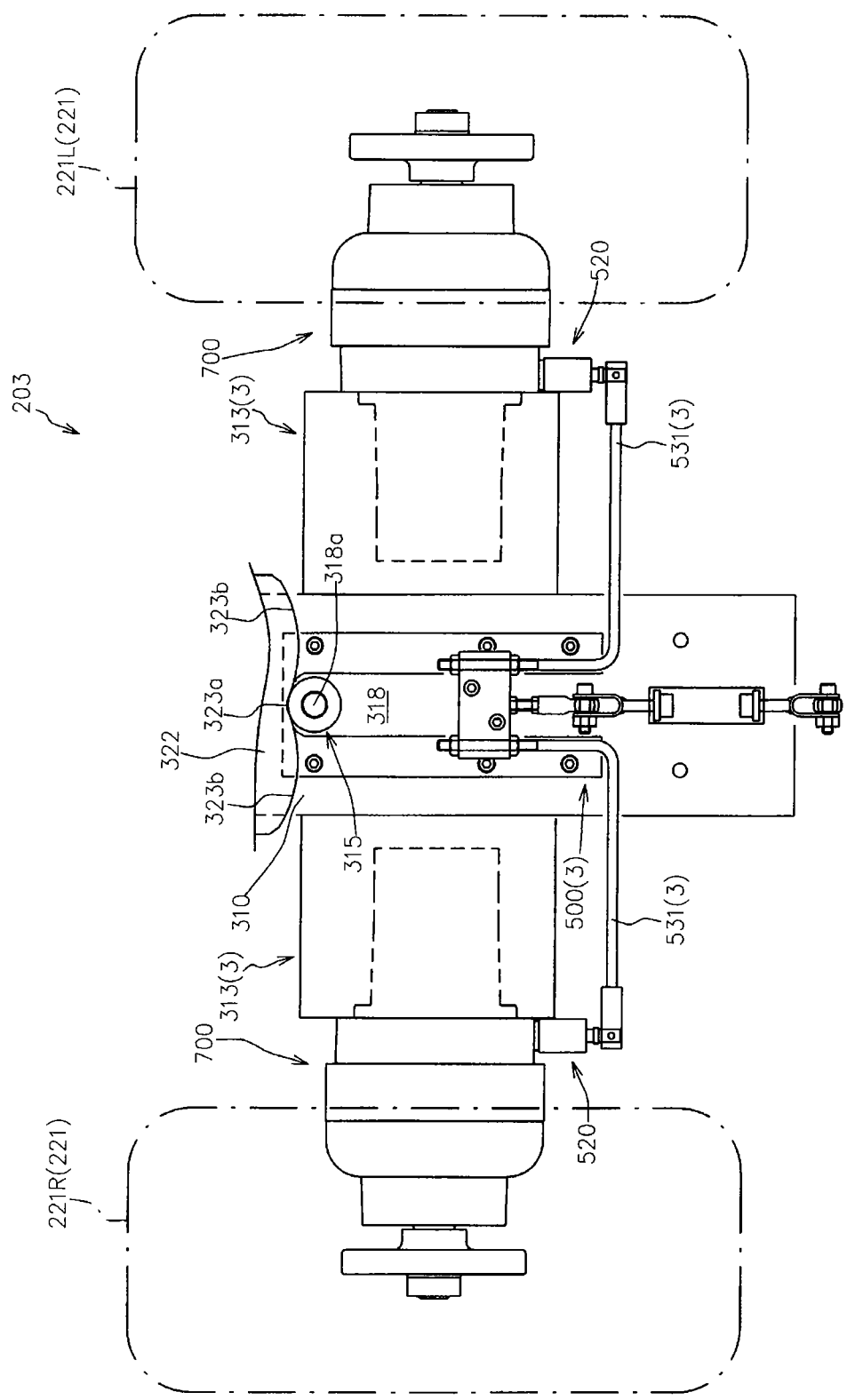
FIG. 35 is a partial bottom view of a hydraulic drive vehicle according to another embodiment of the present invention.
Figure 36:
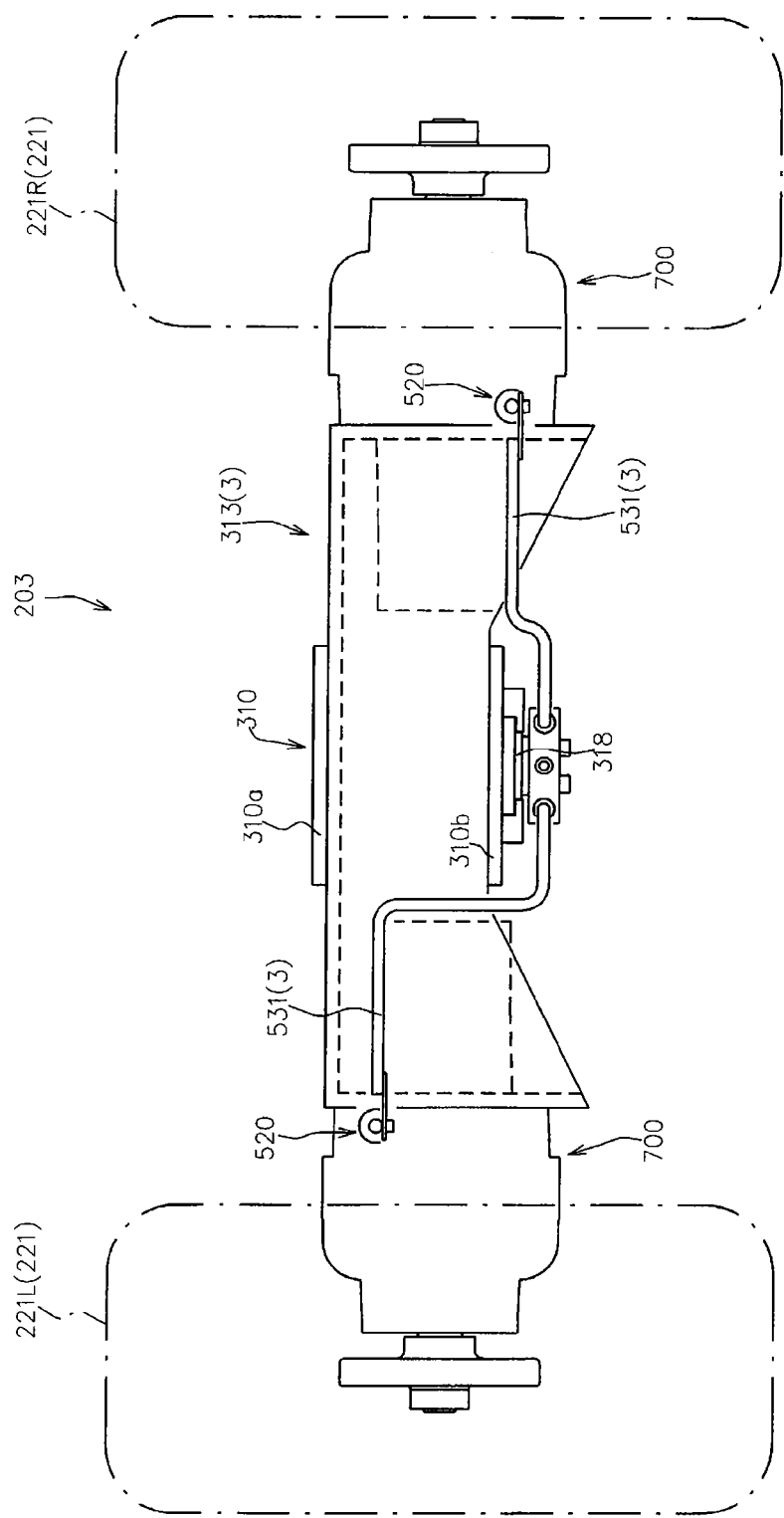
FIG. 36 is a partial rear view of the vehicle shown in FIG. 35.

Namely, as illustrated in FIG. 35 and FIG. 36, it is also possible to provide a supporting frame 313(3) fixedly coupled to the first frame main body 310, instead of the swing frame 313, and to have the pair of left and right first wheel motor devices 700 supported by the left and right ends of the supporting frame 313(3).

A vehicle 203 according to a modification embodiment illustrated in FIG. 35 and FIG. 36 employs a hydraulic-motor actuating mechanism 500(3) including the pair of motor-side hydraulic mechanisms 520 and a pair of left and right rods 531(3) which have first ends operatively coupled to the cam follower member 315 and second ends coupled to the motor-side capacity adjustment mechanisms 255 in the pair of first hydraulic motors 250.

What is claimed is:

1. A hydraulic drive working vehicle comprising a vehicle frame, first and second wheels respectively supported on one side and the other side of the vehicle frame in a vehicle lengthwise direction, a driving power source supported by the vehicle frame, a variable-displacement type hydraulic pump operatively driven by the driving power source, a variable-displacement type first hydraulic motor operatively driving the first wheel, and a fixed-displacement type second hydraulic motor operatively driving the second wheel, wherein the hydraulic pump, the first hydraulic motor and the second hydraulic motor are fluidly connected in series to form a closed circuit through a pump/second-motor line, a second-motor/first-motor line and a first-motor/pump line that establish fluid connections between the hydraulic pump and the second hydraulic motor, between the second hydraulic motor and the first hydraulic motor and between the first hydraulic motor and the hydraulic pump, respectively, the hydraulic drive working vehicle further comprising a bypass valve selectively realizing a first-motor driving mode in which only the first hydraulic motor is driven by fluidly connecting the pump/second-motor line and the second-motor/first-motor line, and a first/second-motor driving mode in which both the first and second hydraulic motors are driven by fluidly disconnecting the both lines, a driving-mode changeover operation member capable of being manually operated for changing over the driving mode, a bypass-valve actuating mechanism for actuating the bypass valve, and a hydraulic-motor actuating mechanism for actuating a capacity adjustment mechanism of the first hydraulic motor, wherein the capacity adjustment mechanism is configured so as to change the capacity of the first hydraulic motor within a range including a standard capacity which makes a peripheral speed of the first wheel driven by the first hydraulic motor equal to a peripheral speed of the second wheel driven by the second hydraulic motor, wherein the bypass-valve actuating mechanism selectively positions the bypass valve at a first-motor driving position and a first/second-motor driving position that realize the first-motor driving mode and the first/second-motor driving mode, respectively, in accordance with a manual operation on the driving-mode changeover operation member, and wherein the hydraulic-motor actuating mechanism actuates the capacity adjusting mechanism such that the capacity of the first hydraulic motor becomes the standard capacity when the bypass valve is positioned at the first/second-motor driving position and is set to a first capacity smaller than the standard capacity when the bypass valve is positioned at the first motor driving position.

2. A hydraulic drive working vehicle according to claim 1, wherein the first and second wheels have a difference in turning radius therebetween in accordance with a turning angle of the vehicle, and the hydraulic-motor actuating mechanism actuates the capacity adjustment mechanism such that, when the bypass valve is positioned at the first/second-motor driving position, the capacity of first hydraulic motor is maintained at the standard capacity at a straight traveling movement of the vehicle and the capacity of the first hydraulic motor is decreased and increased from the standard capacity in accordance with increase and decrease of turning radius of the first wheel relative to the second wheel at a turning movement of the vehicle.

3. A hydraulic drive working vehicle according to claim 2, further comprising an operating position detection sensor for directly or indirectly detecting a position to which the operation member has been operated, and a controller that receives a signal from the operating position detection sensor, wherein the controller operates a solenoid that functions as the bypass-valve actuating mechanism based on the signal from the operating position detection sensor to control a position of the bypass valve.

4. A hydraulic drive working vehicle according to claim 3, further comprising a turning-angle sensor for detecting the turning angle of the vehicle, and a hydraulic-motor electric actuator that functions as the hydraulic-motor actuating mechanism, wherein the controller operates the hydraulic-motor electric actuator such that the capacity of the first hydraulic motor is set to the first capacity when the bypass valve is positioned at the first-motor driving position, and the capacity of the first hydraulic motor is decreased and increased from the standard capacity in accordance with increase and decrease of turning radius of the first wheel relative to the second wheel at the turning movement of the vehicle while the capacity of first hydraulic motor being maintained at the standard capacity at the straight traveling movement of the vehicle when the bypass valve is positioned at the first/second-motor driving position.

5. A hydraulic drive working vehicle according to claim 2, wherein the working vehicle includes a steering operation member capable of being manually operated in such a way as to be rotated about a steering operation axis line for performing a turning movement of the vehicle, the vehicle being configured so that the turning radius of the first wheel becomes larger than the turning radius of the second wheel as the turning angle of the vehicle increases, the hydraulic-motor actuating mechanism includes an input-side actuating arm capable of swinging between an initial position and an actuating position about a swing reference axis line, an output-side actuating arm capable of swinging between an initial position and an actuating position about the swing reference axis line independently of the input-side actuating arm, an input-side link which operatively couples the steering operation member to the input-side actuating arm, an output-side link which operatively couples the output-side actuating arm to the capacity adjustment mechanism, a biasing member which biases the output-side actuating arm toward the initial position about the swing reference axis line, and an electric motor which acts on the output-side actuating arm, the electric motor is in an operating state of pressing the output-side actuating arm toward the operating position from the initial position against a biasing force of the biasing member about the swing reference axis line when the bypass valve is positioned at the first-motor driving position based on a manual operation on the changeover operation member, and is in a non-operating state of allowing the output-side actuating arm to be positioned at the initial position due to the biasing force of the biasing member when the bypass valve is positioned at the first/second-motor driving position based on a manual operation on the changeover operation member, the input-side link operatively couples the steering operation member and the input-side actuating arm to each other so as to have the input-side actuating arm positioned at the initial position when the steering operation member is positioned at a straight travel position about the steering operation axis line and to have the input-side actuating arm swung from the initial position toward the operating position by an angle corresponding to the amount by which the steering operation member has been operated when the steering operation member is operated from the straight travel position about the steering operation axis line in either of one and the other directions, the output-side link operatively couples the output-side actuating arm and the capacity adjustment mechanism such that the capacity of the first hydraulic motor is changed between the standard capacity and the first capacity in accordance with the swing of the output-side actuating arm between the initial position and the operating position, and the input-side and output-side actuating arms are provided with a conjunction/constraint mechanism which causes the output-side actuating arm to swing from the initial position to the operating position according to the swing of the input-side actuating arm from the initial position to the operating position and which also allow only the output-side actuating arm to swing from the initial position to the operating position while maintaining the input-side actuating arm positioned at the initial position.

6. A hydraulic drive working vehicle according to claim 1, wherein the first wheel includes a pair of left and right first wheels, the first hydraulic motor includes a pair of left and right first hydraulic motors that operatively driving the left and right first wheels, respectively, the second-motor/first-motor line has a first end fluidly connected to the second hydraulic motor and a second end fluidly connected to the pair of left and right first hydraulic motors, and the first-motor/pump line has a first end fluidly connected to the pair of left and right first hydraulic motors and a second end fluidly connected to the hydraulic pump, and the capacity adjustment mechanisms of the pair of left and right first hydraulic motors are operated through the hydraulic-motor actuating mechanism in a synchronized manner to each other.

7. A hydraulic drive working vehicle according to claim 1, wherein the second wheel includes a pair of left and right second wheels, the second hydraulic motor includes a pair of left and right second hydraulic motors that operatively driving the left and right second wheels, respectively, and the pump/second-motor line has a first end fluidly connected to the hydraulic pump and a second ends fluidly connected to the pair of left and right second hydraulic motors, and the second-motor/first-motor line has a first end fluidly connected to the pair of left and right second hydraulic motors and a second end fluidly connected to the first hydraulic motor.

* * * * *